(12) United States Patent
Cracauer et al.

(10) Patent No.: US 7,435,390 B2
(45) Date of Patent: Oct. 14, 2008

(54) NUCLEIC ACID SYNTHESIZERS

(75) Inventors: Raymond F. Cracauer, Middleton, WI (US); Witold A. Ziarno, Madison, WI (US)

(73) Assignee: Third Wave Technologies, Inc., Madison, WI (US)

(*) Notice: Subject to any disclaimer, the term of this patent is extended or adjusted under 35 U.S.C. 154(b) by 145 days.

(21) Appl. No.: 10/054,023

(22) Filed: Nov. 13, 2001

(65) Prior Publication Data

US 2002/0142454 A1  Oct. 3, 2002

Related U.S. Application Data

(63) Continuation-in-part of application No. 09/782,702, filed on Feb. 13, 2001, now abandoned, which is a continuation-in-part of application No. 09/771,332, filed on Jan. 26, 2001, now Pat. No. 6,932,943.

(51) Int. Cl.
  *B01J 19/00* (2006.01)
(52) U.S. Cl. ............... 422/130; 422/102; 422/105; 422/129; 422/131
(58) Field of Classification Search .......... 422/99, 422/102, 103, 104, 129, 130, 131, 105; 436/34, 436/37, 55
See application file for complete search history.

(56) References Cited

U.S. PATENT DOCUMENTS

| | | | |
|---|---|---|---|
| 3,917,455 A | 11/1975 | Bak et al. ............. 23/253 |
| 3,986,835 A * | 10/1976 | Takagi ................ 23/259 |
| 4,338,279 A * | 7/1982 | Orimo et al. ........... 422/64 |
| 4,353,989 A | 10/1982 | Bender et al. ......... 435/287 |
| 4,401,796 A | 8/1983 | Itakura .............. 535/340 |
| 4,458,066 A | 7/1984 | Caruthers et al. ....... 536/27 |
| 4,483,964 A | 11/1984 | Urdea et al. ......... 525/54.11 |
| 4,517,338 A | 5/1985 | Urdea et al. ......... 525/54.11 |
| 4,598,045 A | 7/1986 | Masover et al. ........ 435/34 |
| 4,598,049 A | 7/1986 | Zelinka et al. ....... 435/287 |
| 4,689,405 A | 8/1987 | Frank et al. ........... 536/27 |
| 4,734,363 A | 3/1988 | Dattagupta et al. ..... 435/91 |
| 4,744,037 A | 5/1988 | Niina et al. .......... 364/497 |
| 4,837,159 A | 6/1989 | Yamada ................ 436/45 |
| 4,950,745 A | 8/1990 | Ishido et al. .......... 536/58 |
| 5,027,578 A * | 7/1991 | Natterer et al. ......... 53/86 |
| 5,047,524 A | 9/1991 | Andrus et al. .......... 536/27 |
| 5,053,454 A | 10/1991 | Judd ............... 525/54.11 |

(Continued)

FOREIGN PATENT DOCUMENTS

WO    WO 91/13084    9/1991

(Continued)

OTHER PUBLICATIONS

User's Manual AB1 3900 High Throughput DNA Synthesizer, Applied Biosystems (2001).

*Primary Examiner*—Jill Warden
*Assistant Examiner*—Dwayne K Handy
(74) *Attorney, Agent, or Firm*—Casimir Jones, S.C.

(57) ABSTRACT

The present invention relates to nucleic acid synthesizers and methods of using and modifying nucleic acid synthesizers. For example, the present invention provides highly efficient, reliable, and safe synthesizers that find use, for example, in high throughput and automated nucleic acid synthesis, as well as methods of modifying pre-existing synthesizers to improve efficiency, reliability, and safety.

2 Claims, 32 Drawing Sheets

U.S. PATENT DOCUMENTS

| | | | |
|---|---|---|---|
| 5,099,988 A * | 3/1992 | Garran | 206/223 |
| 5,112,575 A | 5/1992 | Whitehouse et al. | 422/116 |
| 5,112,962 A | 5/1992 | Letsinger et al. | 536/27 |
| 5,132,418 A | 7/1992 | Caruthers et al. | 536/27 |
| 5,149,798 A | 9/1992 | Agrawal et al. | 536/27 |
| 5,153,319 A | 10/1992 | Caruthers et al. | 536/27 |
| 5,262,530 A | 11/1993 | Andrus et al. | 536/25.31 |
| 5,264,562 A | 11/1993 | Matteucci | 536/23.1 |
| 5,264,566 A | 11/1993 | Froehler et al. | 536/25.34 |
| 5,298,259 A | 3/1994 | Lloyd et al. | 424/486 |
| 5,324,831 A | 6/1994 | Marquez et al. | 536/25.3 |
| 5,368,823 A | 11/1994 | McGraw et al. | |
| 5,437,979 A | 8/1995 | Rampal et al. | 435/6 |
| 5,443,791 A | 8/1995 | Cathcart et al. | 422/65 |
| 5,462,748 A | 10/1995 | Lloyd et al. | 424/484 |
| 5,466,608 A | 11/1995 | Lapluye et al. | 436/86 |
| 5,472,672 A | 12/1995 | Brennan | 422/131 |
| 5,503,805 A | 4/1996 | Sugarman et al. | 422/131 |
| 5,514,789 A | 5/1996 | Kempe | 536/25.4 |
| 5,518,651 A | 5/1996 | Reddy et al. | 252/193 |
| 5,541,314 A | 7/1996 | McGraw et al. | 536/25.31 |
| 5,548,076 A | 8/1996 | Froehler et al. | 536/25.34 |
| 5,580,523 A | 12/1996 | Bard | 422/50 |
| 5,616,700 A | 4/1997 | Reddy et al. | 536/25.3 |
| 5,620,852 A | 4/1997 | Lin et al. | 435/6 |
| 5,639,873 A | 6/1997 | Barascut et al. | 536/25.3 |
| 5,646,267 A | 7/1997 | Stec et al. | 536/25.3 |
| 5,651,943 A * | 7/1997 | Lam et al. | 422/131 |
| 5,652,358 A | 7/1997 | Pfleiderer et al. | 536/25.3 |
| 5,668,266 A | 9/1997 | Ruth | 536/25.3 |
| 5,668,268 A | 9/1997 | Tang et al. | 536/25.3 |
| 5,700,919 A | 12/1997 | Seliger et al. | 536/22.1 |
| 5,702,672 A * | 12/1997 | DeWitt et al. | 422/131 |
| 5,703,218 A | 12/1997 | Urdea et al. | 536/23.1 |
| 5,703,223 A | 12/1997 | Wickstrom et al. | 536/25.33 |
| 5,723,599 A | 3/1998 | Klem et al. | 536/25.3 |
| 5,726,300 A | 3/1998 | Klem et al. | 536/25.34 |
| 5,736,626 A | 4/1998 | Mullah et al. | 536/25.3 |
| 5,762,881 A | 6/1998 | Harness et al. | 422/132 |
| 5,770,157 A | 6/1998 | Cargill et al. | 422/99 |
| 5,789,162 A | 8/1998 | Dower et al. | 435/6 |
| 5,792,430 A | 8/1998 | Hamper | 422/131 |
| 5,840,841 A | 11/1998 | Zuckermann et al. | 530/338 |
| 5,865,224 A | 2/1999 | Ally et al. | 141/130 |
| 5,874,554 A | 2/1999 | Gamble et al. | 536/22.1 |
| 5,885,837 A | 3/1999 | Winkler et al. | 435/91.1 |
| 5,935,527 A | 8/1999 | Andrus et al. | 422/131 |
| 5,981,733 A | 11/1999 | Gamble et al. | 536/25.3 |
| 6,045,755 A | 4/2000 | Lebl et al. | 422/65 |
| 6,057,424 A | 5/2000 | Vail, III | 530/333 |
| 6,096,276 A | 8/2000 | Laursen | 422/103 |
| 6,126,904 A | 10/2000 | Zuellig et al. | 422/130 |
| 6,150,102 A | 11/2000 | Mills, Jr. et al. | 435/6 |
| 6,165,717 A | 12/2000 | Dower et al. | 435/6 |
| 6,171,555 B1 | 1/2001 | Cargill et al. | 422/104 |
| 6,175,006 B1 | 1/2001 | Andrus et al. | 536/25.4 |
| 6,177,554 B1 | 1/2001 | Woo et al. | 536/23.1 |
| 6,225,061 B1 | 5/2001 | Becker et al. | 435/6 |
| 6,238,627 B1 * | 5/2001 | McGowan et al. | 422/130 |
| 6,264,891 B1 * | 7/2001 | Heyneker et al. | 422/64 |
| 6,270,730 B1 | 8/2001 | McLuen et al. | 422/131 |
| 6,274,091 B1 * | 8/2001 | Mohan et al. | 422/103 |
| 6,280,950 B1 | 8/2001 | Lipshutz et al. | 435/6 |
| 6,309,608 B1 * | 10/2001 | Zhou et al. | 422/131 |
| 6,313,284 B1 | 11/2001 | Kwiatkowski et al. | 536/25.3 |
| 6,329,210 B1 | 12/2001 | Schleifer | 436/518 |
| 6,429,007 B1 * | 8/2002 | Kluttz et al. | 435/286.5 |
| 6,432,365 B1 * | 8/2002 | Levin et al. | 422/100 |
| 6,485,692 B1 * | 11/2002 | Freitag et al. | 422/130 |
| 2001/0000723 A1 | 5/2001 | McLuen et al. | 422/100 |
| 2001/0001035 A1 | 5/2001 | McLuen et al. | 422/100 |
| 2001/0007644 A1 | 7/2001 | McLuen et al. | 422/131 |
| 2001/0022950 A1 | 9/2001 | Hall et al. | 422/131 |

FOREIGN PATENT DOCUMENTS

| | | |
|---|---|---|
| WO | WO 98/10857 | 3/1998 |
| WO | WO 98/36829 | 8/1998 |
| WO | WO 98/39099 | 9/1998 |
| WO | WO 98/57181 | 12/1998 |
| WO | WO99/65602 | 12/1999 |
| WO | WO 00/56445 | 9/2000 |

* cited by examiner

FIGURE 21
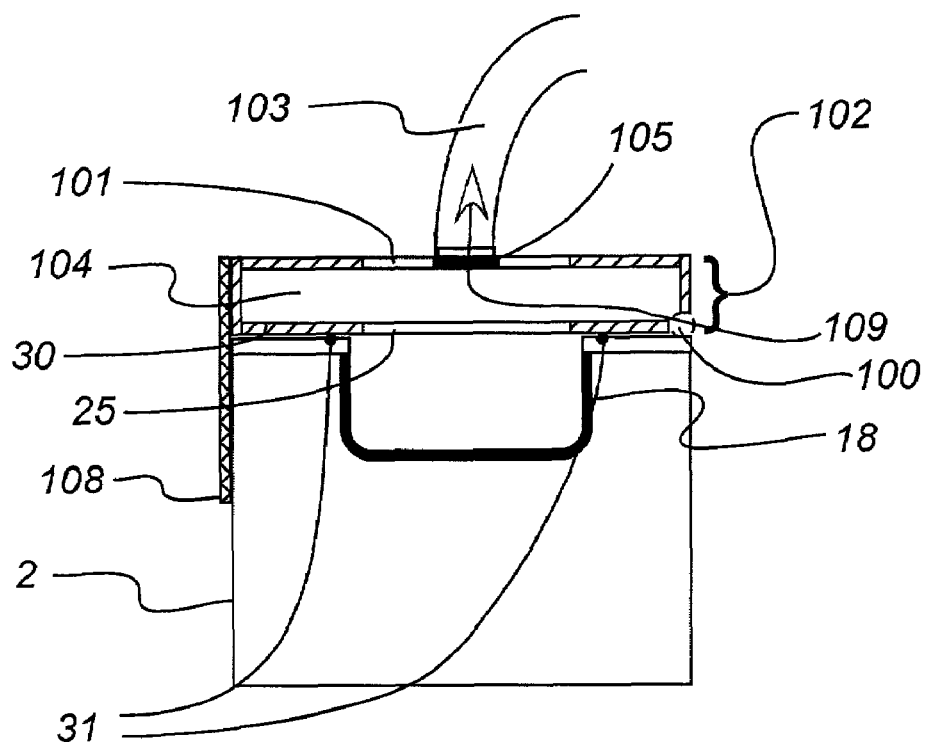
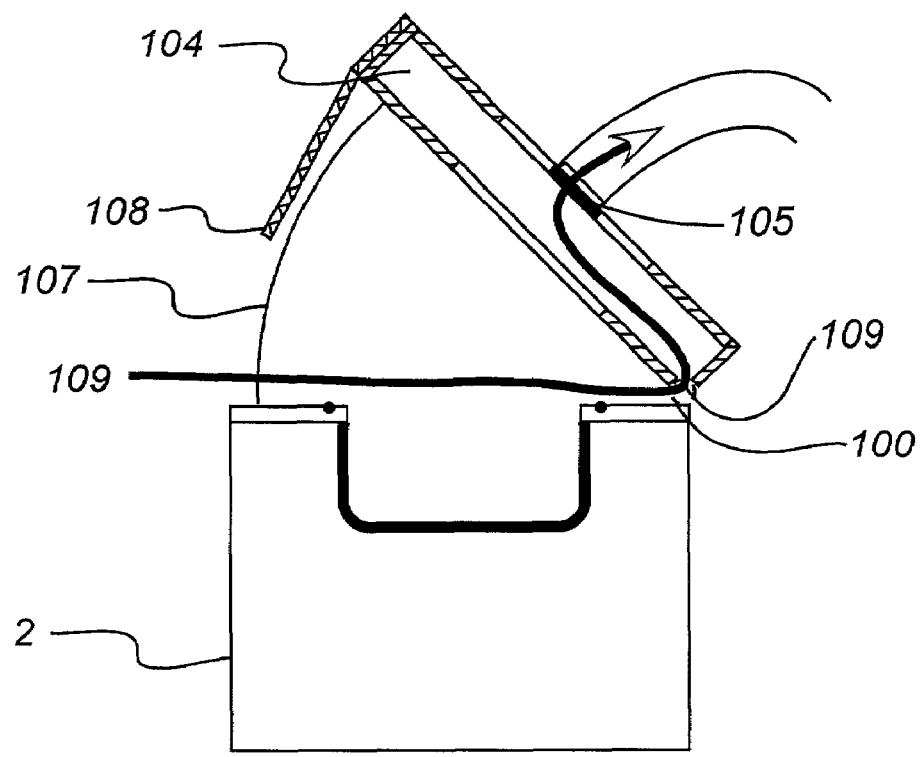

FIGURE 22
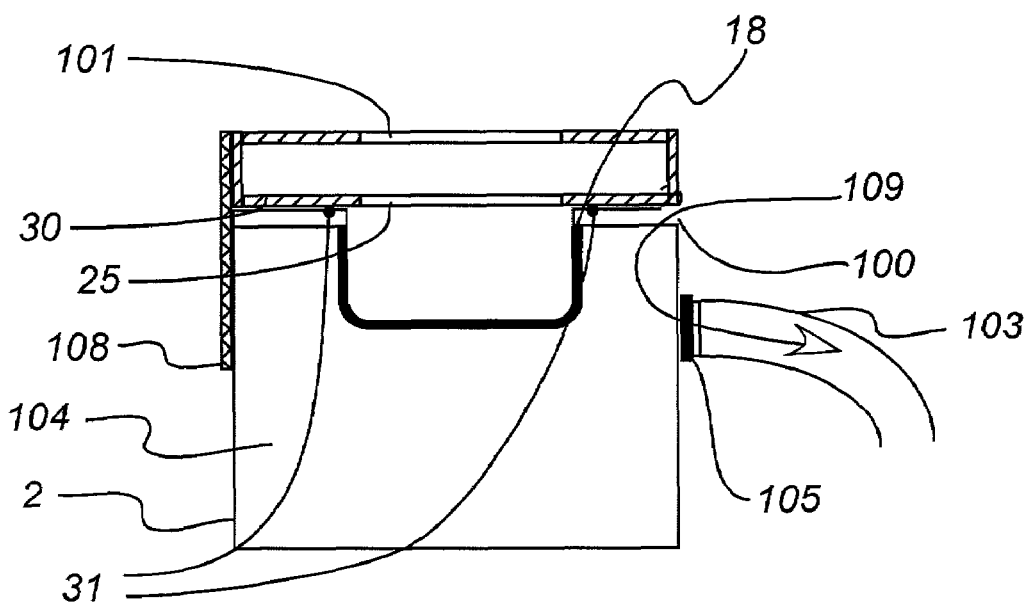
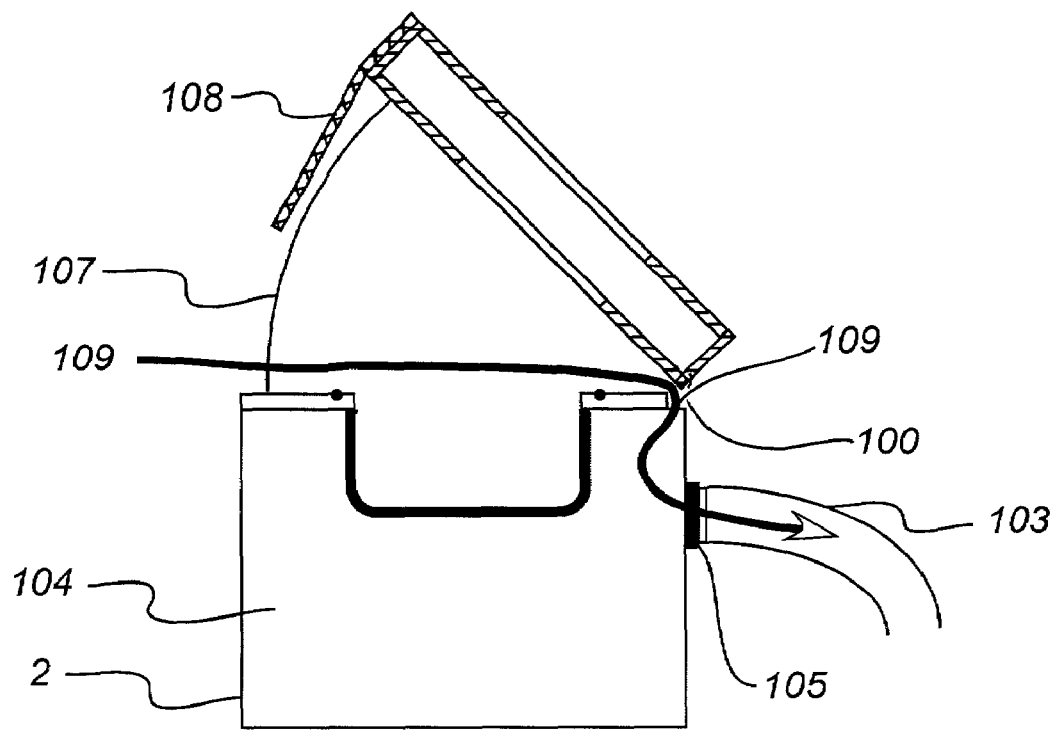

NUCLEIC ACID SYNTHESIZERS

This is a Continuation-in-Part of co-pending application filed under Express Mail receipt number EL 790816244 US, filed Oct. 26, 2001, which is a Continuation-in-Part of co-pending application Ser. No. 09/782,702, filed Feb. 13, 2001 now abandoned, which is a Continuation-in-Part of co-pending application Ser. No. 09/771,332, filed Jan. 26, 2001, now U.S. Pat No. 6,932,943.

FIELD OF THE INVENTION

The present invention relates to nucleic acid synthesizers and methods of using and modifying nucleic acid synthesizers. For example, the present invention provides highly efficient, reliable, and safe synthesizers that find use, for example, in high throughput and automated nucleic acid synthesis, as well as methods of modifying pre-existing synthesizers to improve efficiency, reliability, and safety. The present invention also relates to synthesizer arrays for efficient, safe, and automated processes for the production of large quantities of oligonucleotides.

BACKGROUND

With the completion of the Human Genome Project and the increasing volume of genetic sequence information available, genomics research and subsequent drug design efforts have been increasing as well. Many diagnostic assays and therapeutic methods utilize oligonucleotides. The information obtained from genomic analysis provides valuable insight into the causes and mechanisms of a large variety of diseases and conditions, while oligonucleotides can be used to alter gene expression in cells and tissues to prevent or attenuate diseases or alter physiology. As more nucleic acid sequences continue to be identified, the need for larger quantities of oligonucleotides used in assays and therapeutic methods increases.

To meet the increasing demand for nucleic acid synthesis, there has been an increase in the variety of designs, and the volume of production of nucleic acid synthesizers. Unfortunately, the currently available synthesizers are not designed to adequately meet the needs of the industry. Exemplary, nucleic acid synthesizers include the synthesizers described in U.S. Patent Publication No. 2001/0001035 A1, published on May 10, 2001, and incorporated herein in its entirety for all purposes. Yet, this type of synthesizer has a significant number of drawbacks. In particular, available synthesizers are limited in their ability to efficiently synthesize large numbers of oligonucleotides. While synthesizers have been developed to simultaneously synthesize more than one oligonucleotide at a time, such machines are not efficient at the production of different types of nucleic acids simultaneously (e.g., different lengths of nucleic acids) and are unacceptably prone to performance failures and environmental contamination. Furthermore, available synthesizers are not suitably configured for use in large-scale nucleic acid production facilities or for automated nucleic acid synthesis. Thus, the art is in need of nucleic acid synthesizers that are safe, efficient, flexible, and are amenable to large-scale production and automation.

SUMMARY OF THE INVENTION

While the present invention will be described with reference to several specific embodiments, the description is illustrative of the present invention and is not to be construed as limiting the invention. Various modifications to the present invention can be made without departing from the scope and spirit of the present invention. For the sake of clarity and a better understanding of the present invention, common components share common reference numerals throughout various figures.

The present invention relates to nucleic acid synthesizers and methods of using and modifying nucleic acid synthesizers. For example, the present invention provides highly efficient, reliable, and safe synthesizers that find use, for example, in high throughput and automated nucleic acid synthesis, as well as methods of modifying pre-existing synthesizers to improve efficiency, reliability, and safety. The present invention also relates to synthesizer arrays for efficient, safe, and automated processes for the production of large quantities of oligonucleotides.

In some embodiments, the present invention provides systems comprising a synthesis and purge component, the synthesis and purge component comprising a cartridge and a drain plate, wherein the cartridge is configured to hold one or more nucleic acid synthesis columns and wherein the cartridge is separated from the drain plate by a drain plate gasket. In certain embodiments, the cartridge is configured to hold a plurality of nucleic acid synthesis columns. In particular embodiments, the cartridge is configured to hold 12 or more nucleic acid synthesis columns. In other embodiments, the cartridge is configured to hold 48 or more nucleic acid synthesis columns. In additional embodiments, the cartridge is configured to hold exactly 48 nucleic acid synthesis columns.

In some embodiments, the assembly comprising the cartridge, the drain plate and the drain plate gasket is configured to provide a substantially airtight seal between the assembly and the outside of each nucleic acid synthesis column. In one embodiment, the airtight seal between the assembly and each column is provided by an O-ring. In a preferred embodiment, each O-ring is positioned between the cartridge and the exterior surface of a column.

In certain embodiments, the drain plate gasket provides a substantially airtight seal between the cartridge and the drain plate. In other embodiments, the drain plate gasket provides an airtight seal between the cartridge and the drain plate. In some embodiments, the drain plate gasket comprises one or more alignment markers configured to allow aligned attachment of said cartridge to said drain plate. In additional embodiments, the drain plate gasket comprises one or more alignment markers configured to allow aligned attachment of the drain plate gasket to the cartridge. In other embodiments, the drain plate gasket comprises one or more alignment markers configured to allow aligned attachment of the gasket to the drain plate. In certain embodiments, the drain plate gasket comprises at least one drain cut-out. In other embodiments, the drain plate gasket comprises at least four drain cut-outs. In still other embodiments, the drain plate gasket comprises one drain cut out for every synthesis column in the cartridge. In yet other embodiments, the cut outs in the drain plate gasket for each synthesis column are configured to provide an airtight seal between the outside of each nucleic acid synthesis column and the assembly comprising the cartridge, the drain plate, and the drain plate gasket.

In some embodiments, the present invention provides systems comprising a synthesis and purge component, the synthesis and purge component comprising a cartridge and a drain plate, wherein the cartridge is configured to hold one or more nucleic acid synthesis columns and wherein the cartridge is separated from the drain plate by a drain plate gasket. In some embodiments, the drain plate comprises at least one drain (e.g. 1, 2, 3, 4, 5, 10, … 20, …). In other embodiments, the system further comprises a waste tube 63, the waste tube comprising input and output ends, wherein the input end is configured to receive waste materials from the drain. In particular embodiments, the waste tube comprises an inner diameter of at least 0.187 inches (preferably at least 0.25 inches). In some embodiments, the waste tube and the drain are configured such that, when the drain is contacted with the waste tube for waste removal, the waste tube encloses at least a portion of the drain (See, e.g., FIG. 8). In particular embodiments, the drain forms a sealed contact point with an interior portion of the waste tube when the drain is enclosed in the waste tube. In still other embodiments, the drain further comprises a drain sealing ring. In certain embodiments, the system further comprises a waste valve wherein the waste valve is configured to receive waste from the output end of the waste tube. In particular embodiments, the waste valve comprises an interior diameter of at least 0.187 inches (preferably at least 0.25 inches). In some embodiments, the waste valve provides a straight-through path for the waste (e.g. as opposed to an angled path). Straight-through paths can be accomplished, for example, by the use of a gate or ball valve.

In some embodiments, the system further comprises a plurality of dispense lines, the dispense line configured for delivering at least one reagent to a synthesis column in the cartridge. In certain embodiments, the dispense lines comprise an interior diameter of at least 0.25 mm. In particular embodiments, the system further comprises an alignment detector. In particular embodiments, the alignment detector is configured to detect the alignment of a waste tube and a drain. In other embodiments, the alignment detector is configured to detect the alignment of a dispense line and a receiving hole of the cartridge. In some embodiments, the alignment detector is configured to detect a tilt alignment of the synthesis and purge component.

In some embodiments, the system of the present invention further comprises a motor attached to the synthesis and purge component and configured to rotate the synthesis and purge component. In particular embodiments, the motor is attached to the synthesis and purge component by a motor connector. In further embodiments, the system further comprises a bottom chamber seal positioned between the motor connector and the synthesis and purge component. In certain embodiments, the system of the present invention comprises two drain. In preferred embodiments, the two drain are located on opposite sides of the drain plate.

In some embodiments of the systems of the present invention, the synthesis and purge component is contained in a chamber. In certain embodiments, a chamber bowl and a top cover (when in place) combine to form a chamber (e.g. which may be pressurized, for example, with inert gas). One example is depicted in FIG. 2 where chamber bowl 18 and top cover 30 combine to form an exemplary chamber. In some embodiments, the chamber comprises a bottom surface (e.g. bottom of a chamber bowl, see, e.g. FIG. 9) comprising the top portion of two waste tubes (which may, for example, extend downward from bottom of the chamber). In preferred embodiments, the waste tubes are positioned symmetrically on the bottom surface of the chamber (see, e.g., FIG. 9).

In particular embodiments, the systems of the present invention further comprise a chamber drain having open and closed positions, the chamber drain configured to allow gas emissions (or liquid waste) to pass out of the chamber when in the open position.

In some embodiments, the systems of the present invention further comprise a reagent dispensing station, wherein the reagent dispensing station is configured to house one or more reagent reservoirs, such that reagents in reagent reservoirs can be delivered to the cartridge. In certain embodiments, the reagent dispensing station comprises one or more ventilation tubes (e.g., connected to one or more ventilation valves of the reagent dispensing station) configured to remove gaseous emissions from the reagent dispensing station. In certain embodiments, the reagent dispensing station provides an enclosure. In preferred embodiments, the enclosure comprises a viewing window to allow visual inspection of the reagent reservoirs without opening the enclosure. In preferred embodiments, one reagent dispensing station is configured to serve multiple synthesizers.

In some embodiments, the systems of the present invention comprise an integrated ventilation system, e.g., a fume hood, wherein the fume hood is configured to draw gaseous emissions away from an instrument operator. In some embodiments, the integrated fume hood comprises side panels and a front panel, wherein said side and front panels create a ventilated workspace having negative air pressure when compared with the ambient environment. In preferred embodiments, the side and front panels create the ventilated workspace when the synthesizer is opened, e.g., for operator access to the reaction enclosure. In some embodiments, the panels fold or slide into recesses in the synthesizer body upon closing of the instrument, such that the instrument can be closed without removal of the panels.

In particular embodiments, the systems of the present invention are capable of maintaining a gas pressure in the chamber sufficient to purge synthesis columns prior to addition of reagents to the synthesis columns.

In some embodiments, the nucleic acid synthesis systems of the present invention comprise a cartridge in a chamber, the cartridge comprising a plurality of synthesis columns, wherein the synthesis columns contain packing material that provides a resistance against pressurized gas contained in the chamber, the resistance being sufficient to maintain a pressure in the chamber that is capable of purging synthesis columns prior to addition of reagents to the synthesis columns. In certain embodiments, one or more of the plurality of synthesis columns does not undergo a synthesis reaction. In particular embodiments, two or more different lengths of oligonucleotides are synthesized in the plurality of synthesis columns. In other embodiments, the packing material comprises a frit. In some embodiments, the frit is a bottom frit. In other embodiments, the frit is a top frit. In preferred embodiments, the packing material comprises a top frit, solid support, and a bottom frit. In particularly preferred embodiments, the solid support is polystyrene. In some embodiments, the packing material comprises a synthesis matrix.

In some embodiments, the present invention provides nucleic acid synthesis systems comprising a synthesis and purge component in a pressurized chamber, the synthesis and purge component comprising a plurality of synthesis columns, wherein the synthesis columns contain packing material sufficient to maintain pressure in the chamber during a purging operation to purge liquid reagent from the plurality of synthesis columns when at least one of the plurality of synthesis columns does not contain liquid reagent. In certain embodiments, more than one of the plurality of synthesis columns (e.g. 2, 3, 5, 10) do not contain liquid reagent (and the remaining synthesis columns do contain liquid reagent).

In certain embodiments, the present invention provides nucleic acid synthesis systems comprising: a) a synthesis and purge component, the synthesis and purge component comprising a cartridge and a drain plate separated by a drain plate gasket, wherein the cartridge is configured to hold twelve or more nucleic acid synthesis columns; b) a drain positioned in the drain plate; c) a chamber comprising an inner surface, the chamber housing the synthesis and purge component and the drain; d) a waste tube, the waste tube comprising input and output ends, wherein the input end is configured to receive waste materials from the drain, wherein the waste tube comprises an inner diameter of at least 0.187 inches; e) a waste valve configured to receive waste from the output end of the waste tube, wherein the waste valve comprises in interior diameter of at least 0.187 inches; f) a reagent dispensing station, wherein the reagent dispensing station is configured to house one or more reagent reservoirs; g) a plurality of dispense lines, the dispense lines configured for delivering reagents from the reagent reservoirs to a synthesis column in the cartridge, wherein the dispense lines comprise an interior diameter of at least 0.25 mm) a rotating motor attached to the synthesis and purge component by a motor connector and configured to rotate the synthesis and purge component; and i) a gas line configured to release gas into the chamber to create a gas pressure in the chamber greater than a gas pressure in the waste tube. In certain embodiments, the system is capable of maintaining gas pressure in the chamber at a sufficient level to purge the synthesis columns prior to addition of reagents to the synthesis columns.

In some embodiments, the synthesizer further comprises providing energy, such as heat, to the synthesis columns. Heating of the synthesis column finds use, for example, in decreasing the coupling time during a nucleic acid synthesis. It can also broaden the range of the chemical protocols that can be used in high throughput synthesis, e.g. by improving the efficiency of less efficient chemistries, such as the phosphate triester method of oligonucleotide synthesis. In other embodiments, the synthesizer further comprises a mixing component, such as an agitator, configured to agitate the synthesis columns (e.g., to mix reaction components, and to facilitate mass exchange between the reaction medium and the solid support).

In some embodiments, the present invention provides methods for synthesizing nucleic acids comprising: a) providing: i) a nucleic acid synthesizer comprising a synthesis and purge component, the synthesis and purge component comprising a cartridge and a drain plate, wherein the cartridge holds a plurality of nucleic acid synthesis columns and wherein the cartridge is separated by a drain plate gasket from the drain plate, and ii) nucleic acid synthesis reagents; and b) introducing a portion of the nucleic acid synthesis reagents into at least one of the nucleic acid synthesis columns to provide a first synthesis reaction; c) purging the nucleic acid synthesis columns by creating a pressure differential across the nucleic acid synthesis columns; and d) introducing a second portion of the nucleic acid synthesis reagents into at least one of the nucleic acid synthesis columns to provide a second synthesis reaction. In particular embodiments, the drain plate gasket provides a substantially airtight seal between the cartridge and the drain plate. In other embodiments, the drain plate gasket provides an airtight seal between the cartridge and the drain plate.

The present invention further provides a cartridge for use in an open nucleic acid synthesis system, said cartridge comprising a plurality of receiving holes configured to hold nucleic acid synthesis columns, wherein the cartridge is further configured to receive one or more O-rings, wherein the presence of the one or more O-rings provides a seal between the nucleic acid synthesis columns and the plurality of receiving holes (i.e., the O-ring contacts an interior wall of the receiving hole and an exterior wall of the synthesis column to form a seal). In some embodiments, the cartridge is provided as part of a nucleic acid synthesis system. The present invention is not limited by the nature of the O-ring. For example, in some embodiments, the cartridge is associated with a gasket, wherein the gasket provides the O-rings (e.g., through one or more holes in the gaskets, such that when the gasket is associated with the cartridge [e.g., affixed to an outer surface of the cartridge] a seal is formed between the a receiving hole of the cartridge and a synthesis column within the receiving hole [see e.g., FIG. 12C]). In other embodiments, the O-ring is provided in a groove within the receiving hole. For example, in some embodiments, the groove is located at the top surface of the receiving hole. In such embodiments, the plurality of receiving holes comprise an upper portion and a lower portion, wherein the lower portion comprises a first diameter and the upper portion comprises a second diameter that is larger than the first diameter (see e.g., FIG. 12A). In other embodiments, the groove is located within an interior portion of the receiving hole. In such embodiments, the plurality of receiving holes comprise an upper portion with a first diameter, a middle portion with a second diameter, and a lower portion with a third diameter, wherein the second diameter is larger than the first diameter and larger than the third diameter (the first and third diameters may be the same as each other or different). When an O-ring is placed in the groove, the O-ring contains an internal diameter less than the first diameter and less than the third diameter, such that it can contact a synthesis column placed within the receiving hole (see e.g., FIG. 12B).

In some embodiments, the cartridge comprises a rotary cartridge. In some preferred embodiments, O-rings are provided in the cartridge. In some preferred embodiments, the O-ring is configured to form a substantially airtight or pressure-tight seal between the receiving hole and the nucleic acid synthesis column, when said nucleic acid synthesis column is present.

The present invention further provides a nucleic acid synthesis system comprising a synthesis and purge component in a pressurizable chamber, said synthesis and purge component comprising a cartridge, wherein the cartridge in configured to hold a plurality of nucleic acid synthesis columns, and wherein said cartridge is further configured to provides seals between said cartridge and each of said plurality of nucleic acid synthesis columns so as to maintain pressure in said chamber during a purging operation to purge liquid reagent from said plurality of synthesis columns. In some embodiments, each of the seals between the cartridge and the plurality of nucleic acid synthesis columns is provided by an O-ring.

In some embodiments, the present invention provides a nucleic acid synthesizer comprising a plurality of synthesis columns and an energy input component that imparts energy to said plurality of synthesis columns to increase nucleic acid synthesis reaction rate in said plurality of synthesis columns. In some embodiments, said energy input component comprises a heating component. In preferred embodiments, said heating component provides substantially uniform heat. In some embodiments, said energy input component provides heated reagent solutions to said plurality of synthesis columns. In other embodiments, said energy input component comprises a heating coil. In yet other embodiments, said energy input component comprises a heat blanket. In yet other embodiments, said heating component comprises a resistance heater, a Peltier device, a magnetic induction device or a microwave device. In still other embodiments, said energy input component comprises a heated room. In further embodiments, said energy input component provides energy in the electromagnetic spectrum. In yet other embodiments, said energy input component comprises an oscillating member. In some embodiments, said energy input component provides a periodic energy input, and in other embodiments, said energy input component provides a constant energy input.

In some preferred embodiments, said energy input heats said plurality of synthesis columns in the range of about 20 to about 60 degrees Celsius.

In some embodiments, the present invention provides a nucleic acid synthesizer comprising a fail-safe reagent delivery component configured to deliver one or more reagent solutions to said plurality of synthesis columns. In some embodiments, the fail-safe reagent delivery component comprises a plurality of reagent tanks. In preferred embodiments, said plurality of reagent tanks comprise one or more tanks selected from the group consisting of acetonitrile tanks, phosphoramidite tanks, argon gas tanks, oxidizer tanks, tetrazole tanks, and capping solution tanks. In some particularly preferred embodiments, said reagent tanks comprise a plurality of large volume containers, each said large volume container comprising at least one of said reagent solutions. In some embodiments, the present invention provides high-throughput oligonucleotide production systems comprising: an oligonucleotide synthesizer array, wherein the oligonucleotide synthesizer array comprises at least 5 oligonucleotide synthesizers. In preferred embodiments, the oligonucleotide synthesizer array comprises at least 10 or at least 100 oligonucleotide synthesizers. In certain embodiments, the system further comprises a centralized control network operably linked to the oligonucleotide synthesizer component.

In particular embodiments, the present invention provides methods for the high through-put production of oligonucleotides comprising: a) providing an oligonucleotide synthesizer array; and b) generating a high through-put quantity of oligonucleotides with the oligonucleotide synthesizer array, wherein the high through-put quantity comprises at least 1 per hour (e.g. at least 1, 10, 100, 1000, etc, per hour).

The present invention provides a production facility comprising an array of synthesizers. In some embodiments, the production facility of the present invention comprises a fail-safe reagent delivery system. In other embodiments, the production facility of the present invention comprises a centralized waste collection system. In yet other embodiments, the production facility of the present invention comprises a centralized control system. In preferred embodiments, the production facility of the present invention comprises a fail-safe reagent delivery system, a centralized waste collection system and a centralized control system.

In some embodiments, the present invention provides an automated production process. In some embodiments, the automated production process includes an oligonucleotide synthesizer component and an oligonucleotide-processing component.

The present invention also provides integrated systems that link nucleic acid synthesizers to other nucleic acid production components. For example, the present invention provides a system comprising a nucleic acid synthesizer and a cleavage and deprotect component. In some embodiments, the synthesizer is configured for parallel synthesis of nucleic acid molecules in three or more synthesis columns. In some embodiments, the system further comprises sample tracking software configured to associate sample identification tags (e.g., electronic identification numbers, barcodes) with samples that are processed by the nucleic acid synthesizer and the cleavage and deprotect component. In some preferred embodiments, the sample tracking software is further configured to receive synthesis request information from a user, prior to sample processing by the nucleic acid synthesizer. In some embodiments, the system further comprises a robotic component configured to transfer columns from the nucleic acid synthesizer to the cleavage and deprotect component. In other preferred embodiments, the robotic component is further configured to transfer the columns from the cleavage and deprotect component to a purification component and/or to additional production components described herein.

The present invention also provides control systems for operating one or more components of the systems of the present invention. For example, the present invention provides a system comprising a processor, wherein the processor is configured to operate a nucleic acid synthesizer for parallel synthesis of three or more nucleic acid molecules. The present invention further provides a system comprising a processor, wherein said processor is configured to operate a nucleic synthesizer and a cleavage and deprotect component. In some embodiments, the system further comprises a computer memory, wherein the computer memory comprises nucleic acid sample order information (e.g., information obtained from a user specifying the identity of a polymer to be synthesized and/or specifying one or more characteristics of the polymer such as sequence information). In some embodiments, the computer memory further comprises allele frequency information and/or disease association information.

In some embodiments, the present invention provides oligonucleotide synthesizers comprising a reaction chamber and a lid, wherein in an open position, the lid provides a substantially enclosed ventilated workspace. In certain embodiments, the present invention provides methods of protecting an operator of an oligonucleotide synthesizer comprising channeling ambient air away from an operator toward an interior space of the synthesizer (e.g. down through the top surface, or up through the top cover). In other embodiments, the present invention provides apparatuses comprising, in combination, an oligonucleotide synthesizer and a venting hood. In some embodiments, the apparatuses are for production of oligonucleotides, wherein the apparatus comprises a venting component configured to draw air away from a reaction chamber of the apparatus. In certain embodiments, the present invention provides systems comprises a plurality of oligonucleotide apparatuses (e.g. e.g. at least 100 synthesizers).

In particular embodiments, the present invention provides a polymer synthesizer comprising a ventilated workspace. In some embodiments, certain embodiments, the polymer synthesizer is a nucleic acid synthesizer. In certain embodiments, the synthesizer comprises a top enclosure, wherein the top enclosure comprises a top plate with a ventilation opening, wherein the top enclosure is configured for attachment to a top cover of a synthesizer to form a primarily enclosed space over the top cover. In other embodiments, the synthesizer comprises a base, wherein the base comprises a primarily enclosed space and a ventilation opening.

In certain embodiments, the top plate is configured for attachment to a ventilation tube such that air in the primarily enclosed space may be drawn through the ventilation opening into the ventilation tube. In other embodiments, the top plate further comprises an outer window, and wherein the ventilation opening is formed in the outer window. In certain embodiments, the top enclosure further comprises at least four sides (e.g. 4 sides, 5 sides, etc.). In certain embodiments, the top cover further comprises a ventilation slot.

In certain embodiments, the present invention provides polymer synthesizer (e.g. nucleic acid synthesizer) comprising; a) a top cover with a ventilation slot, and b) a top enclosure, wherein the top enclosure comprises a top plate with a ventilation opening, and wherein the top enclosure is attached to the top cover to form a primarily enclosed space above the top cover.

In certain embodiments, the present invention provides a lid enclosure comprising; a) a top cover with a ventilation slot, and b) a top enclosure, wherein the top enclosure comprises a top plate with a ventilation opening, and wherein the top enclosure is attached to the top cover to form a primarily enclosed space over the top cover. In certain embodiments, the top plate is configured for attachment to a ventilation tube. In particular embodiments, the top plate is configured for attachment to a ventilation tube such that air in the primarily enclosed space may be drawn through the ventilation opening into the ventilation tube. In other embodiments, the top cover is configured to attach to a top surface of a nucleic acid synthesizer with a chamber bowl.

In some embodiments, the ventilation slot is configured such that air in the chamber bowl may drawn in through the ventilation slot and into the primarily enclosed space. In other embodiments, the top plate further comprises an outer window, and wherein the ventilation opening is formed in the outer window. In certain embodiments, the top enclosure further comprises at least four sides.

In certain embodiments, the present invention provides a polymer synthesizer (e.g., nucleic acid synthesizer) comprising; a) a top surface of a nucleic acid synthesizer, b) a lid enclosure comprising; i) a top plate with a ventilation opening, and ii) a top cover with a ventilation slot; and wherein the lid enclosure is attached to the top surface. In some embodiments, the lid enclosure is attached to the top surface by at least one hinge such that the lid enclosure may be raised and lowered. In certain embodiments, the present invention provides systems comprises a plurality of the polymer synthesizers (e.g. e.g. at least 100 synthesizers).

In some embodiments, the present invention provides side panels configured to extend between at least one side of a top cover (or lid enclosure) and a top surface of a nucleic acid synthesizer such that a barrier to air is created on at least one side of the synthesizer when the top cover is extended upward from the top surface. In other embodiments, the present invention provides a panel (e.g. front panel or side panel) configured to extend at least part way between at least one side of a top cover (or lid enclosure) and a top surface of a nucleic acid synthesizer such that at least a partial barrier to air is created on at least one side of the synthesizer when the top cover is extended upward such that it is not in contact with the top surface.

In other embodiments, the present invention provides polymer synthesizers (e.g. nucleic acid synthesizers) summary comprising; a) a top surface of a nucleic acid synthesizer, b) a lid enclosure comprising; i) a top plate with a ventilation opening, ii) a top cover with a ventilation slot; and iii) at least one top enclosure side; and c) a panel; wherein the lid enclosure is attached to the top surface by at least one hinge such that the lid enclosure may be raised and lowered, and wherein the panel is configured to extend (at least part way) between the at least one top enclosure side and the top surface such that at least a partial barrier to air is created when the lid enclosure is extended upward from the top surface. In certain embodiments, the present invention provides systems comprises a plurality of the polymer synthesizers (e.g. e.g. at least 100 synthesizers).

In particular embodiments, the present invention provides systems comprising; a) a ventilation tube, and b) a lid enclosure comprising; a) a top cover with a ventilation slot, and b) a top enclosure comprising a top plate with a ventilation opening, wherein the top enclosure is attached to the top cover to form a primarily enclosed space over the top cover. In some embodiments, the systems further comprise a vacuum source (e.g. centralized vacuum system).

In certain embodiments, the top plate is configured for attachment to the ventilation tube. In other embodiments, the ventilation tube is configured for attachment to the vacuum source. In particular embodiments, the system further comprises a synthesis and purge component, the synthesis and purge component comprising a cartridge and a drain plate separated by a drain plate gasket, wherein the cartridge is configured to hold a plurality of nucleic acid synthesis columns. In some embodiments, the systems further comprise a plurality of dispense lines, wherein the plurality of dispense lines are located in the primarily enclosed space.

In certain embodiments, the systems further comprise at least one side panel, wherein the at least one side panel is configured to extend between at least one side of the lid enclosure and a top surface of a nucleic acid synthesizer (e.g., such that a barrier to air is created on at least one side of the synthesizer when the top cover is extended upward from the top surface).

In some embodiments, the present invention provides systems comprising; a) a nucleic acid synthesizer comprising; i) a top surface, and ii) a top cover comprising a ventilation slot, wherein the top cover is attached to the top surface by at least one hinge such that the top surface may be raised and lowered; and b) a panel configured to extend at least part way between at least one side of the top cover and the top surface such that at least a partial barrier to air is created on at least one side of the nucleic acid synthesizer when the top cover is extended upward. In other embodiments, the panel is configured to fully extend between the at least one side of the top cover and the top surface such that a complete barrier to air is created on at least one side of the nucleic acid synthesizer when the top cover is extended upward. In some embodiments, the panel comprises a side panel or a front panel.

In certain embodiments, the system further comprises a top enclosure, wherein the top enclosure comprises a top plate with a ventilation opening, and wherein the top enclosure is attached to the top cover to form a primarily enclosed space over the top cover. In other embodiments, the system further comprises a ventilation tube. In particular embodiments, the system further comprises a vacuum source. In other embodiments, the vacuum source comprises a centralized vacuum system. In particular embodiments, the top plate is configured for attachment to the ventilation tube. In certain embodiments, the ventilation tube is configured for attachment to the vacuum source.

In some embodiments, the present invention provides methods comprising forming a ventilation opening in a top plate of a top enclosure such that the top plate is configured for attachment to a ventilation tube. In certain embodiments, the present invention provides methods comprising; a) providing; i) a top enclosure comprising a top plate, and ii) a ventilation tube; and b) forming a ventilation opening in the top plate, and c) attaching the ventilation tube to the top plate such that the ventilation tube forms a seal around the ventilation opening. In further embodiments, the methods further comprise step d) attaching a least one panel to the top enclosure.

In other embodiments, the present invention provides methods comprising; a) providing; i) a top cover of a nucleic acid synthesizer comprising a ventilation slot, wherein the top cover is configured to be attached to a top surface of a nucleic acid synthesizer such that the top surface may be raised and lowered; and ii) a top enclosure, wherein the top enclosure comprises a top plate with a ventilation opening, and b)

attaching the top enclosure to the top cover such that a primarily enclosed space is formed over the top cover. In other embodiments, the methods further comprise the step of attaching at least one panel to the top enclosure (or the top cover), wherein the at least one panel extends at least part way between at least one side of the top cover (or the top cover) and the top surface such that at least a partial barrier to air is created on at least one side of the synthesizer when the top cover is extended upward such that it is not in contact with the top surface.

In particular embodiments, the present invention provides methods comprising; a) providing; i) a nucleic acid synthesizer comprising; i) a top cover with a ventilation slot, and ii) a top enclosure, wherein the top enclosure comprises a top plate with a ventilation opening, wherein the top enclosure is attached to the top cover to form a primarily enclosed space above the top cover, and wherein the top plate is attached to a ventilation tube such that the ventilation tube forms a seal around the ventilation opening, and ii) a vacuum source attached to the ventilation tube, and b) activating the vacuum source such that air is drawn into the ventilation slot, through the primarily open space, and out through the ventilation opening into the ventilation tube.

In some embodiments, the present invention provides kits comprising; a) a top enclosure comprising a top plate with a ventilation opening, wherein the top enclosure is configured for attachment to a top cover of a synthesizer to form a primarily enclosed space over the top cover, and b) a printed material component, wherein the printed material component comprises written instruction for installing the top enclosure onto the top cover.

In other embodiments, the present invention provides kits comprising; a) a panel configured to extend at least part way between at least one side of a top cover (or lid enclosure) and a top surface of a nucleic acid synthesizer such that at least a partial barrier to air is created on at least one side of the synthesizer when the top cover is extended upward such that it is not in contact with the top surface, and b) a printed material component, wherein the printed material component comprises written instructions for installing the panel onto a top cover (or lid enclosure).

DESCRIPTION OF THE DRAWINGS

FIGS. 21A and 21B provide cross sectional views of an exemplary synthesizer having a lid enclosure 102, and illustrate air flow 109 toward the ventilation tubing 103 when the lid enclosure 102 is in a closed or opened position, respectively.

FIGS. 22A and 22B provide cross sectional views of an exemplary synthesizer having a primarily enclosed space in a base 2, and illustrate air flow 109 toward the ventilation tubing 103 when the lid enclosure 102 is in a closed or opened position, respectively.

GENERAL DESCRIPTION OF THE INVENTION

Figure 1:
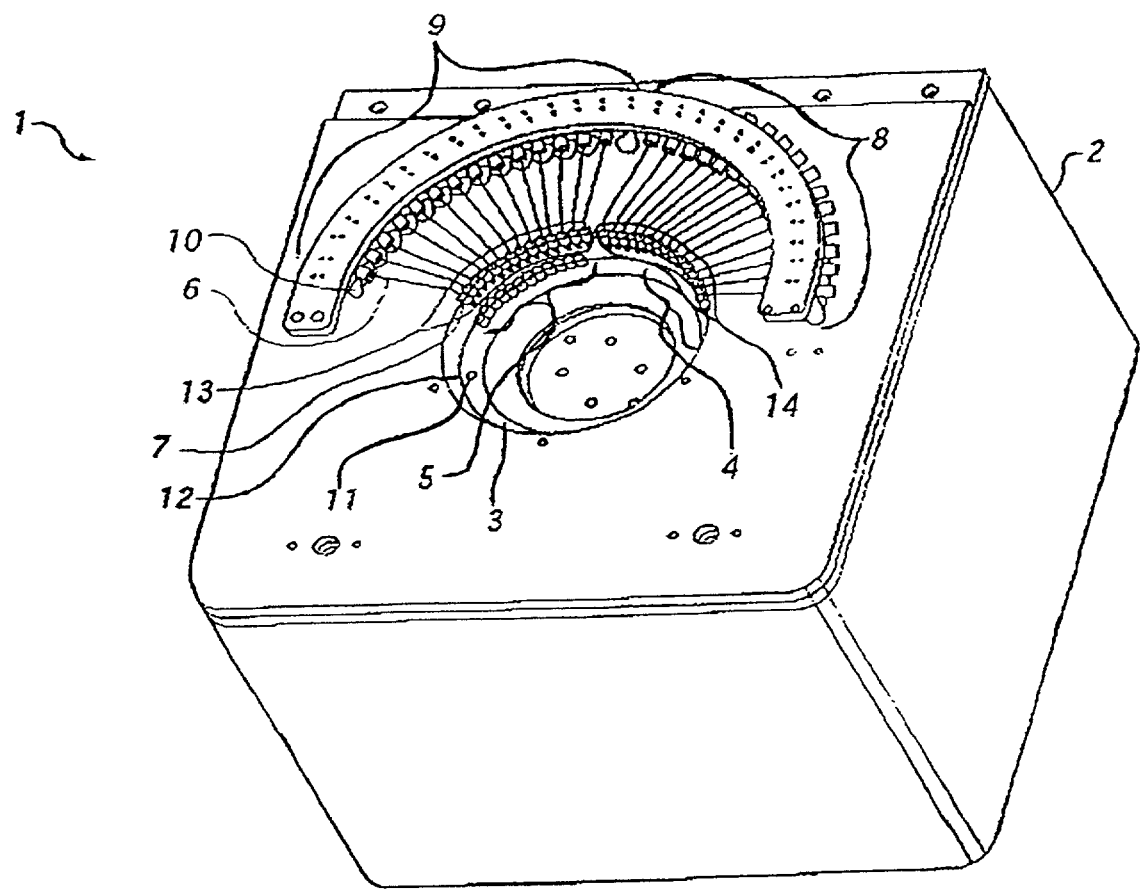
FIG. 1 illustrates a perspective view of an exemplary synthesizer.

The present invention relates to nucleic acid synthesizers and methods of using and modifying nucleic acid synthesizers. For example, the present invention provides highly efficient, reliable, and safe synthesizers that find use, for example, in high throughput and automated nucleic acid synthesis (e.g. arrays of synthesizers), as well as methods of modifying pre-existing synthesizers to improve efficiency, reliability, and safety.

A problem with currently available synthesizers is the emission of undesirable gaseous or liquid materials that pose health, environmental, and explosive hazards. Such emissions result from both the normal operation of the instrument and from instrument failures. Emissions that result from instrument failures cause a reduction or loss of synthesis efficiency and can provoke further failures and/or complete synthesizer failure. Correction of failures may require taking the synthesizer off-line for cleaning and repair. The present invention provides nucleic acid synthesizers with components that reduce or eliminate unwanted emissions and that compensate for and facilitate the removal of unwanted emissions, to the extent that they occur at all. The present invention also provides waste handling systems to eliminate or reduce exposure of emissions to the users or the environment. Such systems find use with individual synthesizers, as well as in large-scale synthesis facilities comprising many synthesizers (e.g. arrays of synthesizers).

In some particularly preferred embodiments, the present invention provides efficient and safe "open system synthesizers." Open system synthesizers are contrasted to "closed system synthesizers" in that the reagent delivery, synthesis compartments, and waste extraction for each synthesis column are not contained in a system that remains physically closed (i.e., closed from both the ambient environment and from the other synthesis columns in the same instrument) for the duration of the synthesis run. For example, in a closed system, tubing (or other means) provided for the addition and removal of reagent to each reaction compartment or synthesis column is generally fixed to the column with a coupling that is sealed to isolate the contents of that system from its surroundings. In contrast, in an open system, the dispensing and/or removal of reagent may be through means that are not physically coupled to the reaction compartment.

Further, a common dispensing or waste removal means may be shared by multiple reaction compartments, such that each compartment sharing the means is serviced in turn. An example of an "open system synthesizer" is described in PCT Publication WO 99/65602, herein incorporated by reference in its entirety. This publication describes a rotary synthesizer for parallel synthesis of multiple oligonucleotides. The tubing that supplies the synthesis reagents to the synthesis column does not form a continuous closed seal to the synthesis columns. Instead, the rotor turns, exposing the synthesis columns, in series, to the dispense lines, which inject synthesis reagents into the synthesis column. Open synthesizers offer advantages over closed synthesizers for the simultaneous production of multiple oligonucleotides. For example, a large number of independent synthesis columns, each intended to produce a distinct oligonucleotide, are exposed to a smaller number of dedicated reagent dispensers (e.g., four dedicated dispensers for each of the nucleotides). Open systems also provide easy access to synthesis columns, which can be added or removed without detaching any otherwise fixed connections to reagent dispensing tubing.

While open synthesizers have advantages for the production of oligonucleotides, they suffer from increased problems of emissions and failures. The direct exposure of the columns to their surroundings and the non-continuous path of reagents increases the number of points at which gaseous and liquid emissions occur, thereby increasing the release of unwanted emissions to the atmosphere and leakage within the synthesizer. Many synthesizers carry out reagent delivery, nucleic acid synthesis, and waste disposal under pressurized conditions. Open systems have frequent problems with loss of pressure, resulting in instrument failures and/or loss of synthesis efficiency. The open system synthesizers of the present invention dramatically reduce instrument failures and the corresponding emissions.

Whether a system used is open or closed, oligonucleotide synthesis involves the use of an array of hazardous materials, including but not limited to methylene chloride, pyridine, acetic anhydride, 2,6-lutidine, acetonitrile, tetrahydrofurane, and toluene. These reagents can have a variety of harmful effects on those who may be exposed to them. They can be mildly or extremely irritating or toxic upon short-term exposure; several are more severely toxic and/or carcinogenic with long-term exposure. Many can create a fire or explosion hazard if not properly contained. In addition, many of these chemicals must be assessed for emissions from normal operations, e.g for determining compliance with OSHA or environmental agency standards. Malfunction of a system, e.g., as recited above, increases such emissions, thereby increasing the risk of operator exposure, and increasing the risk that an instrument may need to be shut down until risk to an operator is reduced and until any regulatory requirements for operation are met.

Emission or leakage of reagents during operation can have consequences beyond risks to personnel and to the environment. As noted above, instruments may need to be removed from operation for cleaning, leading to a temporary decrease in production capacity of a synthesis facility. Further, any emission or leakage may cause damage to parts of the instrument or to other instruments or aspects of the facility, necessitating repair or replacement of any such parts or aspects, increasing the time and cost of bringing an instrument back into operation. Failure to address emissions or leakage concerns may lead to additional expenses for operation of a facility, e.g., costs for increased or improved fire or explosion containment measures, and addition of costs associated with the elimination of any instrument systems or wiring that have not been determined to be safe for use in such hazardous locations (e.g., by reference to controlling codes, such as electrical codes, or codes covering operations in the presence of flammable and combustible liquids).

The synthesizers of the present invention provide a number of novel features that dramatically improve synthesizer performance and safety compared to available synthesizers. These novel features work both independently and in conjunction to provide enhanced performance. For example, in some embodiments, the synthesizers of the present invention prevent loss of pressure during synthesis and waste disposal. By preventing loss of pressure, synthesis columns are purged properly and do not overflow during subsequent synthesis steps. Thus, prevention of pressure loss further prevents liquid overflow and instrument contamination. Additionally, in some embodiments, sufficient pressure differentials are maintained across all columns to allow efficient synthesis and purging without instrument failure. For example, regardless of whether synthesis columns are actively involved in a particular round of synthesis (e.g., short oligonucleotides will be completed prior to the completion of longer oligonucleotides and will not be actively synthesized during the later round of synthesis), sufficient pressure differentials are maintained to allow reagent delivery and purging from the active columns. A number of additional features of the synthesizers of the present invention are described in detail below.

In addition to providing efficient synthesizers, the present invention provides methods for modifying existing synthesizers to improve their efficiency. For example, one or more of the novel components of the present invention may be added into or substituted into existing synthesizers to improve efficiency and performance.

The present invention further provides means of reducing exposure of operators and the environment to synthesis reagents and waste. In one embodiment, the present invention reduces exposure by improving collection and disposal of emissions that occur during the normal operation of various synthesis instruments. In another embodiment, the present invention reduces exposure by improving aspects of the instrument to reduce risk of malfunctions leading to reagent escape from the system, e.g., through leakage, overflow or other spillage. In yet another embodiment, the present invention reduces exposure by providing an integrated ventilation system, e.g. an integrated fume hood, such that even when an instrument is opened (e.g., when the lid or top cover is opened), fumes are collected into a ventilation system, thereby reducing emission into the ambient environment.

DEFINITIONS

To facilitate an understanding of the present invention, a number of terms and phrases are defined below:

As used herein, the term "coupled," as in "coupled attachment," refers to attachments between objects that do not, by themselves, provide a pressure-tight seal. For example, two metal plates that are attached by screws or pins may comprise a coupled attachment. While the two plates are attached, the seam between them does not form a pressure-tight seal (i.e., gas and/or liquid can escape through the seam).

As used herein, the terms "centralized control system" or "centralized control network" refer to information and equipment management systems (e.g., a computer processor and computer memory) operable linked to a module or modules of equipment (e.g., DNA synthesizer or a computer operably linked to a DNA synthesizer).

As used herein the terms "processor" and "central processing unit" or "CPU" are used interchangeably and refer to a device that is able to read a program from a computer memory (e.g., ROM or other computer memory) and perform a set of steps according to the program.

As used herein, the terms "computer memory" and "computer memory device" refer to any storage media readable by a computer processor. Examples of computer memory include, but are not limited to, RAM, ROM, computer chips, digital video disc (DVDs), compact discs (CDs), hard disk drives (HDD), flash (solid state) recording media and magnetic tape.

As used herein, the term "synthesis and purge component" refers to a component of a synthesizer containing a cartridge for holding one or more synthesis columns attached to or connected to a drain plate for allowing waste or wash material from the synthesis columns to be directed to a waste disposal system.

As used herein, the term "cartridge" refers to a device for holding one or more synthesis columns. For example, cartridges can contain a plurality of openings (e.g., receiving holes) into which synthesis columns may be placed. "Rotary cartridges" refer to cartridges that, in operation, can rotate with respect to an axis, such that a synthesis column is moved from one location in a plane (a reagent dispensing location) to another location in the plane (a non-reagent dispensing location) following rotation of the cartridge.

As used herein, the term "nucleic acid synthesis column" or "synthesis column" refers to a container or chamber in which nucleic acid synthesis reactions are carried out. For example, synthesis columns include plastic cylindrical columns and pipette tip formats, containing openings at the top and bottom ends. The containers may contain or provide one or more matrices, solid supports, and/or synthesis reagents necessary to carry out chemical synthesis of nucleic acids. For example, in some embodiments of the present invention, synthesis columns contain a solid support matrix on which a growing nucleic acid molecule may be synthesized. Nucleic acid synthesis columns may be provided individually; alternatively, several synthesis columns may be provided together as a unit, e.g., in a strip or array, or as device such as a plate having a plurality of suitable chambers. Columns may be constructed of any material or combination of materials that do not adversely affect (e.g., chemically) the synthesis reaction or the use of the synthesized product. For example, columns or chambers may comprise polymers such as polypropylene, fluoropolymers such as TEFLON, metals and other materials that are substantially inert to synthesis reaction conditions, such as stainless steel, gold, silicon and glass. In some embodiments, chambers comprise a coating of such a suitable material over a structure comprising a different material.

As used herein, the term "seal" refers to any means for preventing the flow of gas or liquid through an opening. For example, a seal may be formed between two contacted materials using grease, O-rings, gaskets, and the like. In some embodiments, one or both of the contacted materials comprises an integral seal, such as, e.g., a ridge, a lip or another feature configured to provide a seal between said contacted materials. An "airtight seal" or "pressure tight seal" is a seal that prevents detectable amounts of air from passing through an opening. A "substantially airtight" seal is a seal that prevents all but negligible amounts of air from passing through an opening. Negligible amounts of air are amounts that are tolerated by the particular system, such that desired system function is not compromised. For example, a seal in a nucleic acid synthesizer is considered substantially airtight if it prevents gas leaks in a reaction chamber, such that the gas pressure in the reaction chamber is sufficient to purge liquid in synthesis columns contained in the reaction chamber following a synthesis reaction. If gas pressure is depleted by a leak such that synthesis columns are not purged (e.g., resulting in overflow during subsequent synthesis rounds), then the seal is not a substantially airtight seal. A substantially airtight seal can be detected empirically by carrying out synthesis and checking for failures (e.g., column overflows) during one or a series of reactions.

As used herein, the term "sealed contact point" refers to sealed seams between two or more objects. Seals on sealed contact points can be of any type that prevent the flow of gas or liquid through an opening. For example, seals can sit on the surface of a seam (e.g., a face seal) or can be placed within a seam, such that a circumferential contact is created within the seam.

As used herein, the term "alignment detector" refers to any means for detecting the position of an object with respect to another object or with respect to the detector. For example, alignment detectors may detect the alignment of a dispensing end of a dispensing device (e.g., a reagent tube, a waste tube, etc.) to a receiving device (e.g., a synthesis column, a waste valve, etc.). Alignment detectors may also detect the tilt angle of an object (e.g., the angle of a plane of an object with respect to a reference plane). For example, the tilt angle of a plate mounted on a shaft may be detected to ensure a proper perpendicular relationship between the plate and the shaft. Alignment detectors include, but are not limited to, motion sensors, infra-red or LED-based detectors, and the like.

As used herein, the term "alignment markers" refers to reference points on an object that allow the object to be aligned to one or more other objects. Alignment markers include pictorial markings (e.g., arrows, dots, etc.) and reflective markings, as well as pins, raised surfaces, holes, magnets, and the like.

As used herein, the term "motor connector" refers to any type of connection between a motor and another object. For example a motor designed to rotate another object may be connected to the object through a metal shaft, such that the rotation of the shaft, rotates the object. The metal shaft would be considered a motor connector.

As used herein, the term "packing material" refers to material placed in a passageway (e.g., a synthesis column) in a manner such that it provides resistance against a pressure differential between the two ends of the passageway (i.e. hinders the discharge of the pressure differential). Packing material may comprise a single material or multiple materials. For example, in some embodiments of the present invention, packing material comprising a nucleic acid synthesis matrix (e.g., a solid support for nucleic acid synthesis such as controlled pore glass, polystyrene, etc.) and/or one or more frits are used in synthesis columns to maintain a pressure differential between the two ends of the synthesis column. Packing material may be distributed into the reaction chambers in a variety of forms. For example, synthesis support matrix may be provided as a granular powder. In some embodiments, support matrix may be provided in a "pill" form, wherein an appropriate amount of a support material is held together with a binder to form a pill, and wherein one or more pills are provided to a reaction chamber, as appropriate for the scale of the intended reaction, and further wherein the binder is removed or inactivated (e.g., during a wash step) to allow the powdered matrix to function in the same manner as an unbound powder. The use of a pill embodiment provides the advantages of facilitating the process of pre-measuring synthesis support materials, allowing easy storage of support matrices in a pre-measured form, and simplifying provision of measured amounts of synthesis support matrix to a reaction chamber.

As used herein, the term "idle," in reference to a synthesis column, refers to columns that do not take part in a particular synthesis reaction step of a nucleic acid synthesizer. Idle synthesis columns include, but are not limited to, columns in which no synthesis occurs at all, as well as columns in which synthesis has been completed (e.g., for short oligonucleotide) while other columns are actively undergoing additional synthesis steps (e.g., for longer oligonucleotides).

As used herein, the term "active," in reference to a synthesis column, refers to columns that take part (or are taking part) in a particular synthesis reaction step of a nucleic acid synthesizer. Active synthesis columns include, but are not limited to, columns in which liquid reagents are being dispensed into, or columns that contain liquid reagents (e.g. waiting to be purged), or columns that are in the process of being purged.

As used herein, the term "O-ring" refers to a component having a circular or oval opening to accommodate and provide a seal around another component having a circular or oval external cross-section. An O-ring will generally be composed of material suitable for providing a seal, e.g., a resilient air-or moisture-proof material. In some embodiments, an O-ring may be a circular opening in a larger gasket. A single gasket may contain multiple openings and thus provide multiple O-rings. In other embodiments, an O-ring may be ring-shaped, i.e., it may have circular interior and exterior surfaces that are essentially concentric.

As used herein, the term "viewing window" refers to any transparent component configured to allow visual inspection of an item or material through the window. An enclosure may include a transparent portion that provides a viewing window for item within the disclosure. Likewise, an enclosure may be made entirely of a transparent material. In such embodiments, the entire enclosure can be considered a viewing window. A "viewing window" in an enclosure that is "configured to allow visual inspection" of items in the enclosure "without opening the enclosure" refers to a viewing window in an enclosure of sufficient size, location, and transparency to allow the item to be viewed, unhindered, by the human eye. For example, where the item is one or more reagent bottles, the window is configured to allow viewing of the reagents bottles by the human eye to determine if the bottles or full or empty. A window that does not provide adequate visual inspection of each of the reagent bottles is not configured to allow visual inspection of reagents in the enclosure without opening the enclosure.

As used herein, the term "enclosure" refers to a container that separates materials contained in the enclosure from the ambient environment (e.g., as in a sealed system). For example, an enclosure may be used with a reagent station to contain reagents within an interior chamber of the enclosure, and therefore separate the reagents from the ambient environment. In some embodiments, the enclosure provides an airtight or substantially airtight seal between the interior and exterior of the enclosure. The enclosure may contain one or more valves (e.g., ventilation ports), doors, or other means for allowing gasses or other materials (e.g., reagent bottles) to enter or leave the interior environment of the enclosure.

As used herein, the term "reaction enclosure" refers to an enclosure that separates the reaction columns or other reaction vessels (e.g., microplates) from the ambient environment. For example, a chamber bowl 18 closed with a top cover 30 and sealed with a chamber seal 31 is one exemplary embodiment of a reaction enclosure. Another example of a reaction enclosure is a synthesis case, e.g., as provided with a POLYPLEX synthesizer (GeneMachines, San Carlos, Calif.) and with the synthesizers described in WO 00/56445. In preferred embodiments, reaction enclosures can be sealed during at least one step of operation (e.g., during active synthesis) and can be opened for at least one step of operation (e.g., for inserting or removing reaction vessels).

As used herein, the term "top enclosure" refers to an enclosure that forms a primarily enclosed space over the top cover. In preferred embodiments, the top enclosure has four sides (e.g., four top enclosure sides, e.g., 98) and a top panel (e.g., 97) that form a primarily enclosed space (e.g. 104) above the top cover (e.g., 30) containing a plurality of valves (e.g., 10) and a plurality of dispense lines (e.g., 6). In some embodiments, the primarily enclosed space (e.g., 104) is open to the ambient environment through a ventilation slot (e.g., 100l) in the top cover or the top enclosure. In certain embodiments, the top panel (e.g., 99) contains an outer window (e.g., 101).

Also as used herein, the combination of a "top enclosure" and "top cover" (e.g., formed as one unit, or connected together) is referred to collectively as the "lid enclosure". In preferred embodiments, the "lid enclosure" (e.g., 102l) has six sides, with the top cover (e.g., 30) serving as the "bottom", the top panel serving as the surface opposite the top cover, and the four side walls being the top enclosure sides (e.g., 98). In certain embodiments, the lid enclosure is hinged so that is may be moved upward and downward.

As used herein, the term "primarily enclosed space" refers to a space having reduced contact with the ambient environment. A primarily enclosed space need not be sealed. For example, in some embodiments, a primarily enclosed space 104 of a lid enclosure of the present invention has contact with the ambient environment through a ventilation slot (e.g., 100). In some embodiments, a primarily enclosed space 104 of a synthesizer base 2 has contact with the ambient environment through a ventilation slot (e.g., 100)

As used herein, the term "ventilated workspace" refers to a work area that is open to the ambient environment but that is maintained under negative air pressure such that air flows into the ventilated workspace, thereby reducing or preventing the flow of fumes and emissions from the ventilated workspace into the ambient environment. One example of a ventilated workspace is a fume hood (e.g. a chemical fume hood). In some embodiments, the ventilated workspace that is part of an apparatus (e.g., a nucleic acid synthesizer), such that the negative air pressure is maintained over a reaction chamber to draw air away from the reaction chamber so as to prevent the air from entering the ambient environment.

DETAILED DESCRIPTION OF THE INVENTION

While the present invention will be described with reference to several specific embodiments, the description is illustrative of the present invention and is not to be construed as limiting the invention. Various modifications to the present invention can be made without departing from the scope and spirit of the present invention. For example, much of the following description is provided in the context of an open system synthesizer (see, e.g., WO99/65602). However, the invention is not limited to open system synthesizers.

In preferred embodiments, the present invention provides open-system solid phase synthesizers that are suitable for use in large-scale polymer production facilities. Each synthesizer is itself capable of producing large volumes of polymers.

However, the present invention provides systems for integrating multiple synthesizers into a production facility, to further increase production capabilities. The description is provided in the following sections: I) Synthesizers and II) Production Facilities I) Synthesizers FIG. 1 illustrates a synthesizer 1. The synthesizer 1 is designed for building a polymer chain by sequentially adding polymer units to a solid support in a liquid reagent. The liquid reagents used for synthesizing oligonucleotides may vary, as the successful operation of the present invention is not limited to any particular coupling chemistry. Examples of suitable liquid reagents include, but are not limited to: Acetonitrile (wash); 2.5% dichloroacetic acid in methylene chloride (deblock); 3% tetrazole in acetonitrile (activator); 2.5% cyanoethyl phosphoramidite in acetonitrile (A, C, G, T); 2.5% iodine in 9% water, 0.5% pyridine, 90.5% THF (oxidizer); 10% acetic anhydride in tetrahydrofuran (CAP A); and 10% 1-methylimidazole, 10% pyridine, 80% THF. Various useful reagents and coupling chemistries are described in U.S. Pat. No. 5,472,672 to Bennan, and U.S. Pat. No. 5,368,823 to McGraw et al. (both of which are herein incorporated by reference in their entireties).

The solid support generally resides within a synthesis column and various liquid reagents are sequentially added to the synthesis column. Before an additional liquid reagent is added to a synthesis column, the previous liquid reagent is preferably purged from the synthesis column. Although the synthesizer 1 is particularly suited for building nucleic acid sequences, the synthesizer 1 is also configured to build any other desired polymer chain or organic compound (e.g. peptide sequences).

The synthesizer 1 preferably comprises at least one bank of valves and at least one bank of synthesis columns. Within each bank of synthesis columns, there is at least one synthesis column for holding the solid support and for containing a liquid reagent such that a polymer chain can be synthesized. Within the bank of valves, there are preferably a plurality of valves configured for selectively dispensing a liquid reagent into one of the synthesis columns. The synthesizer 1 is preferably configured to allow each bank of synthesis columns to be selectively purged of the presently held liquid reagent. In particularly preferred embodiments, the synthesizer of the present invention is configured to allow synthesis columns within a bank to be purged even when not all of the synthesis columns contain liquid reagents (e.g. only a portion of the synthesis columns in a bank received a liquid reagent (i.e. "active"), while the remaining synthesis columns are no longer receiving liquid reagent (i.e. "idle"). For example, in some preferred embodiments of the present invention, the design of the material in the synthesis columns allows idle columns to resist the downward pressure of gas, thus making this pressure available to purge the synthesis columns that contain liquid reagent. Additional banks of valves provide the synthesizer 1 with greater flexibility. For example, each bank of valves can be configured to distribute liquid reagents to a particular bank of synthesis columns in a parallel fashion to minimize the processing time.

Multiple banks of valves can also be configured to distribute liquid reagents to a particular bank of synthesis columns in series. This allows the synthesizer 1 to hold a larger number of different reagents, thus being able to create varied nucleic acid sequences (e.g. 48 oligonucleotides, each with a unique sequence).

FIG. 1 illustrates a top view of a rotary synthesizer 1. As illustrated in FIG. 1, the synthesizer 1 includes a base 2, a cartridge 3, a first bank of synthesis columns 4, a second bank of synthesis columns 5, a plurality of dispense lines 6, a plurality of fittings 7 (a first bank of fittings 13, and a second bank of fittings 14 ), a first bank of valves 8 and a second bank of valves 9. Within each of the banks of valves 8 and 9, there is preferably at least one valve. Within each of the banks of synthesis columns 4 and 5, there is preferably at least one synthesis column. Each of the valves is capable of selectively dispensing a liquid reagent into one of the synthesis columns. Each of the synthesis columns is preferably configured for retaining a solid support such as polystyrene or CPG and holding a liquid reagent. Further, as each liquid reagent is sequentially deposited within the synthesis column and sequentially purged therefrom, a polymer chain is generated (e.g. nucleic acid sequence).

Preferably, there is a plurality of reservoirs, each containing a specific liquid reagent to be dispensed to one of the plurality of valves 8 or 9. Each of the valves within the first bank and second bank of valves 8 and 9, is coupled to a corresponding reservoir. Each of the plurality of reservoirs is pressurized (e.g. by argon gas). As a result, as each valve is opened, a particular liquid reagent from the corresponding reservoir is dispensed to a corresponding synthesis column. Each of the plurality of dispense lines 6 is coupled to a corresponding one of the valves within the first and second banks of valves 8 and 9. Each of the plurality of dispense lines 6 provides a conduit for transferring a liquid reagent from the valve to a corresponding synthesis column. Each one of the plurality of dispense lines 6 is preferably configured to be flexible and semi-resilient in nature. In preferred embodiments, the dispense lines of the present invention have a large bore size to prevent clogging. In preferred embodiments, the internal diameter of the dispense tube is at least 0.25 mm. In other embodiments, the internal diameter of the tube is at least 0.50 mm or at least 0.75 mm. In some embodiments, the internal diameter of the tube is greater than or equal to 1.0 mm (e.g. 1.0 mm, or 1.2 mm, or 1.4 mm). Preferably, the plurality of dispense lines 6 are each made of a material such as PEEK, glass, or coated with TEFLON or Parlene, or coated/uncoated stainless steel or other metallic material. Of course other materials may also be used. For example, useful characteristics of the material used for the dispense lines would be resistance to degradation by the liquid reagents, minimal "wetting" by the liquid reagents, ease of fabrication, relative rigidity, and ability to be produced with a smooth surface finish. Metallic tubing (e.g. stainless steel), benefit from electropolishing to improve the surface finish (e.g. in coated or uncoated application). Another important characteristic of useful dispense lines in the ability to provide a seal between the plurality of valves 10 and the plurality of fittings 7.

Each of the plurality of fittings 7 is preferably coupled to one of the plurality of dispense lines 6. The plurality of fittings 7 are preferably configured to prevent the reagent from splashing outside the synthesis column as the reagent is dispensed from the fitting to a particular synthesis column positioned below the fitting. In preferred embodiments, the fitting includes a nozzle that prevents reagents from drying at the point fluid exits the nozzle (e.g. prevents dried reagents from causing the reagents stream to dispense at angles away from the intended synthesis column). Construction techniques to achieve consistent flow at the discharge point of the liquid reagents is achieved by the use of high quality parts and construction. For example, clean square cuts (without burrs or shavings), or the use of a "drawn tip" (i.e., a tip of reduced diameter at the discharge point). The use of a drawn tip, for example, reduces the wall thickness at the point of discharge, thus reducing the area of the tube wall cross section, providing a smooth transition from the larger portion of the tube (reducing flow resistance) and increases the likelihood of a clean separation of the discharged liquid reagent from the tip of the tube. This clean "snap" of the liquid reagent minimizes the retention of the discharged fluid at the tip, and thus minimizes subsequent build up of any solids (e.g. dried reagent). Additionally, if a sharp cut off of the fluid flow is obtained, the fluid front will actually reside within the confines of the tube after discharge of the desired volume. This minimizes surface evaporation and helps to maintain a clean orifice (e.g. prevent reagent from drying at the tip). Another example of a useful technique to prevent liquid reagent from drying at the discharge point is providing a sleeve or sheath over the dispense line to a point near the tip (dispense point). This sleeve or sheath is particularly useful when employed in conjunction with a relatively flexible dispense line.

As shown in FIG. 1, the first and second banks of valves 8 and 9 each have thirteen valves. In FIG. 1, the number of valves in each bank is merely for exemplary purposes (e.g. other numbers of valves maybe employed, like 14, 15, 16, 17, etc.).

Each of the synthesis columns within the first bank of synthesis columns 4 and the second bank of synthesis columns 5 is presently shown resting in one of a plurality of receiving holes 11 within the cartridge 3. Preferably, each of the synthesis columns within the corresponding plurality of receiving holes 11 is positioned in a substantially vertical orientation. Each of the synthesis columns is configured to retain a solid support such as polystyrene or CPG and hold liquid reagent(s). In preferred embodiments, polystyrene is employed as the solid support. Alternatively, any other appropriate solid support can be used to support the polymer chain being synthesized.

During synthesizer operation, each of the valves selectively dispenses a liquid reagent through one of the plurality of dispense lines 6 and fittings 7. The first and second banks of valves 8 and b 9 are preferably coupled to the base 2 of the synthesizer 1. The cartridge 3 which contains the plurality of synthesis columns 12 rotates relative to the synthesizer 1 and relative to the first and second banks of valves 8 and 9. By rotating the cartridge 3, a particular synthesis column 12 is positioned under a specific valve such that the corresponding reagent from this specific valve is dispensed into this synthesis column. In preferred embodiments, the cartridge 3 has a home position that allows the synthesizer to be properly aligned before operation (such that the liquid reagent is properly dispensed into the synthesis columns). Further, the first and second banks of valves 8 and 9 are capable of simultaneously and independently dispensing liquid reagents into corresponding synthesis columns.

Figure 2:
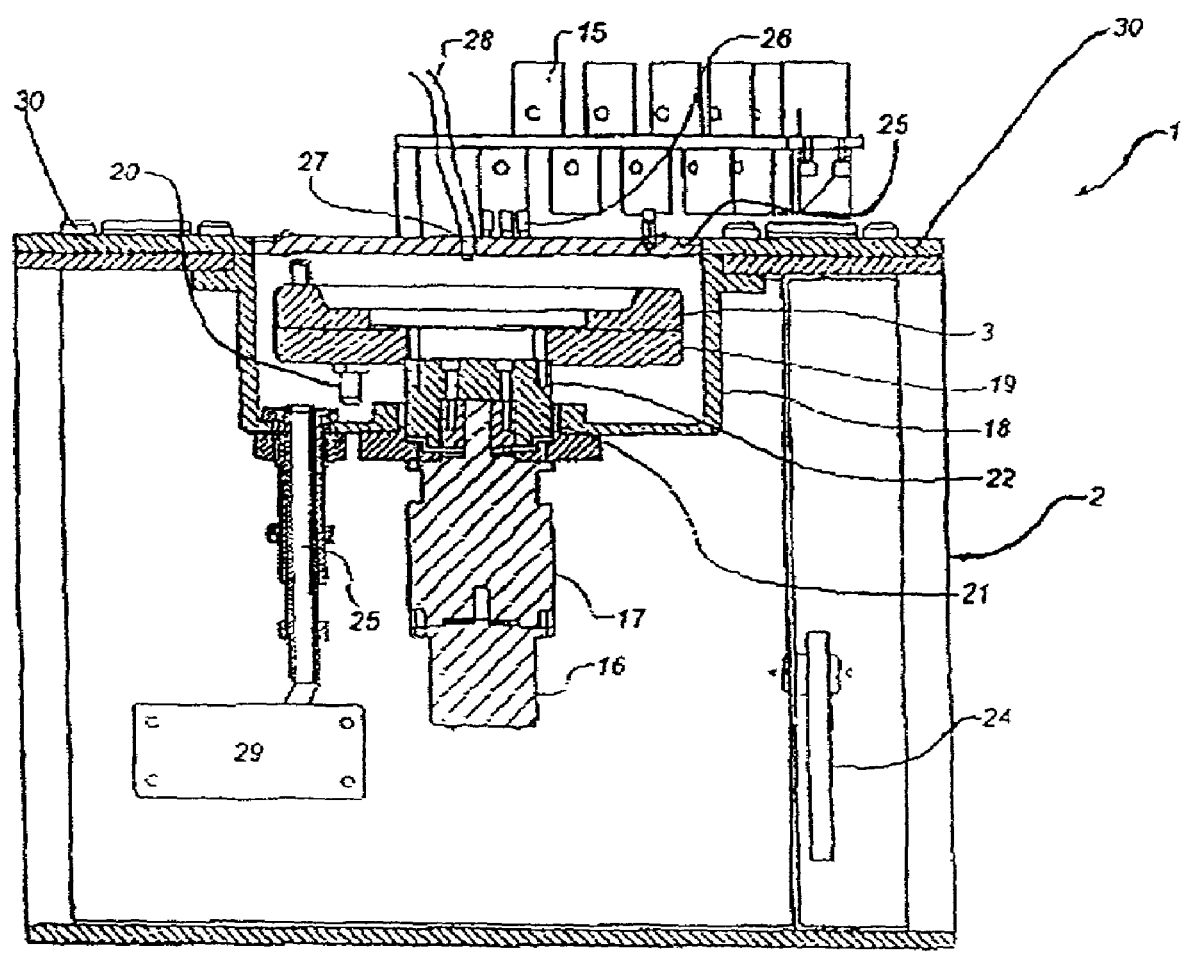
FIG. 2 illustrates a cross-sectional view of an exemplary synthesizer.

A cross sectional view of synthesizer 1 is depicted in FIG. 2. As depicted in FIG. 2, the synthesizer 1 includes the base 2, a set of valves 15, a motor 16, a gearbox 17, a chamber bowl 18, a drain plate 19, a drain 20, a cartridge 3, a bottom chamber seal 21, a motor connector 22, a waste tube system 23, a controller 24, and a clear window 25. The valves 15 are coupled to base 2 of the synthesizer 1 and are preferably positioned above the cartridge 3 around the outside edge of the base 2. This set of valves 15 preferably contains fifteen individual valves which each deliver a corresponding liquid reagent in a specified quantity to a synthesis column held in the cartridge 3 positioned below the valves. Each of the valves may dispense the same or different liquid reagents depending on the user-selected configuration. When more than one valve dispenses the same reagent, the set of valves 15 is capable of simultaneously dispensing a reagent to multiple synthesis columns within the cartridge 3. When the valves 15 each contain different reagents, each one of the valves 15 is capable of dispensing a corresponding liquid reagents to any one of the synthesis columns within the cartridge 3.

The synthesizer 1 may have multiple sets of valves. The plurality of valves within the multiple sets of valves may be configured in a variety of ways to dispense the liquid reagents to a select one or more of the synthesis columns. For example, in one configuration, where each set of valves is identically configured, the synthesizer 1 is capable of simultaneously dispensing the same reagent in parallel from multiple sets of valves to corresponding banks of synthesis columns. In this configuration, the multiple banks of synthesis columns may be processed in parallel. In the alternative, each individual valve within multiple sets of valves may contain entirely different liquid reagents such that there is no duplication of reagents among any individual valves in the multiple sets of valves. This configuration allows the synthesizer 1 to build polymer chains requiring a large variety of reagents without changing the reagents associated with each valve.

The motor 16 is preferably mounted to the base 2 through the gear box b 17 and the motor connector 22. The chamber bowl 18 preferably surrounds the motor connector 22 and remains stationary relative to the base 2.

Figure 9:
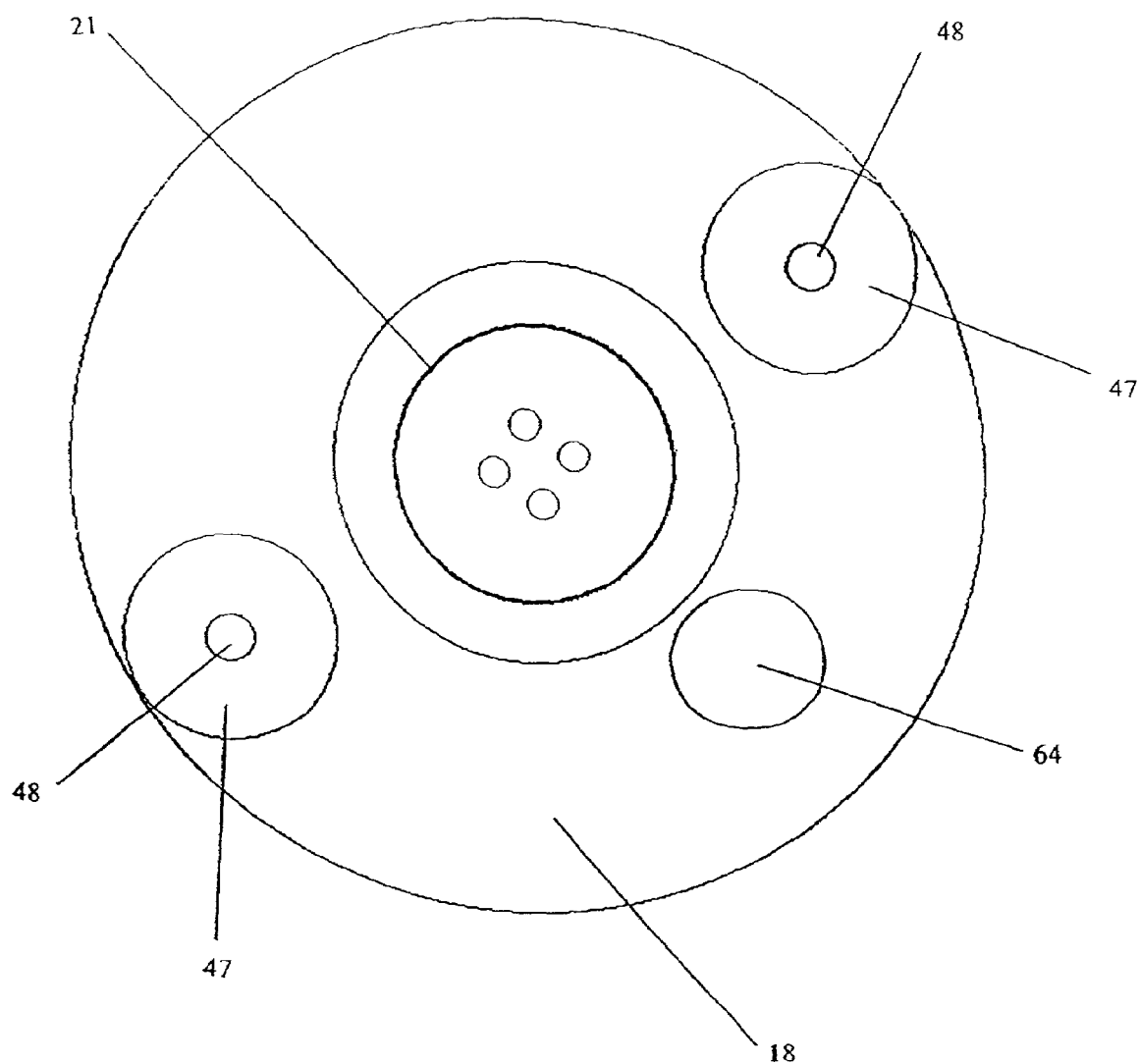
FIG. 9 illustrates a chamber bowl with chamber drain.

The chamber bowl b 18 is designed to hold any reagent spilled from the plurality of synthesis columns 12 during the purging process (or the dispensing process). Further, the chamber bowl 18 is configured with a tall shoulder to insure that spills are contained within the bowl 18. The bottom chamber seal 21 preferably provides a seal around the motor connector 22 in order to prevent the contents of the chamber bowl 18 from flowing into the gear box 17 (see FIG. 9). The bottom chamber seal 21 is preferably composed of a flexible and resilient material such as TEFLON (or elastomer which conforms to any irregularities of the motor connector 22). Alternatively, the bottom chamber seal can be composed of any other appropriate material. In particularly preferred embodiments, the bottom chamber seal is composed of material that resists constant contact with liquid reagents (e.g., TEFLON or Parlene). Additionally, the bottom chamber seal 21 may have frictionless properties that allow the motor connector 22 to rotate freely within the seal. For example, coating this flexible material with TEFLON helps to achieve a low coefficient of friction.

The clear window 25 is attached to (formed in) a top cover 30 of the synthesizer 1 and covers the area above the cartridge 3. The top cover 30 of synthesizer 1 seals the top part of the chamber (when in place), and opens up allowing an operator or maintenance person access to the interior of the synthesizer 1. The clear window 25 in top cover 30 allows the operator to observe the synthesizer 1 in operation while providing a pressure sealed environment within the interior of the synthesizer 1. As shown in FIG. 2, there are a plurality of through holes 26 in the clear window 25 to allow the plurality of dispense lines 6 to extend through the clear plate 25 to dispense material into the synthesis columns located in cartridge 3.

The clear window 25 also includes a gas fitting 27 attached therethrough. The gas fitting 27 is coupled to a gas line 28. The gas line 28 preferably continuously emits a stream of inert gas (e.g. Argon) which flows into the synthesizer 1 through the gas fitting 27 and flushes out traces of air and water from the plurality of synthesis columns 12 within the synthesizer 1. Providing the inert gas flow through the gas fitting 27 into the synthesizer 1 prevents the polymer chains being formed within the synthesis columns from being contaminated without requiring the plurality of synthesis columns 12 to be hermetically sealed and isolated from the outside environment.

Figure 3:
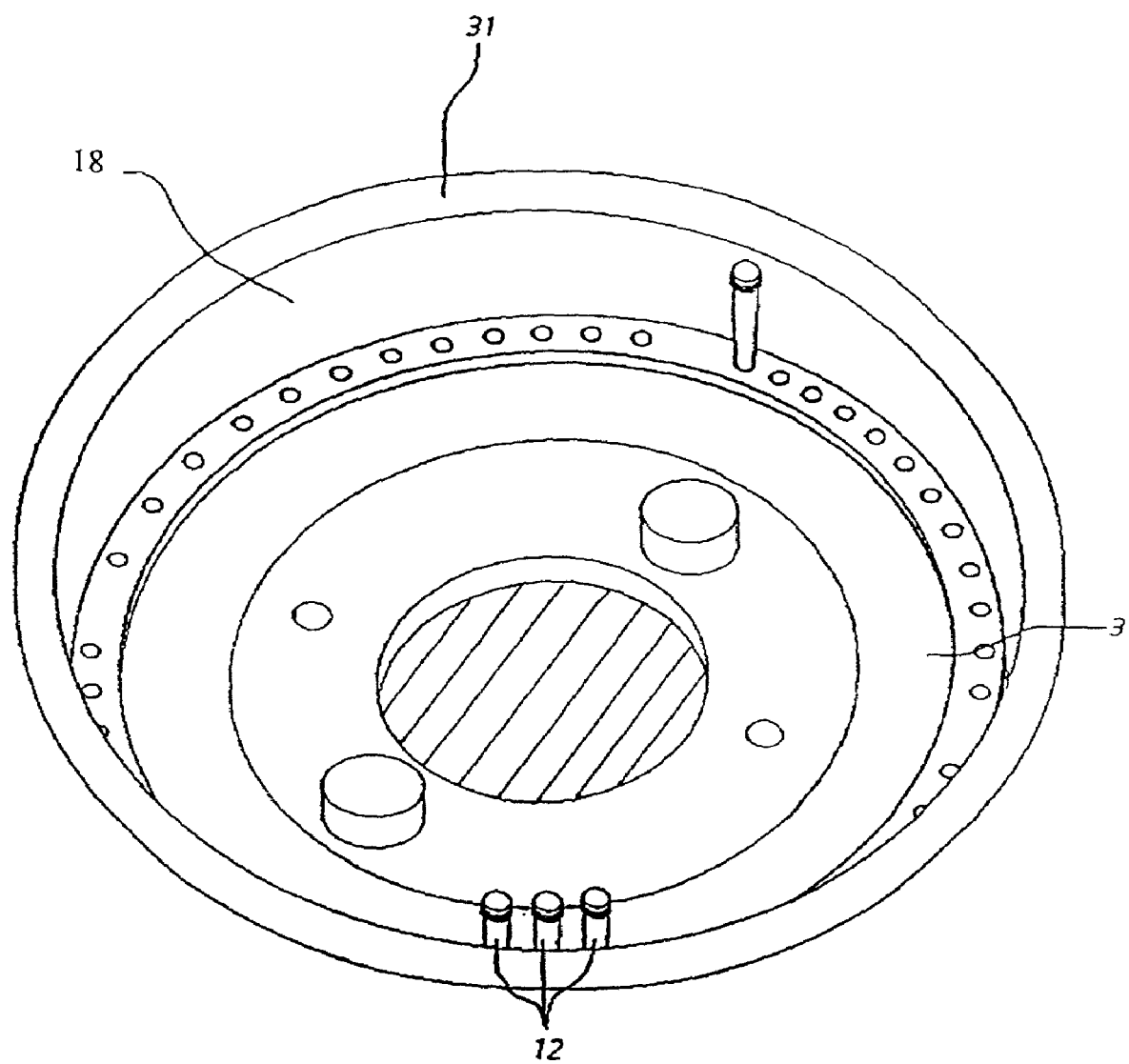
FIG. 3 illustrates a perspective view of a cartridge, chamber bowl and chamber seal of the present invention.

FIG. 3 shows the cartridge 3 in chamber bowl 18, with the top plate 30 removed, thus revealing the top chamber seal 31. Top chamber seal 31 is designed to provide a tight seal between top plate 30 and chamber bowl 18, such that inert gas applied through clear window 25 does not leak. If the top chamber seal 31 does not function properly, the inert gas leaks out (lowering the pressure in the chamber), thus causing the purge operation (that relies on the pressure on the inert gas) to fail. When the purge operation fails, un-purged columns quickly fill up and overflow. In some embodiments, a V-seal type top chamber seal is employed to prevent leakage of gas. In some embodiments, the hinges and latches on top plate 30 (not shown) are precisely machined to provide balanced forces on the top plate 30, such that the top plate 30 fits tightly over the chamber bowl.

Figure 4:
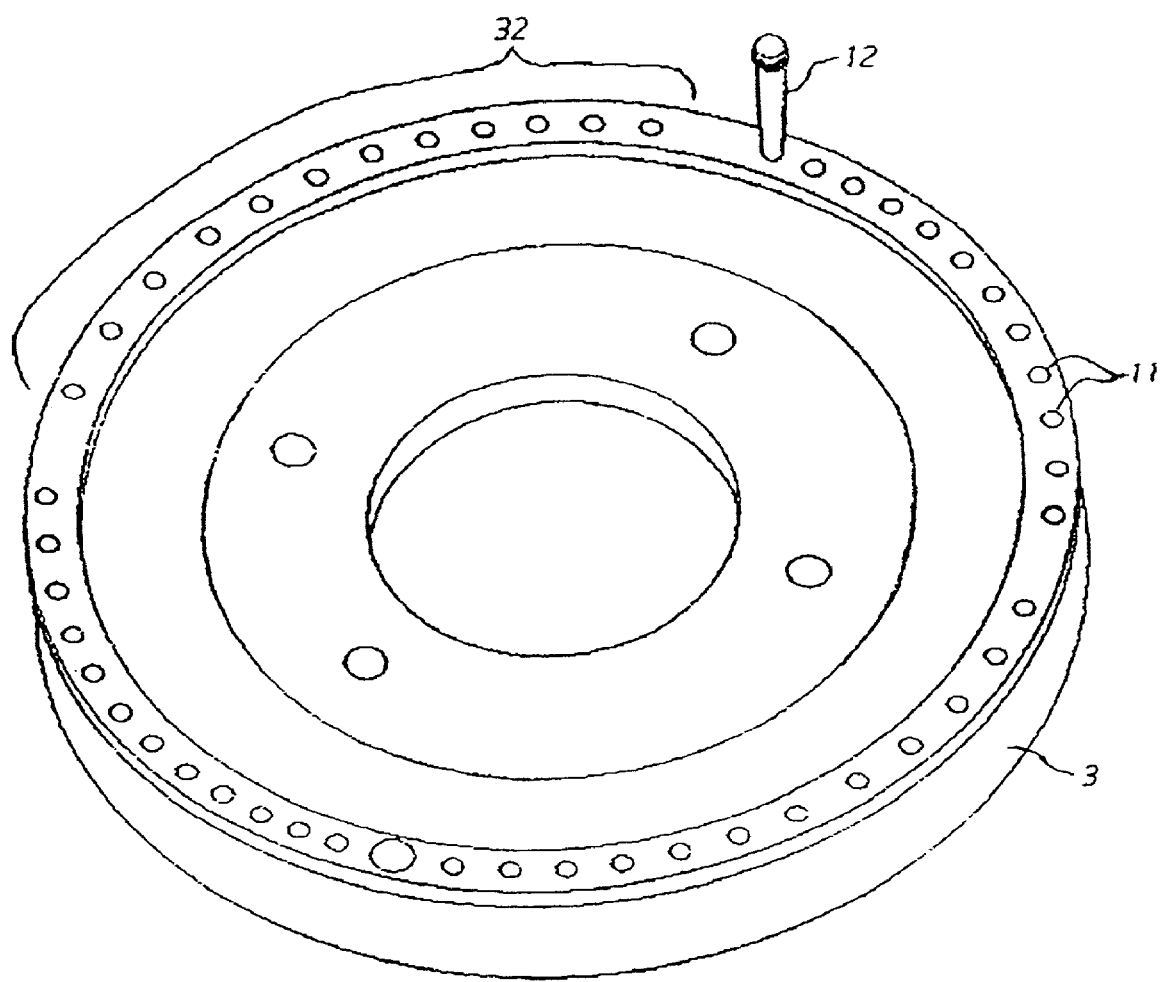
FIG. 4 illustrates a detailed view of an exemplary cartridge.

FIG. 4 illustrates a detailed view of a cartridge 3 for synthesizer 1. Preferably, the cartridge 3 is circular in shape such that it is capable of rotating in a circular path relative to the base 2 and the first and second banks of valves 8 and 9. The cartridge 3 has a plurality of receiving holes 11 on its upper surface around the peripheral edge of the cartridge 3. Each of the plurality of receiving holes 11 is configured to hold one of the synthesis columns 12. The plurality of receiving holes 11, as shown on the cartridge 3, is divided up among four banks. A bank 32 illustrates one of the four banks on the cartridge 3 and contains twelve receiving holes, wherein each receiving hole is configured to hold a synthesis column. An exemplary synthesis column 12 is shown being inserted into one of the plurality of receiving holes 11. The total number of receiving holes shown on the cartridge 3 includes forty-eight (48) receiving holes, divided into four banks of twelve receiving holes each. The number of receiving holes and the configuration of the banks of receiving holes is shown on the cartridge 3 for exemplary purposes only. Any appropriate number of receiving holes and banks of receiving holes can be included in the cartridge 3. Preferably, the receiving holes 11 within the cartridge each have a precise diameter for accepting the synthesis columns 12, which also each have a corresponding precise exterior surface 61 (see FIG. 10) to provide a pressure-tight seal when the synthesis columns 12 are inserted into the receiving holes 11. In preferred embodiments, the synthesis column includes a column seal 65 (see FIG. 10), such as a ring seal or a ball seal (e.g., a flexible TEFLON ring that flexes on engagement of the synthesis column in the receiving hole 11). In other preferred embodiments, a seal, such as a ring seal, is provided above or in the receiving holes 11 (see, e.g., FIG. 12).

Figure 5:
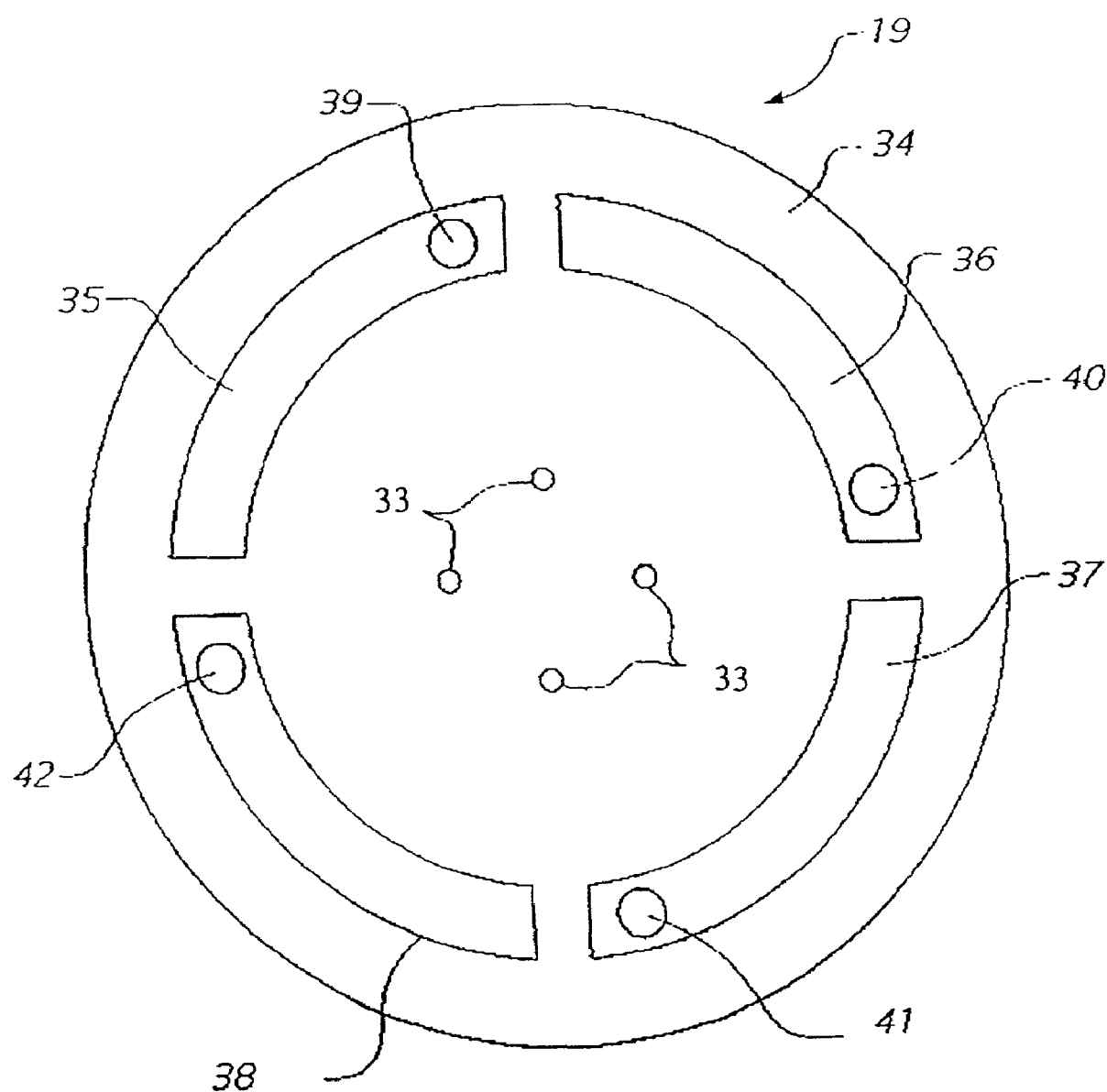
FIG. 5 illustrates an exemplary drain plate.

FIG. 5 depicts an exemplary drain plate 19 of the synthesizer 1. The drain plate 19 is coupled to the motor connector 22 (not shown) through securing holes 33. More specifically, the drain plate 19 is attached to the motor connector 22, which rotates the drain plate 19 while the motor 16 is operating and the gear box 17 is turning. The cartridge 3 and the drain plate 19 are preferably configured to rotate as a single unit. The drain plate 19 is configured to catch and direct the liquid reagents as the liquid reagents are expelled from the plurality of synthesis columns (during the purging process). During operation, the motor 16 is configured to rotate both the cartridge 3 and the drain plate 19 through the gear box 17 and the motor connector 22. The bottom chamber seal 21 allows the motor connector 22 to rotate the cartridge 3 and the drain plate 19 through a portion of the chamber bowl 18 while still containing spilled reagents in the chamber bowl 18. The controller 24 is coupled to the motor 16 to activate and deactivate the motor 16 in order to rotate the cartridge 3 and the drain plate 19. The controller 24 (see FIGS. 2 and 11) provides embedded control to the synthesizer and controls not only the operation of the motor 16, but also the operation of the valves 15 and the waste tube system 23.

The drain plate 19 has a plurality of securing holes 33 for attaching to the motor connector 22. The drain plate 19 also has a top surface 34 which may, in some embodiments, attach to the underside of the cartridge 3. In other embodiments, a drain plate gasket is provided between the drain plate 19 and cartridge 3 (see below). As stated previously, the cartridge 3 holds the plurality of synthesis columns grouped into a plurality of banks. The drain plate preferably has a collection area corresponding to each of the banks of synthesis columns (e.g. four in FIG. 5 to correspond to the four banks of synthesis columns in cartridge 3). Each of these four collection areas 35, 36, 37 and 38 in FIG. 5, forms a recessed area below the top surface 34 and is designed to contain and direct material flushed from the synthesis columns within the bank above the collection area.

Each of the four collection areas 35, 36, 37 and 38 is positioned below a corresponding one of the banks of synthesis columns on the cartridge 3. The drain plate 19 is rotated with the cartridge 3 to keep the corresponding collection area below the corresponding bank.

In FIG. 5, there are four drains 39, 40, 41, and 42 each of which is located within one of the four collection areas 35, 36, 37 and 38 respectively. In use, the collection areas are configured to contain material flushed from corresponding synthesis columns and pass that material through the drains. Preferably, there is a collection area and a drain corresponding to each bank of synthesis columns within the cartridge 3. Alternatively, any appropriate number of collection areas and drains can be included within a drain plate. FIG. 6A shows a top view of drain plate gaskets 43. The drain plate gasket is configured to be situated between drain plate 19 and cartridge 3. Drain plate gasket 43 is shown in FIG. 6A with guide holes 44 and drain cut-outs 57, 58, 59, and 60. Guide holes 44 allow the drain plate gasket to fit over the motor connector 22. Drain cut-outs 57-60 allow the bottom column opening of synthesis columns 12 to discharge material into collection areas 35-38 in drain plate 19. In other embodiments, the drain cut outs mirror the receiving holes in the cartridge (see cut-outs 60 in FIG. 6B), such that each column is able to discharge material into collection areas 35-38, while having a seal around each synthesis column. In some embodiments, all of the cut-outs are for the synthesis columns, like the cuts 60 depicted in FIG. 6B.

The drain plate gaskets of the present invention may be made of any suitable material (e.g. that will provide a tight seal above drain plate 19, such that gas and liquid do not escape). In some embodiments, the drain plate gasket is composed of rubber. Providing a tight seal between cartridge 3 and drain plate 19 with a drain plate gasket helps maintain the proper pressure of inert gas during purging procedures, such that synthesis columns with liquid reagent properly drain (preventing overflow during the next cycle). The seal between cartridge 3 and drain plate 19 may also be improved by the addition of grease between the components, or very finely machining the contact points between the two components. In other embodiments, the seal between the cartridge and drain plate is improved by physically bonding the plates together, or machining either the cartridge or drain plate such that concentric ring seals may inserted into the machined component. In still other embodiments, the two components are manufactured as a single component (e.g. a single components with all the features of both the cartridge and drain plate formed therein). In preferred embodiments, one component is provided with plurality of concentric circular rings that contact the flat surface of the other component and act as seals.

Figure 7:
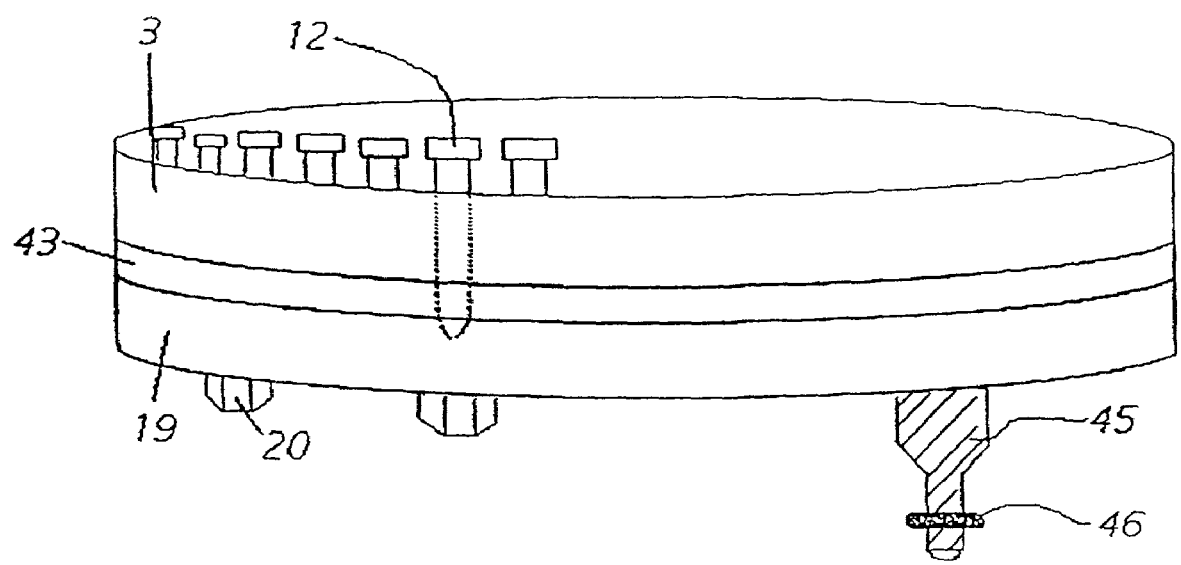
FIG. 7 illustrates a side view of a drain plate gasket situated between a cartridge and a drain plate.

FIG. 7 shows a side view of a drain plate gasket 43 situated between cartridge 3 and drain plate 19. FIG. 7 also shows a drain 20 extending from drain plate 19. FIG. 7 also shows a drain with sealing ring 45 (sealing ring is labeled 46). The sealing ring 46 tightly seals the connection between the drain 45 and the waste tube system 23 (see FIG. 8). Also shown in FIG. 7 is a synthesis column 12 inserted in cartridge 3, passing through drain plate gasket 43, and ending in drain plate 19.

The waste tube system 23 is preferably utilized to provide a pressurized environment for flushing material including reagents from the plurality of synthesis columns located within a corresponding bank of synthesis columns and expelling this material from the synthesizer 1. Alternatively, the waste tube system 23 can be used to provide a vacuum for drawing material from the plurality of synthesis columns located within a corresponding bank of synthesis columns.

Figure 8:
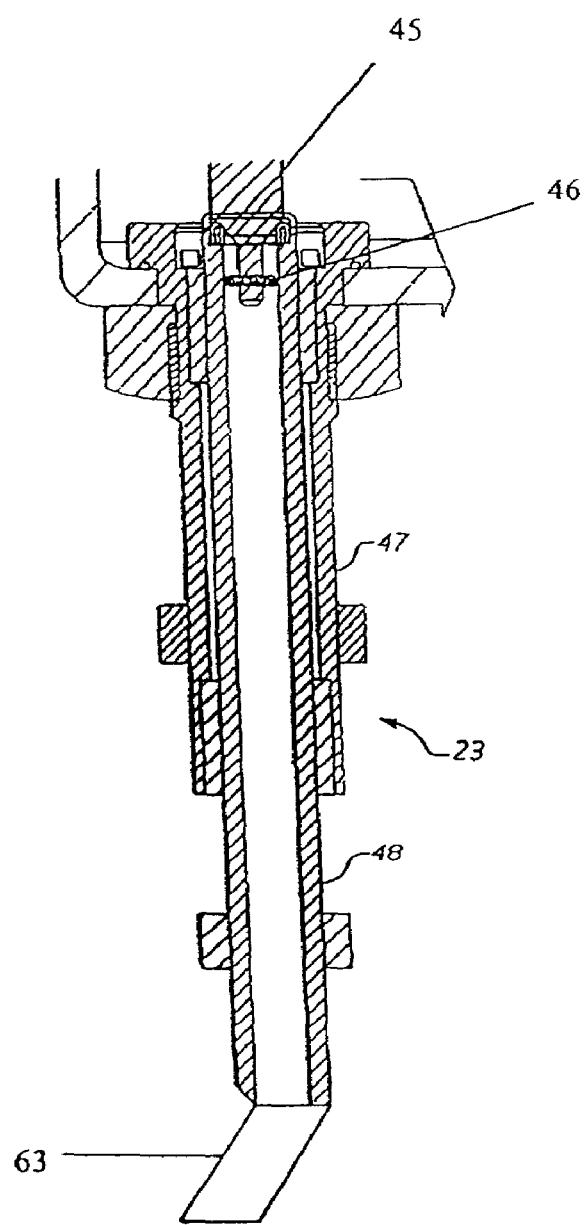
FIG. 8 illustrates a cross-sectional view of a waste tube system.

A cross-sectional view of the waste tube system 23 is illustrated in FIG. 8. The waste tube system 23 comprises a stationary tube 47 and a mobile waste tube 48. The stationary tube 47 and the mobile waste tube 48 are slidably coupled together. The stationary tube 47 is attached to the chamber bowl 18 and does not move relative to the chamber bowl (see FIG. 9). In contrast, the mobile tube 48 is capable of sliding relative to the stationary tube 47 and the chamber bowl 18. When in an inactive state, the waste tube system 47 does not expel any reagents. During the inactive state, both the stationary tube 47 and the mobile tube 48 are preferably mounted flush with the bottom portion of the chamber bowl 18 (see FIG. 9). When in an active state, the waste tube system 23 purges the material from the corresponding bank of synthesis columns. During the active state, the mobile tube 48 rises above the bottom portion of the chamber bowl 18 towards the drain plate 19. The drain plate 19 is rotated over to position a drain corresponding to the bank to be flushed, above the waste tube system 23. The mobile tube 48 then couples to the drain (e.g., 20 or 45) and the material is flushed out of the corresponding bank of synthesis columns and into the drain plate 19. The liquid reagent is purged from the corresponding bank of synthesis columns due to a sufficient pressure differential between a top opening 49 (FIG. 10) and a bottom opening 50 (FIG. 10) of each synthesis column. This sufficient pressure differential is preferably created by coupling the mobile waste tube 48 to the corresponding drain. Alternatively, the waste tube system 23 may also include a vacuum device 29 (see, FIG. 2) coupled to the stationary tube 47 wherein the vacuum device 29 is configured to provide this sufficient pressure differential to expel material from the corresponding bank of synthesis columns. When this sufficient pressure differential is generated, the excess material within the synthesis columns being flushed, then flows through the corresponding drain and is carried away via the waste tube system 23.

When engaging the corresponding drain to flush a bank of synthesis columns, preferably the mobile tube 48 slides over the corresponding drain such that the mobile tube 48 and the drain act as a single unit. Alternatively, the waste tube system 23 includes a mobile tube 48 which engages the corresponding drain by positioning itself directly below the drain and then sealing against the drain without sliding over the drain. The mobile tube 48 may include a drain seal positioned on top of the mobile tube. In this embodiment, during a flushing operation, the mobile tube 48 is not locked to the corresponding drain. In the event that this drain is accidentally rotated while the mobile waste tube 48 is engaged with the drain, the drain and mobile tube 48 of the synthesizer 1 will simply disengage and will not be damaged. If this occurs while material is being flushed from a bank of synthesis columns, any spillage from the drain is contained within the chamber bowl 18. In preferred embodiments, the bottom of the chamber bowl 18 has a chamber drain 64 (see FIG. 9) to collect and remove any spilled material in the chamber bowl. In this regard, material may be removed before it builds up and leaks into other parts of the synthesizer (e.g. motor 16 or gear box 17). In some embodiments of the present invention, the chamber drain is in a closed position during synthesis and purging. When the top cover of the synthesizer is opened, the chamber drain can be opened, drawing out unwanted gaseous or liquid emissions (e.g., using a vacuum source). Coordination of the chamber drain opening to the top cover opening may be accomplished by mechanical or electric means.

Configuring the waste tube system 23 to expel the reagent while the mobile waste tube 48 is coupled to the drain allows the present invention to selectively purge individual banks of synthesis columns. Instead of simultaneously purging all the synthesis columns within the synthesizer 1, the present invention selectively purges individual banks of synthesis columns such that only the synthesis columns within a selected bank or banks are purged. In preferred embodiments, the waste system is fitted for qualitative monitoring of detritylation. For example, colorimetric analysis of waste effluent using, for example, a CCD camera or a similar device provides a yes/no answer on a particular detritylation level. Qualitative analysis can also be accomplished by spectrophotometricly, or by testing effluent conductivity. Qualitative detection of detritylation can generally be performed with less expensive equipment than is generally required by more precise quantitation, and yet generally provides sufficient monitoring for detritylation failure. In preferred embodiments, the effluent from each column is monitored when a bank of columns is purged.

Preferably, the synthesizer 1 includes two waste tube systems 23 for flushing two banks of synthesis columns simultaneously. Alternatively, any appropriate number of waste tube systems can be included within the synthesizer 1 for selectively flushing synthesis columns or banks of synthesis columns. In preferred embodiments, the waste tube systems 23 are spaced on opposite sides of the chamber bowl 18 (i.e. they are directly across from each other, see FIG. 9). In this regard, the force on the drain plate 19 is equalized during flushing procedures (e.g. the drain plate is less likely to tip one way or the other from force being applied to just one side of the plate). Alternatively, a single waste tube system 23 may be provided for flushing the plurality of banks of synthesis columns. When a single waste tube system is used, it is preferred that a balancing force be provided on the opposite side of the drain plate 19, e.g., such as would be provided by the presence of a second waste tube system 23. In one embodiment, a balancing force is provided by a dummy waste tube system (not shown), that may be actuated in the same fashion as the waste tube system 23, but which does not serve to drain the bank of synthesis columns to which it is deployed.

In use, the controller 24, which is coupled to the motor 16, the valves 15, and the waste tube system 23, coordinates the operation of the synthesizer 1. The controller 24 controls the motor 16 such that the cartridge is rotated to align the correct synthesis columns with the dispense lines 6 corresponding to the appropriate valves 15 during dispensing operations and that the correct one of the drains 39, 40, 41, and 42 are aligned with an appropriate waste tube system 23 during a flushing operation.

In some preferred embodiments, the synthesizer comprises a means of delivering energy to the synthesis columns to, for example, increase nucleic acid coupling reaction speed and efficiency, allowing increased production capacity. In some embodiments, the delivery of energy comprises delivering heat to the chamber or the columns. In addition to increasing production capacity, the use of heat allows the use of alternate synthesis chemistries and methods, e.g., the phosphate triester method, which has the advantages of using more stable monomer reagents for synthesis, and of not using tetrazole or its derivatives as condensation catalysts. Heat may be provided by a number of means, including, but not limited to, resistance heaters, visible or infrared light, microwaves, Peltier devices, transfer from fluids or gasses (e.g., via channels or a jacketed system). In some embodiments, heat generated by another component of a synthesis or production facility system (e.g., during a waste neutralization step) is used to provide heat to the chamber or the columns. In other embodiments, heat is delivered through the use of one or more heated reagents. Delivery of heat also comprises embodiments wherein heat is created within the, e.g., by magnetic induction or microwave treatment. In some embodiments, heat is created at or within synthesis columns. It is contemplated that heating may be accomplished through a combination of two or more different means.

In some embodiments, the delivery of heat provides substantially uniform heating to two or more synthesis columns. In some embodiments, heating is carried out at a temperature in a range of about 20° C. to about 60° C. The present invention also provides methods for determining an optimum temperature for a particular coupling chemistry. For example, multiple synthesizers are run side-by-side with each machine run at a different temperature. Coupling efficiencies are measured and the optimum temperature for one or more incubations times are determined. In other embodiments, different amounts of heat are delivered to different synthesis columns within a single synthesizer, such that different reaction chemistries or protocols can be run at the same time.

Delivery of heat to an enclosed, sealed system will alter the pressure within the system. It is contemplated that the sealed system of the present invention will be configured to tolerate variations in the system pressure (i.e., the pressure within the sealed system) related to heating or other energy input to the system. In preferred embodiments, the system (e.g., every component of the system and every junction or seal within the system) will be configured to withstand a range of pressures, e.g., pressures ranging from 0 to at least 1 atm, or about 15 psi. It is contemplated that pressures may be varied between different points within the system. For example, in some embodiments, reagents and waste fluids are moved through the synthesis column by use of a pressure differential between one end (e.g., an input aperture) and the other (e.g., a drain aperture) of the synthesis column. In some embodiments, the system of the present invention is configured to use pressure differentials within a pressurized system (e.g., wherein a system segment having lower pressure than another system segment nonetheless has higher pressure than the environment outside the sealed system). In some embodiments, the prevention of backward flow of reagents through the system (e.g., in the event of back pressure from a process step such as heating) is controlled by use of pressure. In other embodiments, valves are provided to assist in control of the direction of flow.

In other preferred embodiments, the synthesizer comprises a mixing component configured to mix reaction components, e.g., to facilitate the penetration of reagents into the pores of the solid support. Mixing may be accomplished by a number of means. In some embodiments, mixing is accomplished by forced movement of the fluid through the matrix (e.g., moving it back and forth or circulating it through the matrix using pressure and/or vacuum, or with a fluid oscillator). Mixing may also be accomplished by agitating the contents of the synthesis column (e.g., stirring, shaking, continuous or pulsed ultra or subsonic waves). In some preferred embodiments, an agitator is used that avoids the creation of standing waves in the reaction mixture. In some preferred embodiments, the agitator is configured to utilize a reaction vessel surface or reaction support surface (e.g., a surface of a synthesis column) to serve as resonant members to transfer energy into fluid within a reaction mixture. In a preferred embodiment, a horn is applied directly to the cartridge 3 to provided pulsed or continuous ultra sonic energy to the synthesis columns therein. In some embodiments, the matrix is an active component of the mixing system. For example, in some embodiments, the matrix comprises paramagnetic particles that may be moved through the use of magnets to facilitate mixing. In some embodiments, the matrix is an active component of both mixing and heating systems (e.g., paramagnetic particles may be agitated by magnetic control and heated by magnetic induction). It is contemplated that any of these mixing means may be used as the sole means of mixing, or that these mixing components may be used in combination, either simultaneously or in sequence. In preferred embodiments, the heating component and the mixing component are under automated control.

Figure 10:
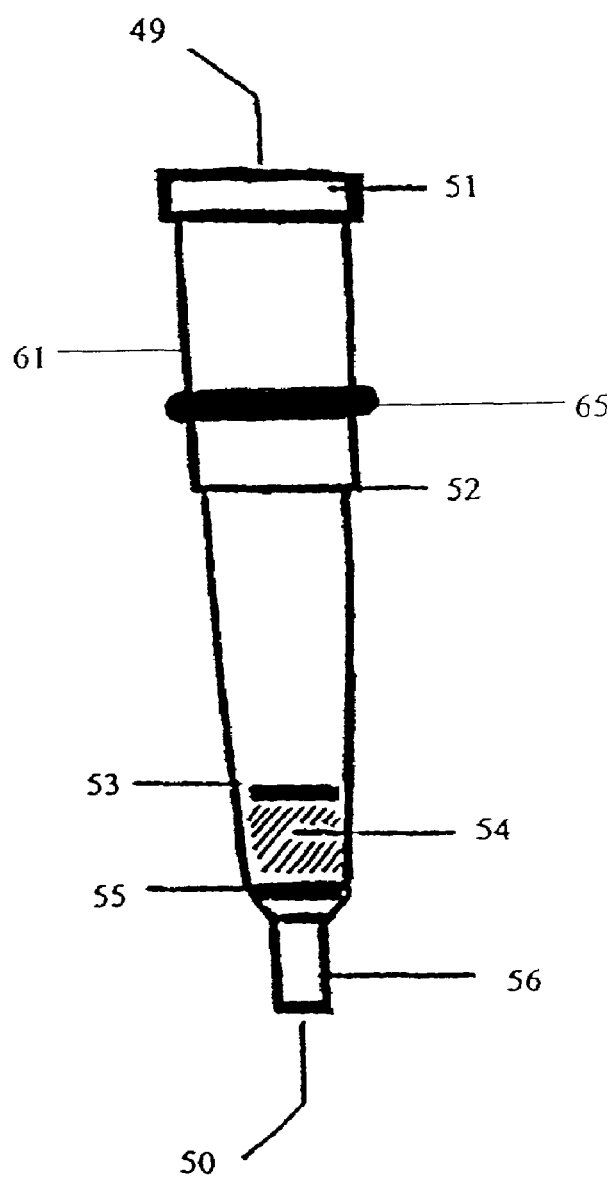
FIG. 10 illustrates one embodiment of a synthesis column.

FIG. 10 illustrates a cross sectional view of a synthesis column 12. The synthesis column is an integral portion of the synthesizer 1. Generally, the polymer chain is formed within the synthesis column 12. More specifically, the synthesis column 12 holds a solid support 54 on which the polymer chain is grown. Examples of suitable solid supports include, but are not limited to, polystyrene, controlled pore glass, and silica glass. As stated previously, to create the polymer chain, the solid support 54 is sequentially submerged in various reagents for a predetermined amount of time. With each deposit of a reagent, an additional unit is added, or the solid support is washed, or failure sequences are capped, etc. Preferably, the solid support 54 is held within the synthesis column 12 by a bottom frit 55. In particularly preferred embodiments, a top frit 53 is included above the solid support (e.g. to help resist downward gas pressure when the particular synthesis column does not have liquid reagents, but other synthesis columns within the bank are being purged of their liquid contents). The synthesis column 12 includes a top opening 49 and a bottom opening 50. During the dispensing process, the synthesis column 12 is filled with a reagent through the top opening 49. During the purging process, the synthesis column 12 is drained of the reagent through the bottom opening 50. The bottom frit 55 prevents the solid support from being flushed away during the purging process.

The exterior surface 61 of each synthesis column 12 fits within the receiving hole 11 within the cartridge 3 and provides a pressure tight seal around each synthesis column within the cartridge 3. Preferably, each synthesis column is formed of polyethylene or other suitable material. In preferred embodiments, the receiving holes 11 of the cartridge 3 are provided with seals, such as O-ring seals 67, that will flex on engagement of the synthesis column 12 in receiving hole 11 and accommodate any irregularities in the exterior surface 61 of the synthesis column 12, thus assuring the presence of a pressure-tight seal.

In preferred embodiments, the material inside the synthesis column (e.g. in FIG. 10, this includes top frit 53, solid support 54, and bottom frit 55) is configured to resist the downward pressure of gas (e.g., to provide back pressure) applied during the purging process when the particular synthesis column does not have liquid reagent. In this regard, other synthesis columns that do contain liquid reagents may be successfully purged with the application of gas pressure during the purging process (i.e. the synthesis columns without liquid reagent do not allow a substantial portion the gas pressure applied during the purging process to escape through their bottom openings). Other packing materials may also be added to the synthesis columns to help maintain the pressure differential across the column when it is idle.

One method for constructing a synthesis column that successfully resists the downward pressure of gas (when no liquid reagent has been added to this column) is to include a top frit in addition to a bottom frit. Determining what type of top frit is suitable for any given synthesis column and type of solid support may be determined by test runs in the synthesizer. For example, the columns may be loaded into the synthesizer with the candidate top frit (and solid support and bottom frit), and instructions for synthesizing different length oligonucleotides inputted (i.e., this will allow certain columns to sit idle while other columns are still having liquid dispensed into them and purged out). Observation through the glass panel, examining the amount of leakage from overflowing columns, and testing the quality of the resulting oligonucleotides, are all methods to determine if the top frit is suitable (e.g., a thicker or smaller pore top frit may be employed if problems associated with insufficient back pressure are seen). By combining the appropriate packing material in columns with the appropriate delivered pressure to the chamber, purging can be efficiently carried out, avoiding spill-over that can result in synthesis or instrument failure.

Another method for constructing a synthesis column that successfully resists the downward pressure of gas (when no liquid reagent has been added to this column) is to provide a solid support that resists this downward force even when no liquid reagent is in the columns. One suitable solid support material is polystyrene (e.g. U.S. Pat. No. 5,935,527 to Andrus et al., hereby incorporated by reference). In some embodiments, the styrene (of the polystyrene) is cross-linked with a cross-linking material (e.g. divinylbenzene). In some embodiments, the cross-linking ratio is 10-60 percent. In preferred embodiments, the cross-linking ration is 20-50 percent. In particularly preferred embodiments, the cross-linking ratio is about 30-50 percent. In some embodiments, the polystyrene solid support is used in conjunction with a top frit in order to successfully resist the downward pressure of gas during the purging process. In some embodiments, the polystyrene is used as the solid support for synthesis. In other embodiments, a different support, such as controlled pore glass, is used as the support for the synthesis reaction, and the polystyrene is provided only to increase the back pressure from a column comprising a CPG or other synthesis support.

There are many advantages of configuring synthesis columns to successfully resist downward gas pressure during the purging process. One advantage is the fact that not all the synthesis columns need to contain liquid reagent during the purging process in order for the purge to be successful. Instead, one or more of the synthesis columns may remain idle during a particular cycle, while the other synthesis columns continue to receive liquid reagents. In this regard, oligonucleotides of different lengths may be constructed (e.g., a 20-mer constructed in one synthesis column may be completed and sit idle, while a 32-mer is constructed in a second synthesis column). Achieving successful purges after each liquid addition prevents liquid leakage (e.g. additional liquid reagent applied to a synthesis column that was not successfully purged will cause the column to overflow).

Figure 11:
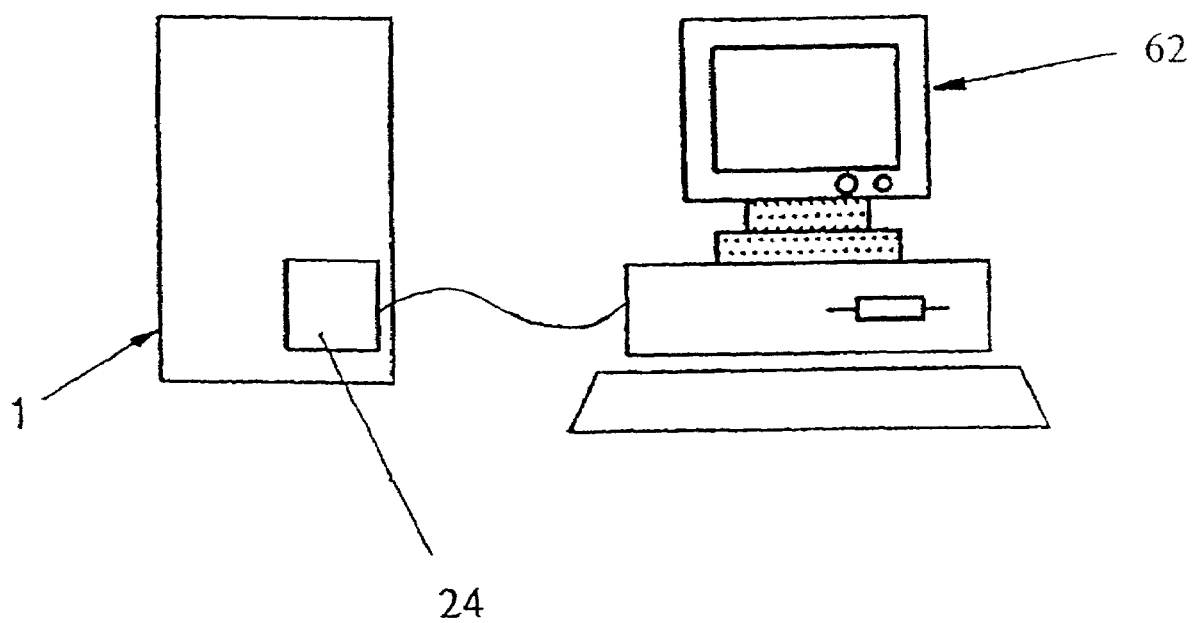
FIG. 11 illustrates a computer system coupled to a synthesizer.

FIG. 11 illustrates a computer system 62 coupled to the synthesizer 11. The computer system 62 preferably provides the synthesizer 1, and specifically the controller 24, with operating instructions. These operating instructions may include, for example, rotating the cartridge 3 to a predetermined position, dispensing one of a plurality of reagents into selected synthesis columns through the valves 15 and dispense lines 6, flushing the first bank of synthesis columns 4 and/or the second bank of synthesis columns 5, and coordinating a timing sequence of these synthesizer functions. U.S. Pat. No. 5,865,224 to Ally et al. (herein incorporated by reference in its entirety), further demonstrates computer control of synthesis machines. Preferably, the computer system 62 allows a user to input data representing oligonucleotide sequences to form a polymer chain via a graphical user interface.

After a user inputs this data, the computer system 62 instructs the synthesizer 1 to perform appropriate functions without any further input from the user. The computer system 62 preferably includes a processor, an input device and a display. The computer 62 can be configured as a laptop or a desktop, and may be operably connected to a network (e.g. LAN, internet, etc.).

In some embodiments, the present invention provides alignment detectors for detecting the alignment of any of the components of the present invention, as desired. In some embodiments, when a misalignment is detected, an alarm or other signal is provided so that a user can assure proper alignment prior to further operation. In other embodiments, when a misalignment is detected, a processor operates a motor to adjust that alignment. Alignment detectors find particular use in the present invention for assuring the alignment of any components that are involved in an exchange of liquid materials. For example, alignment of dispense lines and synthesis columns and alignment of drains and waste tubes should be monitored. Likewise, the tilt angle of the cartridge or any other component that should be parallel to the work surface can be monitored with alignment detectors.

Figure 12A:
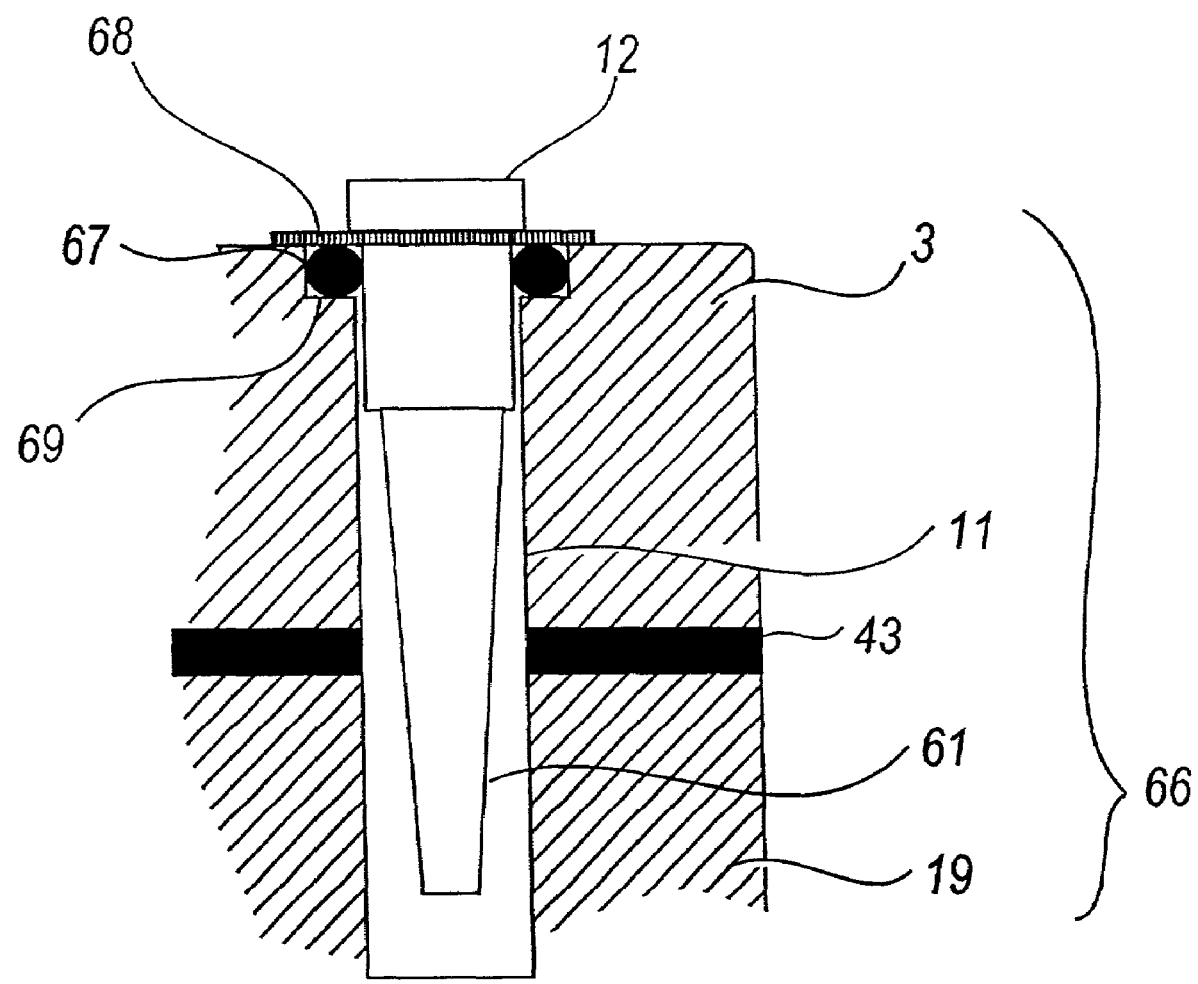
FIGS. 12A-C illustrate 3 cross-sectional detailed views of different embodiments of a cartridge, drain plate, drain plate gasket, receiving hole of cartridge, and synthesis column.
Figure 12B:
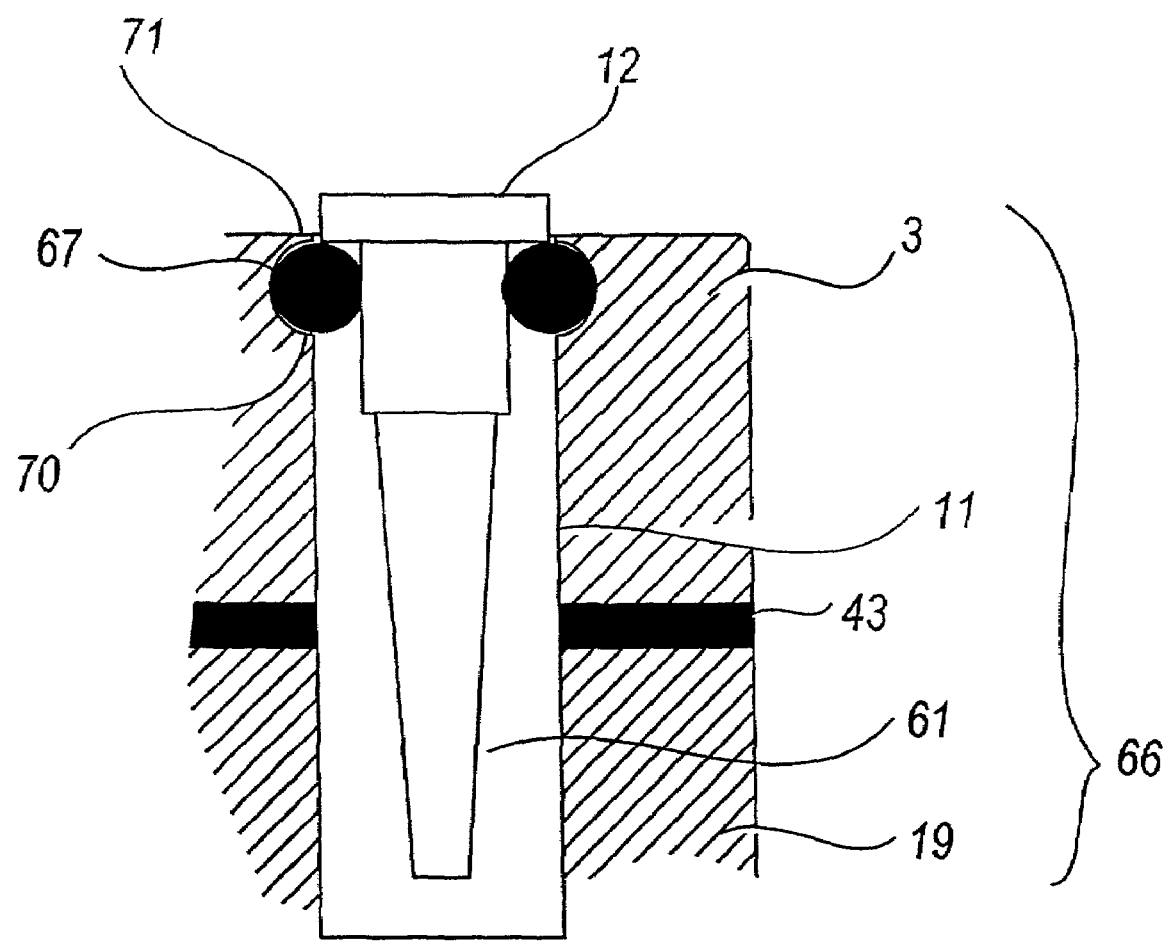
Figure 12C:
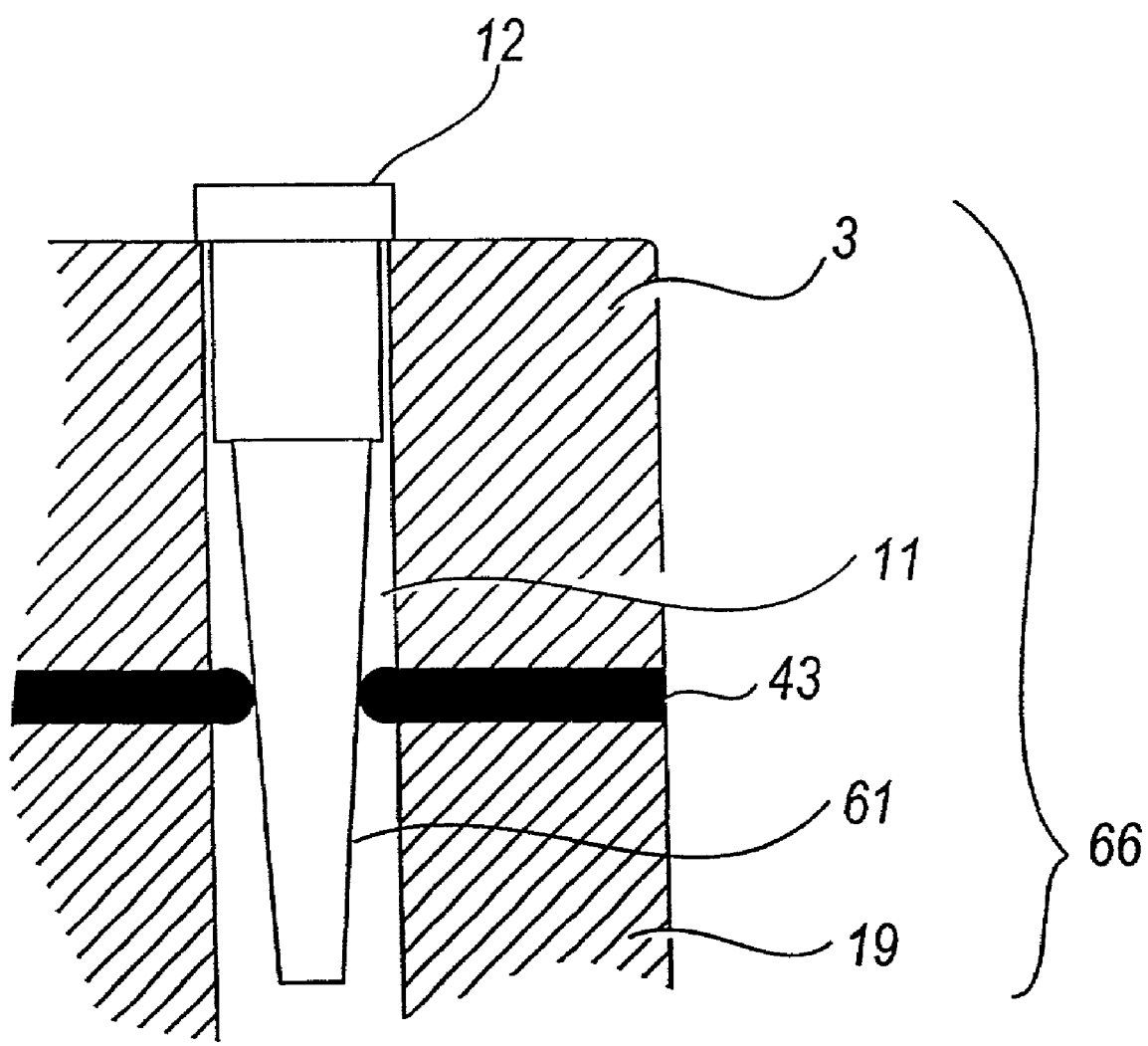

As noted above, the exterior surface 61 of each synthesis column 12 fits within the receiving hole 11 within the cartridge 3 and is intended to provide a pressure-tight seal around each synthesis column 12 within the cartridge 3. FIG. 12 illustrates three cross-sectional detailed views of the assembly 66 (the assembly comprising the cartridge 3, the drain plate gasket 43 and the drain plate 19) with a synthesis column 12 within a receiving hole 11 of cartridge 3. Each view shows a different embodiment of an airtight seal between the assembly 66 and the exterior surface 61 of synthesis column 12. In some embodiments, the airtight seal is provided by an O-ring 67. In preferred embodiments, the O-ring 67 is accessible for easy insertion and removal, e.g., for cleaning or replacement. In one embodiment, an O-ring 67 is positioned at the top of receiving hole 11, held in place by, e.g., a restraining plate 68, or any other suitable restraining fitting. In a preferred embodiment, a channel 69 is provided at the top of receiving hole 11 in cartridge 3 to accommodate the O-ring 67, as illustrated in FIG. 12A. In a particularly preferred embodiment, a groove 70 within receiving hole 11 in cartridge 3 accommodates an O-ring 67, providing a groove lip 71 to restrain the O-ring 67, as illustrated in FIG. 12B. In a particularly preferred embodiment, the groove lip 71 is about 0.030 inches. FIG. 12C illustrates a further embodiment, in which drain plate gasket 43 is configured to provide an airtight seal between nucleic acid synthesis column 12 and assembly 66. The illustrations in FIG. 12 are provided by way of examples only, and it is not intended that the present invention be limited by details of these illustrations, such as apparent size, shape or precise locations of features such as grooves, channels, plates or seals. Any O-ring configuration that helps maintain proper pressure differential across the synthesis columns is contemplated.

O-rings 67 may be composed of any suitable material, preferably a chemically resistant, resilient material that flexes upon engagement of the synthesis column 12 in receiving hole 11. In some embodiments, a low cost material such as silicone or VITON may be used. In other embodiments, more expensive materials offering longer term stability, such as KALREZ, may be used. In some embodiments the O-rings may have a light lubrication, e.g. with a silicone or fluorinated grease.

Figure 13A:
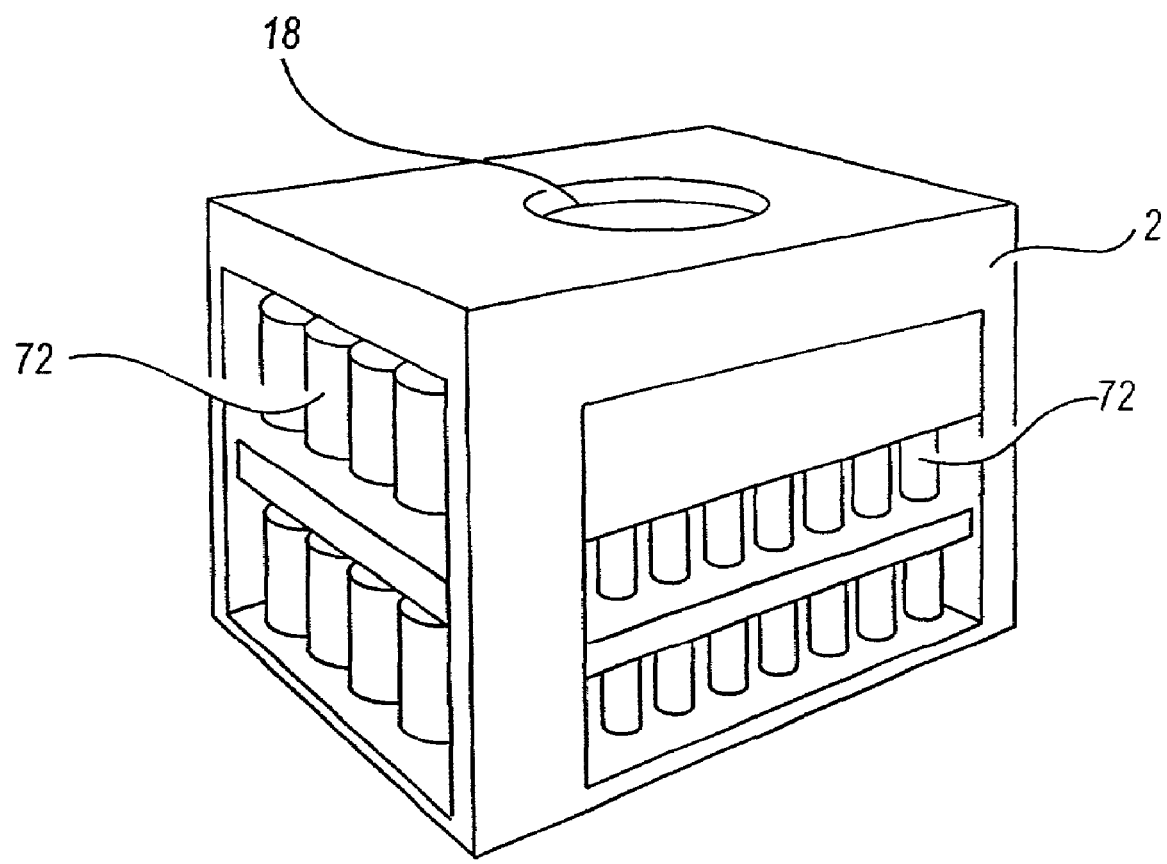
FIGS. 13A and 13B illustrate embodiments of reagent dispense stations.
Figure 13B:
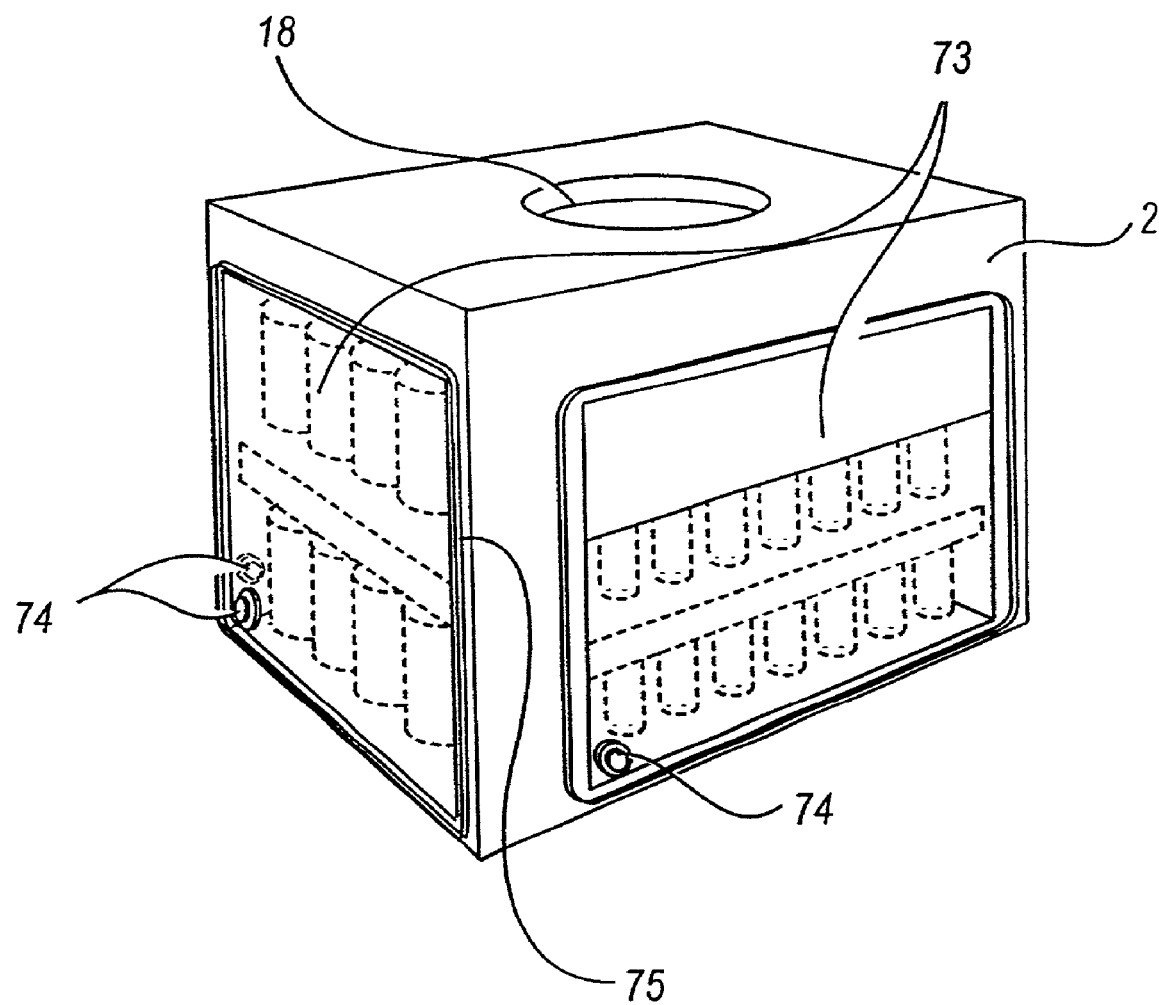

In some embodiments, the present invention provides a means of collecting emissions from reagent reservoirs 72 (See e.g., FIGS. 13A and B) by providing a reagent dispensing station. In one embodiment, the reagent dispensing station is an integral part of the base 2 of the synthesizer, as illustrated in FIGS. 13A and 13B. In some embodiments, the reagent dispensing station provides an enclosure for collecting emitted gasses. In some embodiments, the enclosure is created by the provision of a panel 73 to enclose a portion of base 2 containing reagent reservoirs 72, as illustrated in FIG. 13B. In some embodiments, the panel 73 is movable for easy access to reagent reservoirs. In some embodiments, it is removeably attached. Removable attachment may be accomplished by any suitable means, such as through the use of VELCRO, screws, bolts, pins, magnets, temporary adhesives, and the like. In preferred embodiments, at least a portion of the panel 73 is slidably moveable. In preferred embodiments, at least a portion of panel 73 is transparent. In some embodiments, the enclosure of the reagent dispensing station comprises a viewing window that is not in a panel 73.

In some embodiments, the enclosure comprises a ventilation tube. In preferred embodiments, panel 73 comprises a ventilation port 74, e.g., for attachment to a ventilation tube. Since reagent vapors are typically heavier than air, in preferred embodiments, the ventilation tube is attached at the bottom for the enclosure. In a particularly preferred embodiment, the ventilation port is positioned toward the rear of the instrument.

In some embodiments, the enclosure further comprises an air inlet. In a preferred embodiment, a clearance 75 between the panel 73 and the base 2 provides an air inlet. In a particularly preferred embodiment, the air inlet is positioned toward the front of the instrument.

The location of the ventilation port 74 and air inlet is not limited to the panel 73. For example, in an alternative embodiment, the reagent dispensing station comprises a stand for holding the reagent bottles and a ventilation tube, wherein the stand holds the reagent reservoirs and the ventilation tube removes emitted gases.

Ventilation may be continuous or under the control of an operator. For example, in some embodiments, when the panel 73 is in a closed position, ventilation occurs continuously through the ventilation port 74 or at regular intervals. In other embodiments, an operator may manually activate ventilation prior to opening the panel 73. In still other embodiments, ventilation occurs in an automated fashion immediately prior to the opening of panel 73. For example, where the opening of panel 73 is controlled by a computer processor, activation of the "open" routine triggers ventilation prior to the physical opening of panel 73. In still other embodiments, the contents of the reagent containers are monitored by a sensor and the ventilation is triggered when one or more of the reagent containers are depleted. In some embodiments, the panel 73 is also automatically open, indicating the need for additional reagents and/or allowing an automated reagent container delivery system to supply reagents to the system.

The present invention also provides systems for ventilation, particularly ventilation of reaction enclosures (e.g., a chamber bowl 18), that improve the safety of synthesizers. The ventilation systems of the present invention may be applied to any type of synthesizer, and preferably, to open type synthesizers. These systems are particularly useful for improving the function and safety of certain commercially available synthesizers, such as the ABI 3900 Synthesizer.

During normal operations and without any malfunction, fumes are nonetheless are emitted from the chamber bowl of the 3900 machine when the synthesizer is opened for access by an instrument operator (e.g., when the top cover or lid enclosure is opened to retrieve columns after synthesis is completed). These emissions can be significant. In some instances, instruments such as the 3900 may be installed inside chemical fume hoods to collect such emissions from normal operations. However, placing machines in chemical fume hoods is not practical for a number of reasons. For example, the presence of a large instrument within a chemical fume hood limits the use of the hood for other purposes. Removal of the instrument when the hood is needed for another purpose is impractical, since many synthesizers are physically connected to external reagent reservoirs, gas tanks or other supply sources, making frequent removal and reinstallation prohibitively complex. Another problem with using chemical fume hoods to contain and remove emissions is that, using this approach, the number of synthesizers that can be used at one time is limited by the amount of hood space available. This prevents the use of many synthesizers in parallel, e.g., in an array of synthesizers, and therefore limits high-throughput synthesis capability. What is needed are systems to properly vent synthesizers, such as the 3900, that do not require placing the machines in chemical fume hoods.

The present invention provides systems for collecting emissions from synthesizers without the use of a separate fume hood. The present invention comprises a synthesizer having an integrated ventilation system to contain and remove vapor emissions. By way of example, the integrated ventilation system of the present invention is described as applied to the components and features of open synthesizers like the Applied Biosystems 3900 instrument. However, this configuration is used only as an example, and the integrated ventilation systems are not intended to be limited to the 3900 instrument or to any particular synthesizer. One aspect of the invention is to collect and remove vapors when the instrument is open, e.g., for access by the operator to the reaction chamber (FIGS., 19C, and 20A-C). In one embodiment of the present invention, the integrated ventilation system comprises a ventilated workspace. Embodiments of an integrated ventilation system comprising a ventilated workspace as applied to the 3900 instrument are shown in FIGS. 19A-C, 20A-C and 21A-B. Another embodiment is diagrammed in FIGS. 22A and B.

Figure 19A:
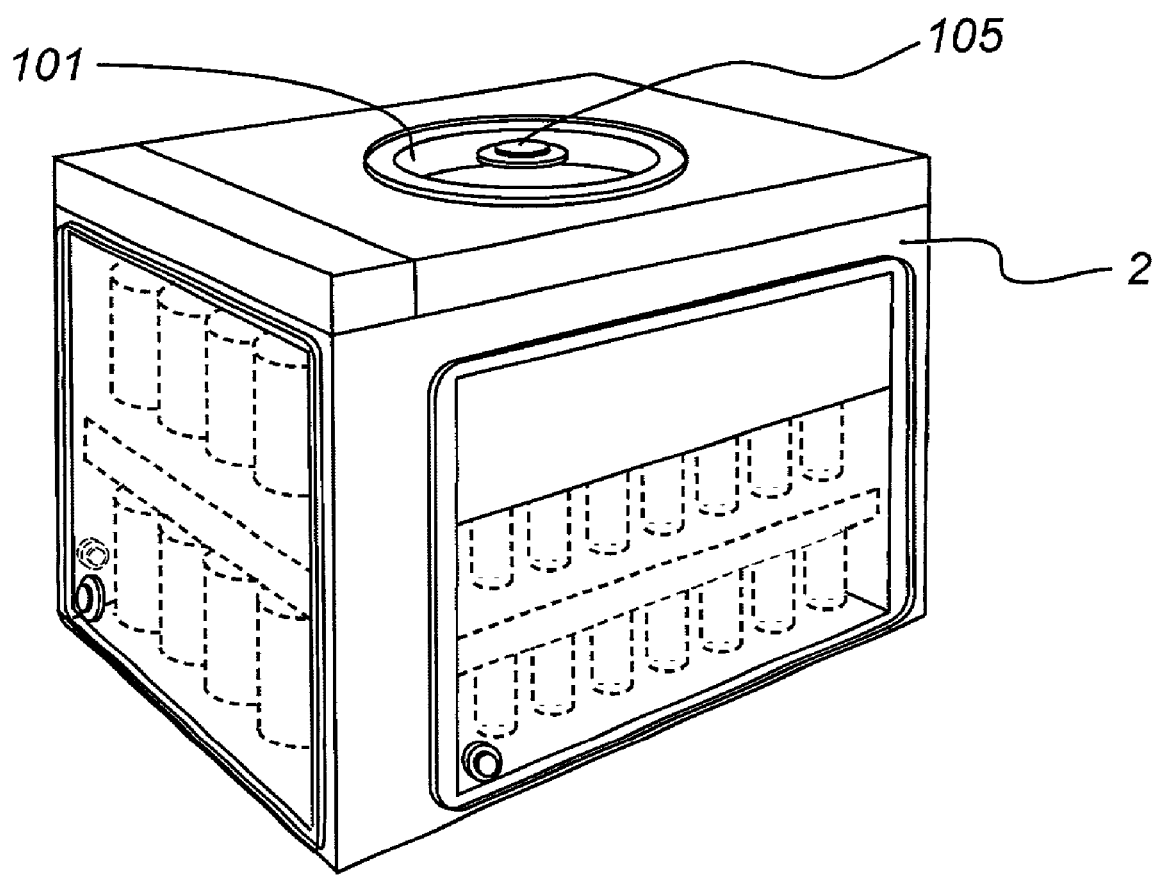
FIG. 19A illustrates a synthesizer having a ventilation opening in a lid enclosure

In some embodiments, a ventilation opening is provided through an opening in the top. For example, referring to FIG. 19A, in certain embodiments, some embodiments of synthesizers of the present invention comprise a top enclosure (e.g. 97) that forms a primarily enclosed space 104 over a top cover (e.g., 30, not shown in this figure). In preferred embodiments, the top enclosure has four sides (e.g., 98, two of which are shown in FIG. 19A), and a top panel (e.g., 99) that form a primarily enclosed space 104 above the top cover (e.g., 30) containing a plurality of valves (e.g., 10, not shown in this figure) and a plurality of dispense lines (e.g., 6, not shown in this figure). In certain embodiments, the top panel (e.g., 99) contains an outer window (e.g., 101). In some preferred embodiments, the outer window contains a ventilation opening (e.g., 105).

As used herein, the combination of a top enclosure (e.g., 97) and top cover (e.g., 30) is referred to collectively as the "lid enclosure" (e.g., 102). In preferred embodiments, the "lid enclosure" has six sides, with the top cover (e.g., 30) serving as the "bottom", the top panel serving as the surface opposite the top cover, and the four side walls being the top enclosure sides (e.g., 98). In certain embodiments, the lid enclosure has a ventilation opening (e.g., 105) with a ventilation tube (e.g., 103) attached thereto (See, FIG. 19B). In preferred embodiments, the ventilation tube is connected to a ventilation opening in an outer window 101.

In other embodiments, the synthesizer base (e.g., 2) comprises a primarily enclosed space 104. In certain embodiments, a base (e.g., 2) of a synthesizer comprises a ventilation opening (e.g., 105) with a ventilation tube (e.g., 103) attached thereto (See, e.g., FIGS. 22A and 22B).

The ventilation openings in the lid enclosure or the base may be in any suitable position. For example, the ventilation opening in the lid enclosure may be in the top panel (e.g. in the center, toward the back of the machine, or in one of the corners). The ventilation opening may also be located in a top enclosure side. For example, the ventilation opening may be in the enclosure side at the back of the machine, or on one of the sides (e.g., configured such that the lid enclosure may still be moved upward and downward while attached to a ventilation tube). A ventilation opening in a base may be, for example, on the front, the sides or on the back (e.g., configured such that the lid enclosure may still be moved upward and downward without interference by the ventilation tube). In preferred embodiments, the ventilation opening is positioned toward the rear (e.g., on a side or in the back) to allow the ventilation tubing to be directed away from an instrument operator. In particularly preferred embodiments, the ventilation opening is on the back of the base, e.g., as shown in FIGS. 22A and 22B.

In some embodiments, the ventilation is located in a position such that air traveling through the primarily enclosed space (e.g., 104) make greater or less contact with particular synthesizer components located inside the lid enclosure (e.g. valves, solenoids, dispense lines, etc.). The lid enclosures of the present invention may also have a plurality of ventilation openings. This may be desirable in order to control or direct air flow through the primarily enclosed space (e.g., to minimize or to maximize air contact with particular synthesizer components inside the lid enclosure).

Figure 19B:
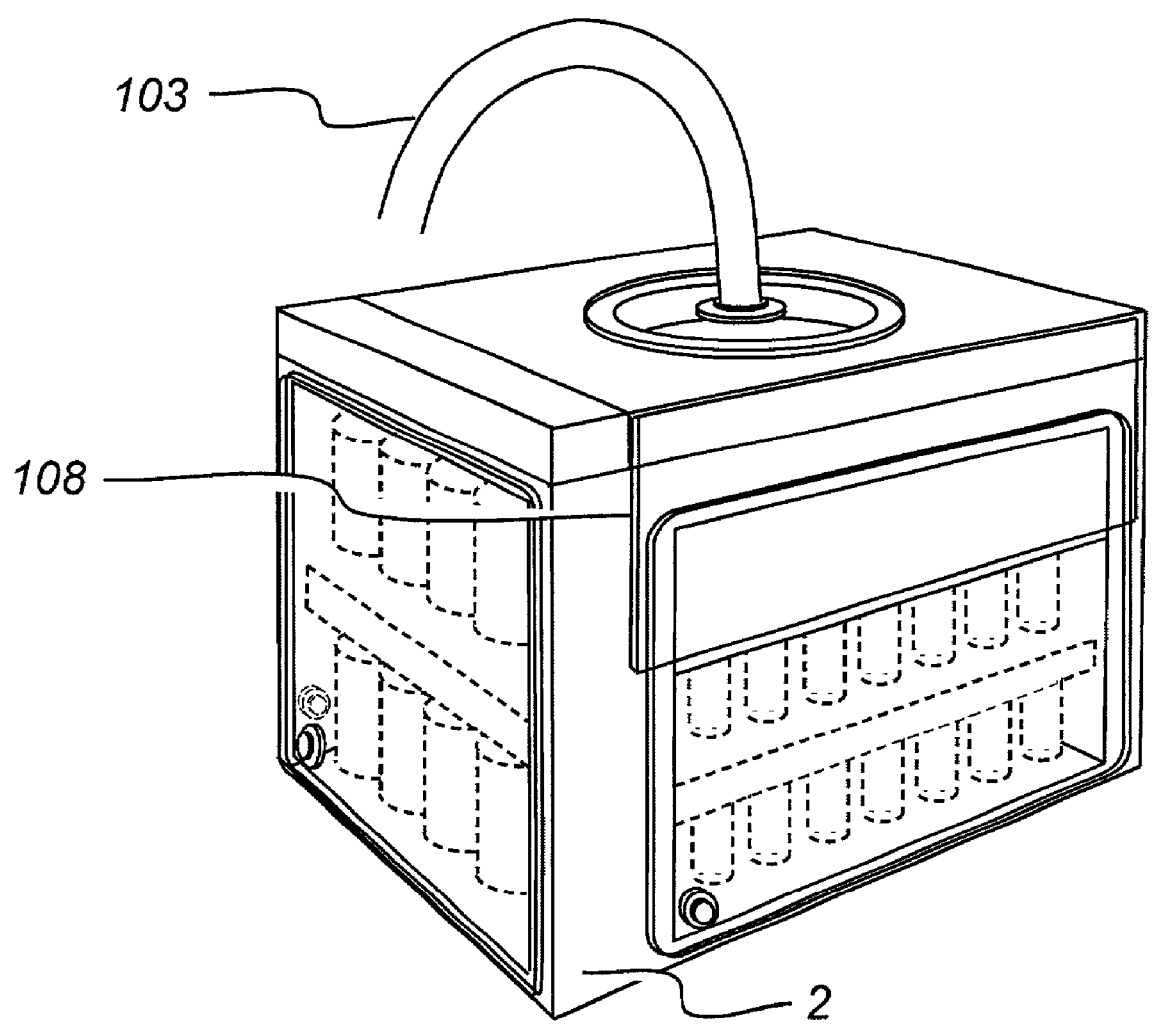
FIGS. 19B and 19C illustrate a synthesizer having ventilation tubing attached to a ventilation opening in a lid enclosure.
Figure 19C:
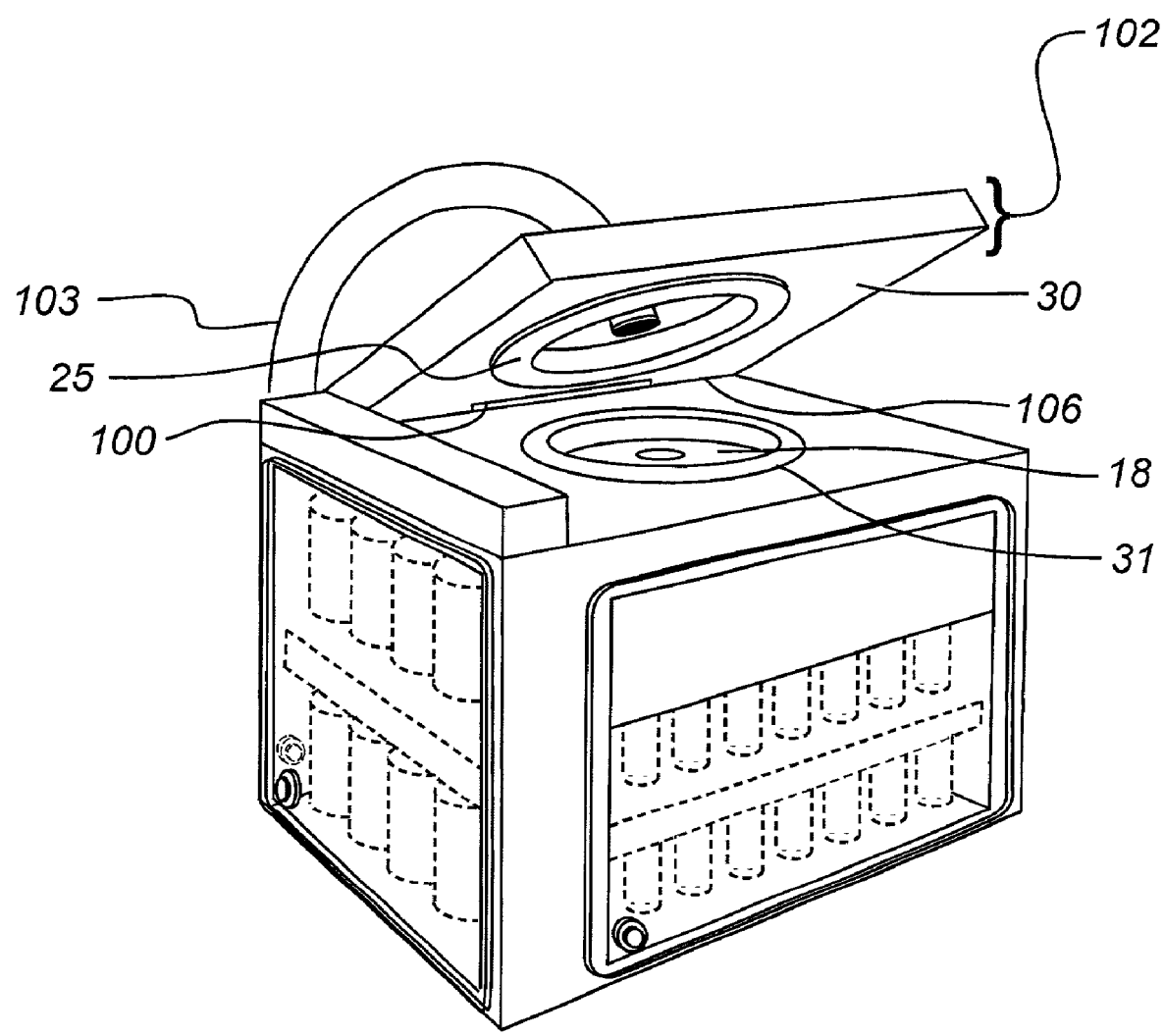

As shown in FIG. 19C, in certain embodiments, the lid enclosure is hinged so that is may be moved upward and downward (e.g., allowing access to the chamber bowl or other reaction chamber by a user). In some embodiments, the primarily enclosed space of the lid enclosure (e.g. 104, not shown in this figure) is open to the ambient environment through a ventilation slot (e.g. 100) in the top cover or the top enclosure (e.g. in top enclosure side wall towards the back of the machine).

In certain embodiments of the present invention, a lid enclosure is present on a commercially available machine (e.g., ABI 3900), and the lid enclosure is modified as described herein (e.g., a ventilation opening is made in the lid enclosure) An opening near the hinge for wiring serves as a ventilation slot on the 3900. In other embodiments, the lid enclosure must be added to synthesizer. For example, a synthesizer that simply has a top cover (e.g., 30), may have a top enclosure (e.g., 97) added thereto. This may be done by attaching a top enclosure that has bottom flanges (opposite the top panel) that fit around the top cover, and provide a point of attachment (e.g., bolts, screws, adhesives, etc.). In other embodiments, the lid enclosure is fabricated as a separate component, then installed onto a synthesizer. For example, the components making up the lid enclosure (top enclosure and top cover) may be formed from a single mold, or two molds, etc. In this regard, features of the present invention may be built into the lid enclosure, such as the ventilation opening, ventilation slot, and certain hood components (described below).

In some embodiments, e.g., as diagrammed in FIGS. 19A-C, the lid enclosure (e.g., 102) comprises, or is modified to comprise at least one ventilation opening (e.g., 105). One or more ventilation openings may be used. In preferred embodiments, a ventilation opening is placed in the center of the top panel so as to avoid blocking the operator's view of internal components, such as the synthesis columns, during operation. In preferred embodiments, the lid enclosure comprises windows constructed of transparent or translucent material, such as plexiglass.

In preferred embodiments, the lid enclosures of the present invention comprise a top panel directly opposite a top cover, and side walls between these two components The primarily enclosed space between the top panel and top cover is, in some embodiments, open to the ambient environment through a ventilation slot near the lid enclosure hinge (e.g., 106). In certain embodiments, the lid enclosure of the present invention comprises an inner window and an outer window (e.g. an outer window in the top panel, and an inner window in the top cover). The outer window of the instrument allows visual inspection of operations and components within the lid and within the chamber bowl 18 of the base 2. The inner window seals the chamber bowl 18 by pressing against the chamber gasket when the lid enclosure is closed. Reagent supply tubing passes through the inner window, but the window is sealed around each tube so that the chamber will maintain appropriate pressure during operation. In the embodiment shown in FIGS. AB and 19B, the ventilation opening provides an aperture is the outer window.

In preferred embodiments, the ventilation opening (e.g., 105) is attached to a ventilation tube (e.g., 103), that in turn may be attached to an exhaust system. In some embodiments, a synthesizer is attached to an individual exhaust system. In other embodiments, multiple synthesizers are attached to a centralized exhaust system (e.g. centralized venting or vacuum system). In a preferred configuration, access to the exhaust system is toward the rear of the instrument, to minimize or prevent interference by the ventilation tubing with operator access to the chamber bowl, and to conduct the fumes away from instrument operators. The centralized exhaust may be a constant vacuum or a periodically actuated vacuum. In particular embodiments, raising the top cover or lid enclosure of a synthesizer triggers the vacuum system. In certain embodiments, reagent bottles on the sides of a synthesizer may also be vented through ventilation ports employing the same ventilation system employed by the ventilation tube attached to the top panel.

Figure 20A:
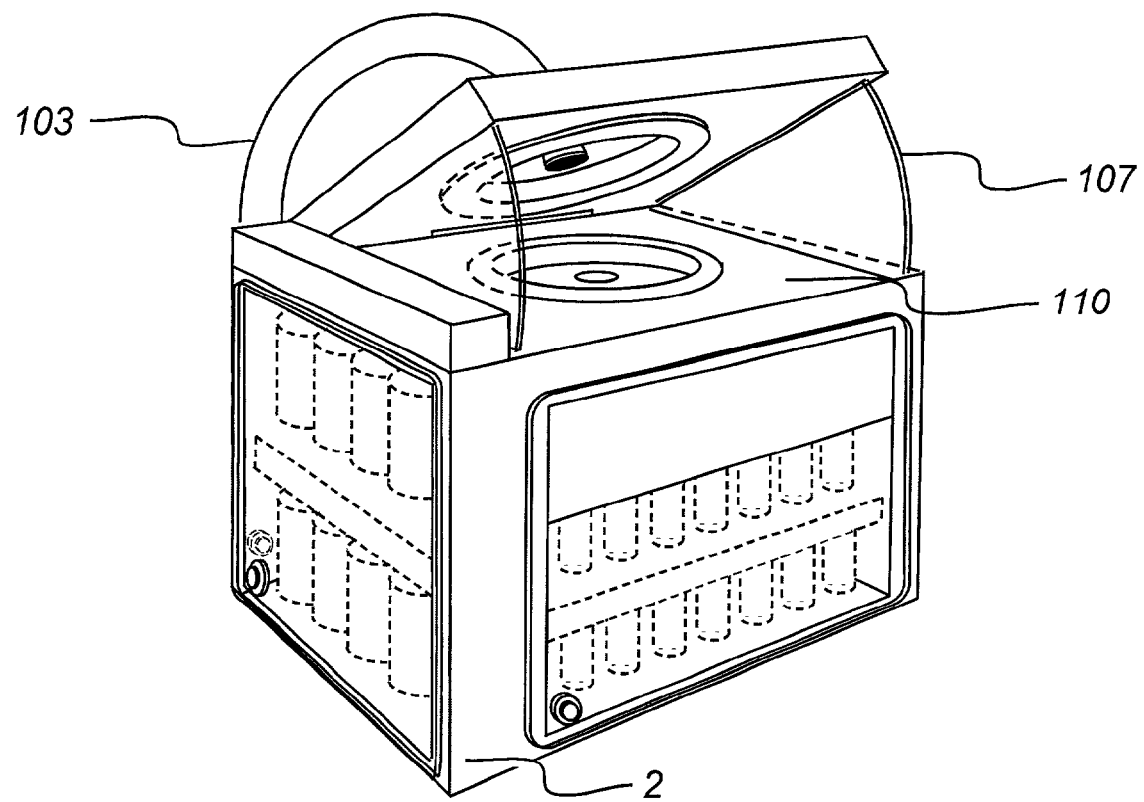
FIGS. 20A-20C illustrate synthesizers having ventilated workspaces.
Figure 20B:
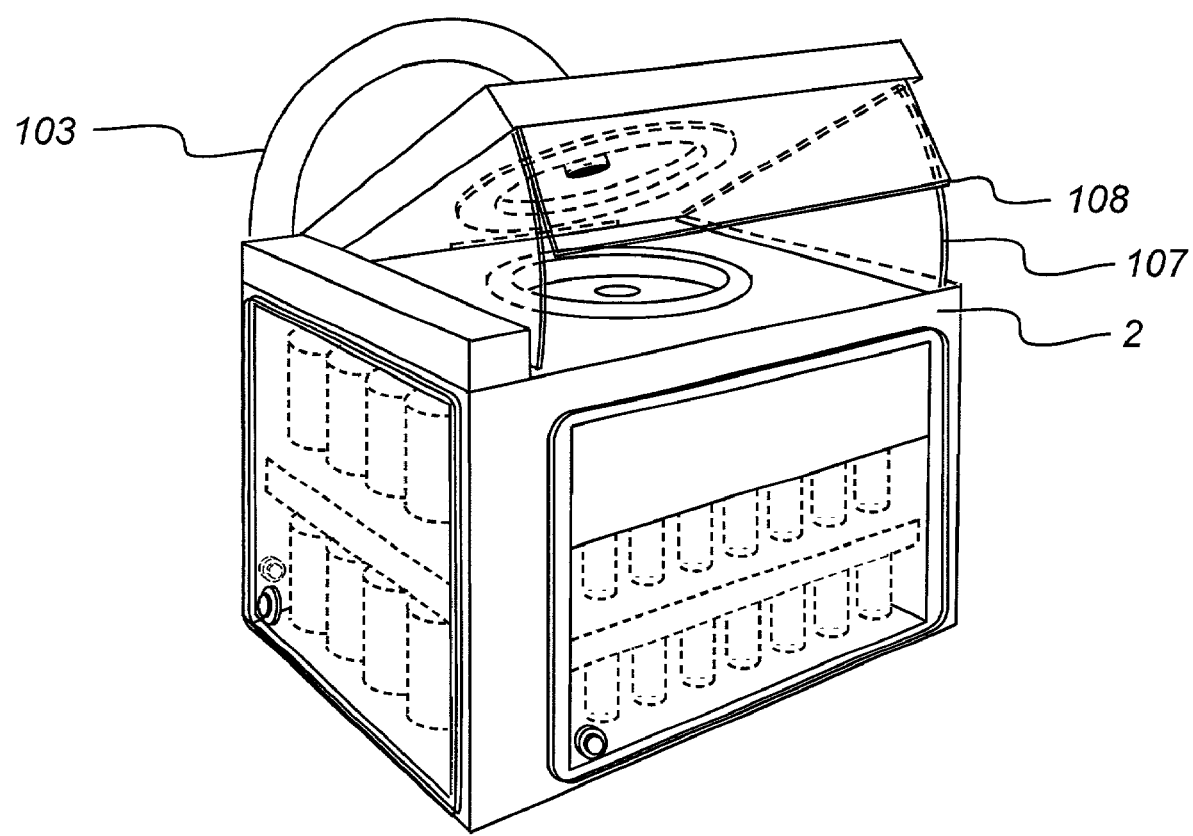
Figure 20C:
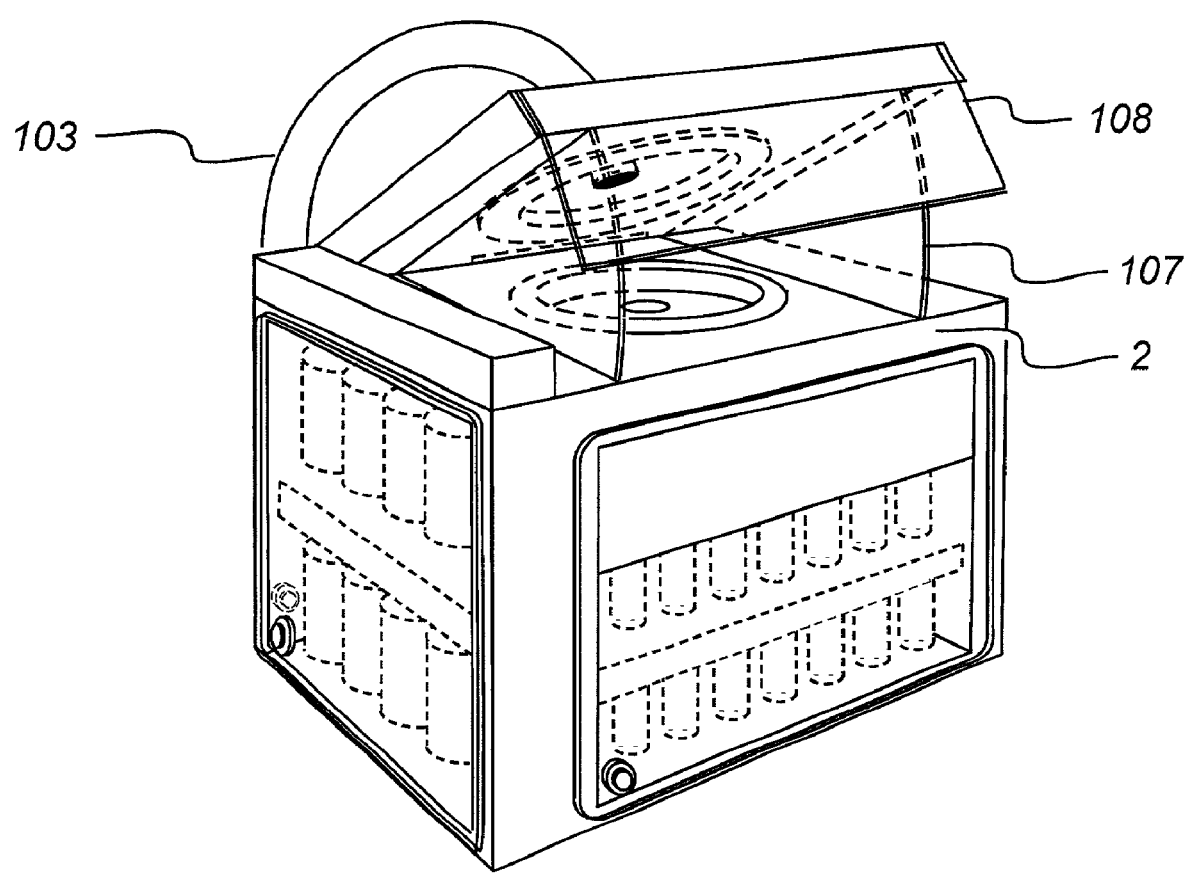

Another aspect of the present invention is to provide a ventilated workspace (e.g., around the chamber bowl) having a negative air pressure relative to the surrounding air pressure, such that the flow of air goes from the surrounding room into the ventilated workspace, and not in the reverse, during operation of the ventilation system (e.g., as shown in FIGS. 21B and 22B). The ventilated workspace is designed to allow the instrument operator to reach into the space (e.g., to remove the synthesis columns) without turning off the ventilation system. One embodiment of a ventilated workspace is shown in FIG. 20A, wherein the ventilated workspace is created by providing side panels (e.g., 107). Two variations of another embodiment are shown in FIGS. 20B and 20C. In this embodiment, the ventilated workspace is created by providing side panels (e.g., 107) between the body of the synthesizer and the lid enclosure, and a front panel (e.g., 108). In certain embodiments, the ventilated workspace is created by including only side panels. In other embodiments, the ventilated workspace is created by only including a front panel. In preferred embodiments, side and front panels are used together (e.g., as in FIGS. 20B and 20C) to create a ventilated workspace. In some embodiments, side and front panels are provided as separate components. In other embodiments, a single component comprising both side panels and a front panel is provided.

The size of the ventilated workspace can be altered by the placement of the panels, e.g., the side panels (107) shown in FIGS. 20A-C. In some embodiments, panels are positioned to maximize the size of the enclosed ventilated workspace (e.g., as in FIG. 20B). In other embodiments, the panels are positioned to provide a smaller ventilated workspace (e.g., as with the side panels in FIG. 20C). In some preferred embodiments, the side panels are positioned as close to the top chamber gasket (e.g., 31) as they can be without disturbing the seal between the top chamber gasket and the top cover 30. In certain embodiments, the front and/or side panels are used with a synthesizer only having a top cover (not a full lid enclosure).

The side panels can be made of a number of different materials. In some embodiments, the materials used for the side panels are opaque. In other embodiments, the side panels are translucent or clear (e.g., to permit surrounding light into the ventilated workspace). In certain embodiments, the side panels are constructed from flexible polymeric material (e.g., sheeting), such as polyethylene or polypropylene. In some embodiments, the polymeric material has an average thickness of about 2 to 8 mils. In preferred embodiments, the polymeric material has an average thickness of about 2 to 4 mils. In some embodiments, the panels are collapsible (i.e., can collapse or fold down upon themselves as the lid enclosure or top cover, is lowered). In some embodiments, panels are accordion-style or fan-fold style barriers that fold down upon themselves when the top cover or lid enclosure is lowered. In preferred embodiments, when the panels are collapsed, they have a total thickness that is less than the height of the O-ring or gasket (e.g., top chamber seal 31) on the interior of the synthesizer (e.g., so that there is no interference with the sealing of the O-ring).

In other embodiments, the side panels are constructed of rigid material. In some embodiments, rigid side panels are configured to fit into recesses in the body of the synthesizer when the top cover or lid enclosure is closed. In other embodiments, rigid side panels are configured to fit come down around the outside of the base of the synthesizer when the top cover or lid enclosure is closed. In some embodiments, rigid side panels are constructed from opaque materials (e.g., steel, aluminum, opaque plastic). In other embodiments, rigid side panels are constructed from translucent or transparent material, such as plexiglass. Generally, the side panels are connected to the top cover, so when the top cover or lid enclosure is raised, the side panels slide up to form sides for the ventilated workspace.

In certain embodiments, a front panel (e.g., 108) is attached to the lid enclosure. For example, the front panel may attach to the top cover (e.g., FIG. 20B), or the front panel may attach to one of sides of the lid enclosure (e.g., FIG. 20C). The front panel may drape over the front of the synthesizer when the lid enclosure is closed (See, e.g., FIGS. 19B and 20C). Alternatively, the front panel may fit into a recessed slot in the synthesizer base, or fold up upon itself as the lid enclosure is lowered into the closed position.

Attachment of the panels provided for the purpose of enclosing the ventilated workspace is not limited to any particular means. For example, in a simple configuration, panels are attached by use of strips of VELCRO fastener (e.g., adhesive backed strips), for easy mounting and removal. For a sturdier attachment, the panels may be attached using fasteners, including but not limited to screws, bolts, welds, and snaps, or may be attached with removable or permanent adhesives. The presence of the panels reduces the size of the opening through which ambient air can enter the ventilated workspace, and also reduces the size of the opening from which air and vapors in the chamber bowl can escape. When the ventilation system is turned on (e.g., when the connected ventilation tube is drawing air from the ventilation opening, the airflow through the reduced opening prevents or reduces any flow (e.g. outward flow) of gaseous emissions. When the ventilation system is actuated, ambient air and reagent vapors are drawn across the chamber bowl (e.g., 18) and into the ventilation slot (e.g., 100), as diagrammed in FIGS. 21B and 22B. The air and vapors then move through the primarily enclosed space (e.g., 104) and exit through the ventilation opening (e.g., 105) into the ventilation tube (e.g., 103). In some embodiments, the air flow rate at the opening of the ventilated workspace (e.g., in the embodiments shown in FIGS. 20B and 20B, where the surrounding air is drawn into the ventilated workspace below the front panel and between the side panels) is from about 20 to about 100 feet per minute, face velocity. In some preferred embodiments, the flow rate at the opening is about 40 to 50 feet per minute, face velocity.

From the ventilation tube, the air and vapors may be vented, treated or collected. In certain embodiments, the vented air and vapors are routed to a central scrubber. The central scrubber may form part of an overall emission control system. The central system may also be used to adjust total airflow for the number of synthesizers that are open at the same time. In this regard, exhaust from the system is minimized so as to concentrate waste vapors.

In order to increase or decrease the speed at which air and vapors travels through the ventilation system of the present invention, the size of the ventilation slot may be adjusted (e.g. reducing the size of the ventilation slot increase the speed of the moving air and vapors). The airflow pattern made possible by the present invention allows synthesizers to be opened (e.g. to change columns, etc) without exposure of an operator to hazardous vapors (e.g. argon, solvent fumes, etc).

The integrated chamber ventilation system of the present invention may be adapted to many synthesizers of both 'open' and 'closed' design. On example of another synthesizer that can be modified to include the reaction enclosure ventilation system of the present invention is the POLYPLEX 96-channel, high-throughput oligonucleotide synthesizer from GeneMachines, San Carlos, Calif., which comprises a synthesis case providing an enclosure for the synthesis block in which the reactions are performed. A similar instrument is described in WO 00/56445, published Sep. 28, 2000, and in related U.S. Provisional Patent application 60/125262, filed Mar. 19, 1999, each incorporated herein in their entireties. As described in WO 00/56445, the synthesis case has a loading station, drain station, and water-tolerant and water-sensitive reagent filling stations. The synthesis case has a cover, a first and a second side, a first and a second end, and a bottom side, which contacts the base. The load station comprises a sealable opening in the synthesis case through which a multiwell plate can be inserted. In application of the present invention, the synthesis case can be fitted with one or more ventilation openings similar to ventilation opening 105, for attachment to ventilation tubing (e.g., 103). In some embodiments, a ventilation opening is in a side of the synthesis case opposite the side having the sealable opening. In preferred embodiments, a ventilation opening in the synthesis case is on the first or second end. In particularly preferred embodiments, the ventilation system is actuated when the sealable opening is opened, e.g., for insertion or removal of a multiwell plate.

II) Production Facilities

The present invention provides synthesizer arrays (e.g., groups of synthesizers). In some embodiments, the synthesizers are arranged in banks. For example, a given bank of synthesizers may be used to produce one set of oligonucleotides. The present invention is not limited to any one synthesizer. Indeed, a variety of synthesizers are contemplated, including, but not limited to the synthesizers of the present invention, MOSS EXPEDITE 16-channel DNA synthesizers (PE Biosystems, Foster City, Calif.), OligoPilot (Amersham Pharmacia,), and the 3900 and 3948 48-Channel DNA synthesizers (PE Biosystems, Foster City, Calif.). In some embodiments, synthesizers are modified or are wholly fabricated to meet physical or performance specifications particularly preferred for use in the synthesis component of the present invention. In some embodiments, two or more different DNA synthesizers are combined in one bank in order to optimize the quantities of different oligonucleotides needed. This allows for the rapid synthesis (e.g., in less than 4 hours) of an entire set of oligonucleotides (all the oligonucleotide components needed for a particular assay, e.g., for detection of one SNP using an INVADER assay [Third Wave Technologies, Madison, Wis.]).

In some embodiments the DNA synthesizer component includes at least 100 synthesizers. In other embodiments, the DNA synthesizer component includes at least 200 synthesizers. In still other embodiments, the DNA synthesizer component includes at least 250 synthesizers. In some embodiments, the DNA synthesizers are run 24 hours a day.

A. Automated and Fail-Safe Reagent Supply

In some embodiments, the DNA synthesizers in the oligonucleotide synthesis component further comprise an automated reagent supply system. The automated reagent supply system delivers reagents necessary for synthesis to the synthesizers from a central supply area. In some embodiments, the central supply area is provided in an isolated room equipped for accommodating leakage, fires, and explosions without threatening other portions of the synthesis facility, the environment, or humans. Where the central supply area provides reagents for multiple synthesizers, in some embodiments, the system is configured to allow banks of synthesizer or individual synthesizer to be removed from the system (e.g., for maintenance or repair) without interrupting activity at other synthesizers. Thus, the present invention provides an efficient fail-safe reagent delivery system.

For example, in some embodiments, acetonitrile is supplied via tubing (e.g., stainless steel or TEFLON tubing) through the automated supply system. De-blocking solution may also be supplied directly to DNA synthesizers through tubing. In some preferred embodiments, the reagent supply system tubing is designed to connect directly to the DNA synthesizers without modifying the synthesizers. Additionally, in some embodiments, the central reagent supply is designed to deliver reagents at a constant and controlled pressure. The amount of reagent circulating in the central supply loop is maintained at 8 to 12 times the level needed for synthesis in order to allow standardized pressure at each instrument. The excess reagent also allows new reagent to be added to the system without shutting down. In addition, the excess of reagent allows different types of pressurized reagent containers to be attached to one system. The excess of reagents in one centralized system further allows for one central system for chemical spills and fire suppression.

In some embodiments, the DNA synthesis component includes a centralized argon delivery system. The system includes high-pressure argon tanks adjacent to each bank of synthesizers. These tanks are connected to large, main argon tanks for backup. In some embodiments, the main tanks are run in series. In other embodiments, the main tanks are set up in banks. In some embodiments, the system further includes an automated tank switching system. In some preferred embodiments, the argon delivery system further comprises a tertiary backup system to provide argon in the case of failure of the primary and backup systems.

Figure 14:
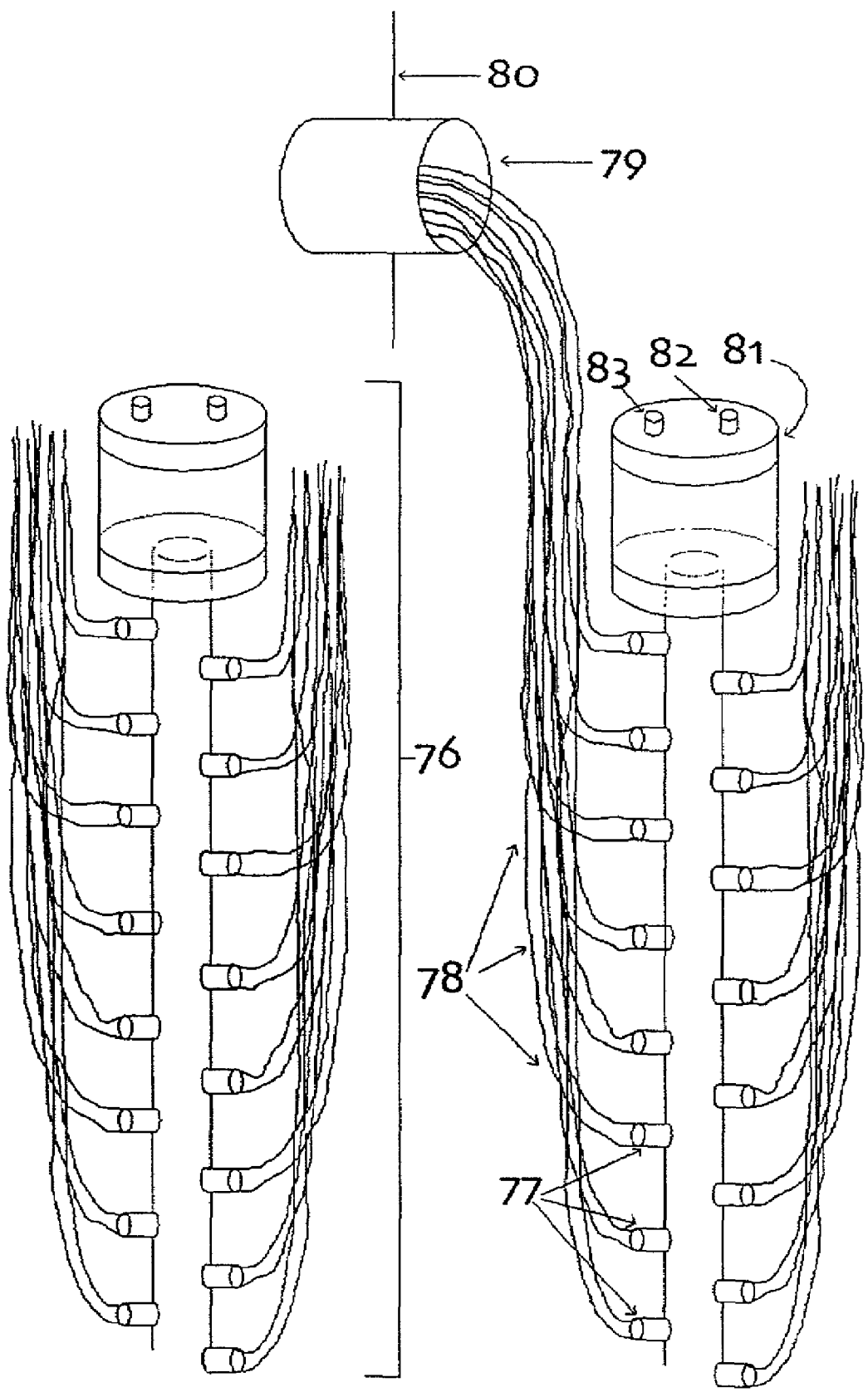
FIG. 14 illustrates a branched delivery component.

In some embodiments, one or more branched delivery components are used between the reagent tanks and the individual synthesizers or banks of synthesizers. For example, in some embodiments, acetonitrile is delivered through a branched metal structure (e.g., the structure described in FIG. 14). Where more than one branched delivery component is used, in preferred embodiments, each branched delivery component is individually pressurized.

The present invention is not limited by the number of branches in the branched delivery component. In preferred embodiments, each branched delivery component (76) contains ten or more branches (77). Reagent tanks may be connected to the branched delivery components using any number of configurations. For example, in some embodiments, a single reagent tank is matched with a single branched component. In other embodiments, a plurality of reagent tanks is used to supply reagents to one or more branched components. In some such embodiments, the plurality of tanks may be attached to the branched components through a single feed line, wherein one or a subset of the tanks feeds the branched components until empty (or substantially empty), whereby a second tank or subset of tanks is accessed to maintain a continuous supply of reagent to the one or more branched components. To automate the monitoring and switching of tanks, an ultrasonic level sensor may be applied.

In some embodiments, each branch of the branched delivery component provides reagent to one synthesizer or to a bank of synthesizers through connecting tubing (78). In preferred embodiments, tubing is continuous (i.e., provides a direct connection between the delivery branch and the synthesizer). In some preferred embodiments, the tubing comprises an interior diameter of 0.25 inches or less (e.g., 0.125 inches). In some embodiments, each branch contains one or more valves (preferably one). While the valve may be located at any position along the delivery line, in preferred embodiments, the valve is located in close proximity to the synthesizer. In other embodiments, reagent is provided directly to synthesizers without any joints or valves between the branched delivery component and the synthesizers.

In some embodiments, the solvent is contained in a cabinet designed for the safe storage of flammable chemicals (a "flammables cabinet") and the branched structure is located outside of the cabinet and is fed by the solvent container through tubing passed through the wall of the cabinet. In other embodiments, the reagent and branched system is stored in an explosion proof room or chamber and the solvent is pumped via tubing through the wall of the explosion proof room. In preferred embodiments, all of the tubing from each of the branches is fed through the wall in at a single location (e.g., through a single hole (79) in the wall (80)).

The reagent delivery system of the present invention provides several advantages. For example, such a system allows each synthesizer to be turned off (e.g., for servicing) independent of the other synthesizers. Use of continuous tubing reduces the number of joints and couplings, the areas most vulnerable to failure, between the reagent sources and the synthesizers, thereby reducing the potential for leakage or blockage in the system. Use of continuous tubing through inaccessible or difficult-to-access areas reduces the likelihood that repairs or service will be needed in such areas. In addition, fewer valves results in cost savings.

In some embodiments, the branched tubing structure further provides a sight glass (81). In preferred embodiments, the sight glass is located at the top of the branched delivery structure. The sight glass provides the opportunity for visual and physical sampling of the reagent. For example, in some embodiments, the sight glass includes a sampling valve (82) (e.g., to collect samples for quality control). In some embodiments, the site glass serves as a trap for gas bubbles, to prevent bubbles from entering the connecting tubing (78). In other embodiments, the sight glass contains a vent (e.g., a solenoid valve) for de-gassing of the system (83). In some embodiments, scanning of the sight glass (e.g., spectrophotometrically) and sampling are automated. The automated system provides quality control and feedback (e.g., the presence of contamination).

In other embodiments, the present invention provides a portable reagent delivery system. In some embodiments, the portable reagent delivery system comprises a branched structure connected to solvent tanks that are contained in a flammables cabinet. In preferred embodiments, one reagent delivery system is able to provide sufficient reagent for 40 or more synthesizers. These portable reagent delivery systems of the present invention facilitate the operation of mobile (portable) synthesis facilities. In another embodiment, these portable reagent delivery systems facilitate the operation of flexible synthesis facilities that can be easily re-configured to meet particular needs of individual synthesis projects or contracts. In some embodiments, a synthesis facility comprises multiple portable reagent delivery systems.

B. Waste Collection

In some embodiments, the DNA synthesis component further comprises a centralized waste collection system. The centralized waste collection system comprises cache pots for central waste collection. In some embodiments, the cache pots include level detectors such that when waste level reaches a preset value, a pump is activated to drain the cache into a central collection reservoir. In preferred embodiments, ductwork is provided to gather fumes from cache pots. The fumes are then vented safely through the roof, avoiding exposure of personnel to harmful fumes. In preferred embodiments, the air handling system provides an adequate amount of air exchange per person to ensure that personnel are not exposed to harmful fumes. The coordinated reagent delivery and waste removal systems increase the safety and health of workers, as well as improving cost savings.

Figure 15:
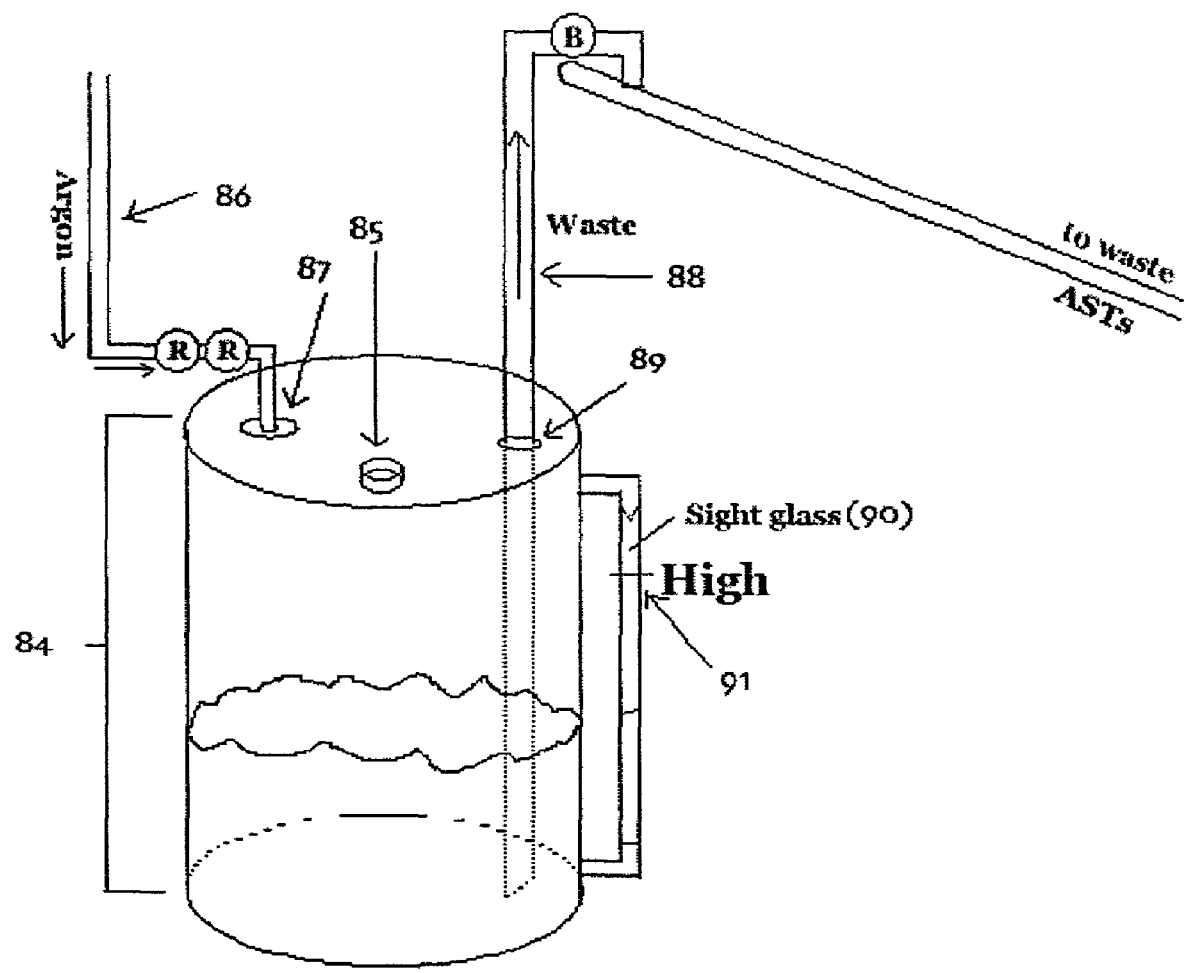
FIG. 15 illustrates an exemplary waste disposal system
Figure 16:
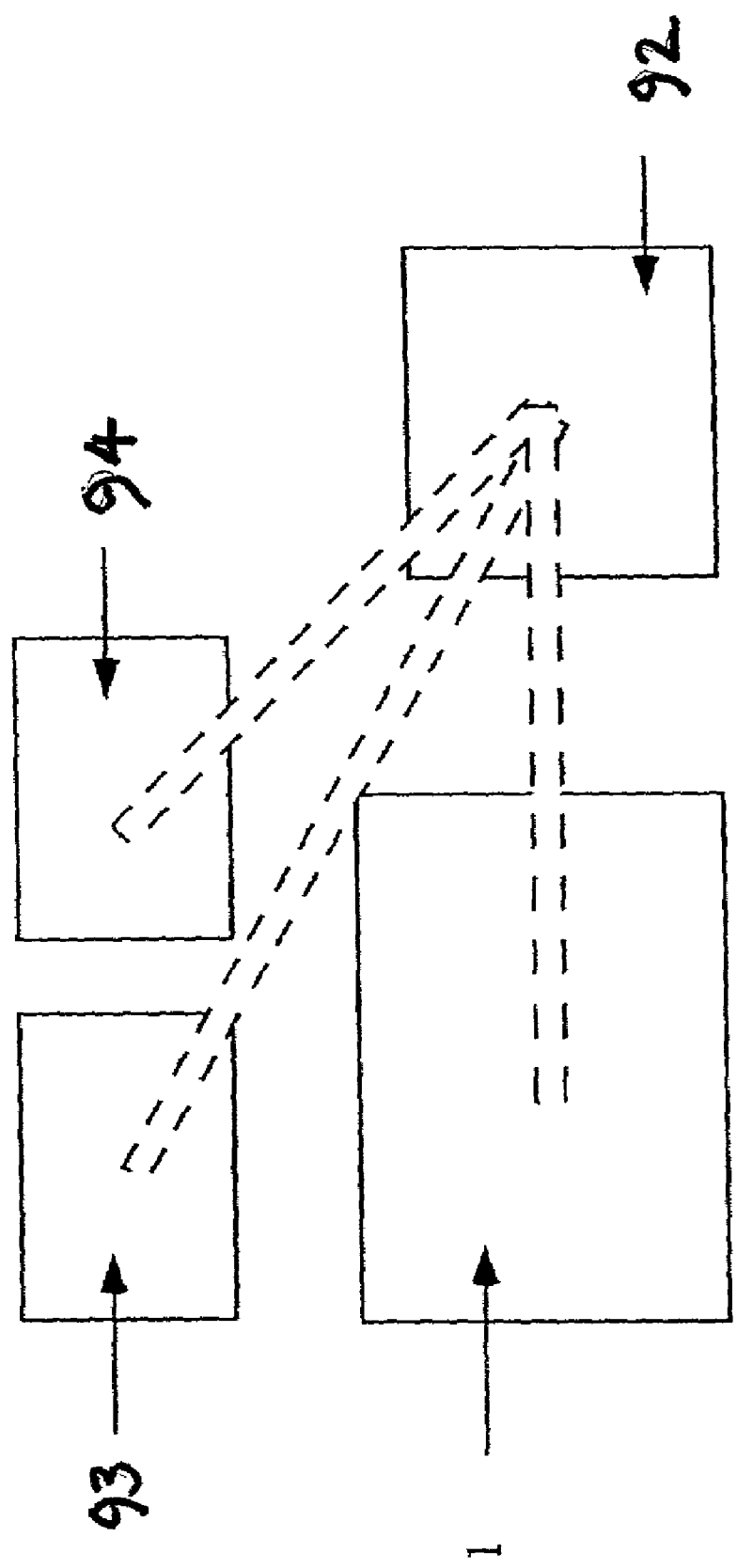
FIG. 16 illustrates a synthesizer 1, a robotic means 92, a cleave and deprotect component 93 and a purification component 94.
Figure 17A:
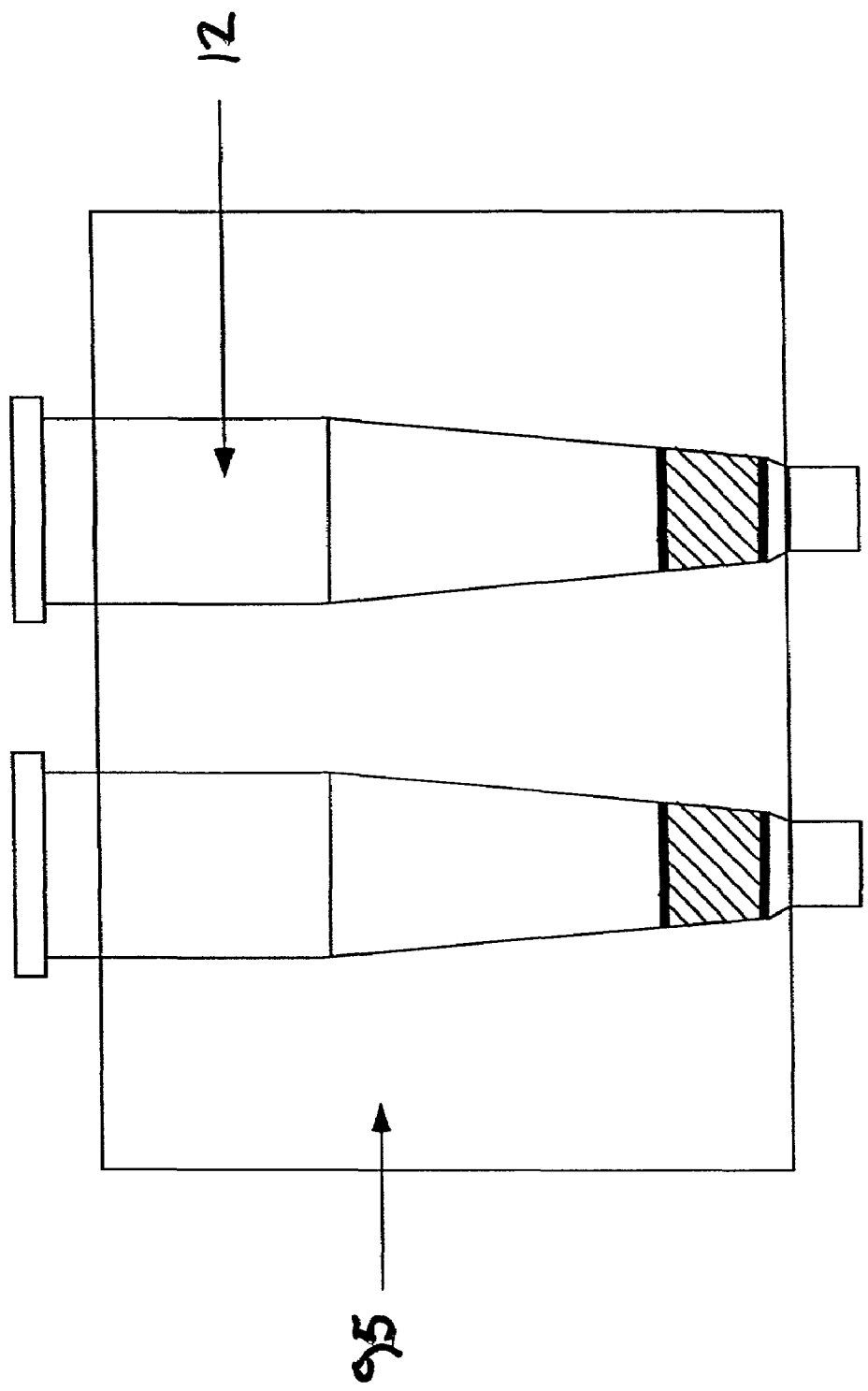
FIGS. 17A-C illustrate different embodiments of energy input components 95 and mixing components 96.
Figure 17B:
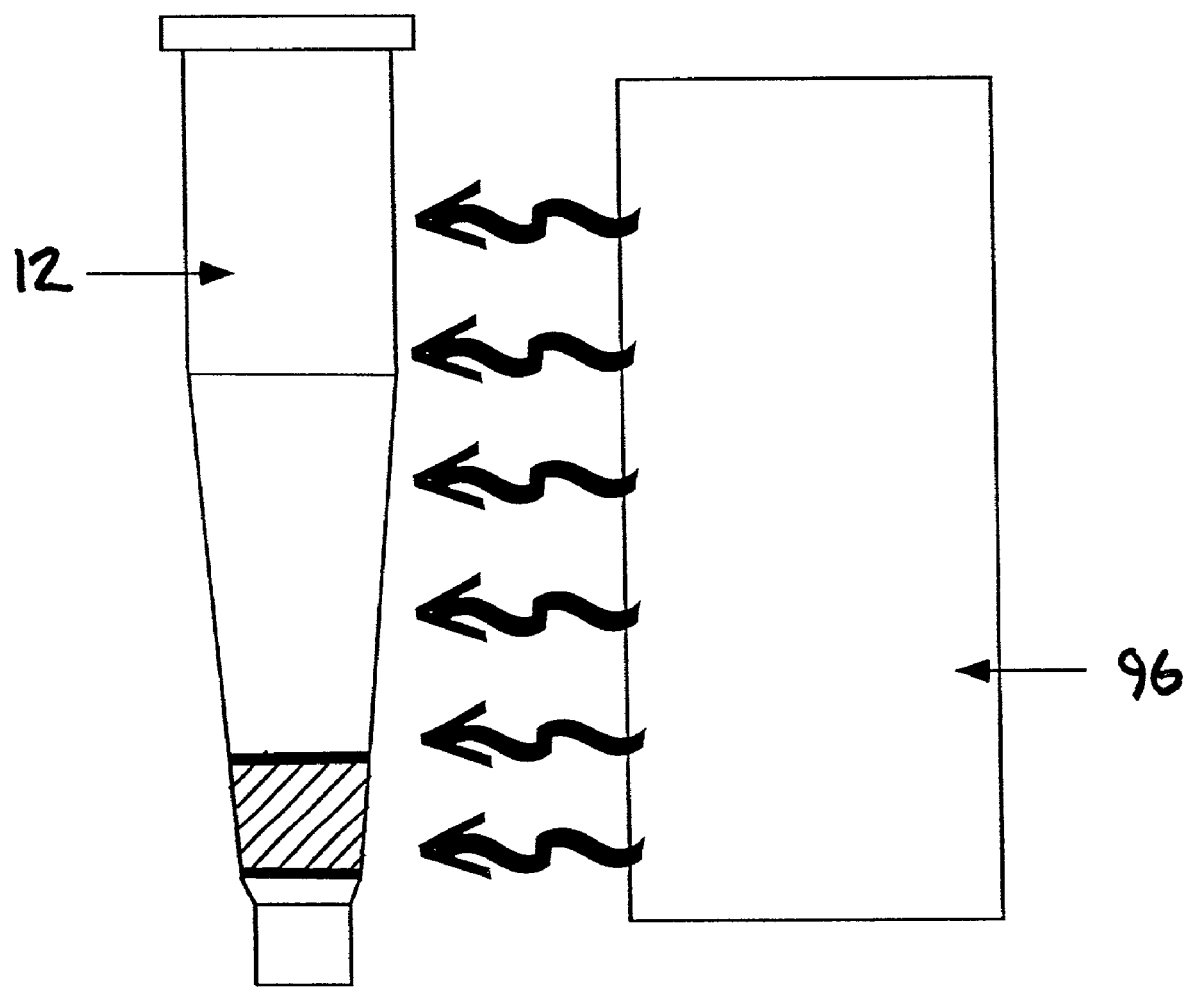
Figure 17C:
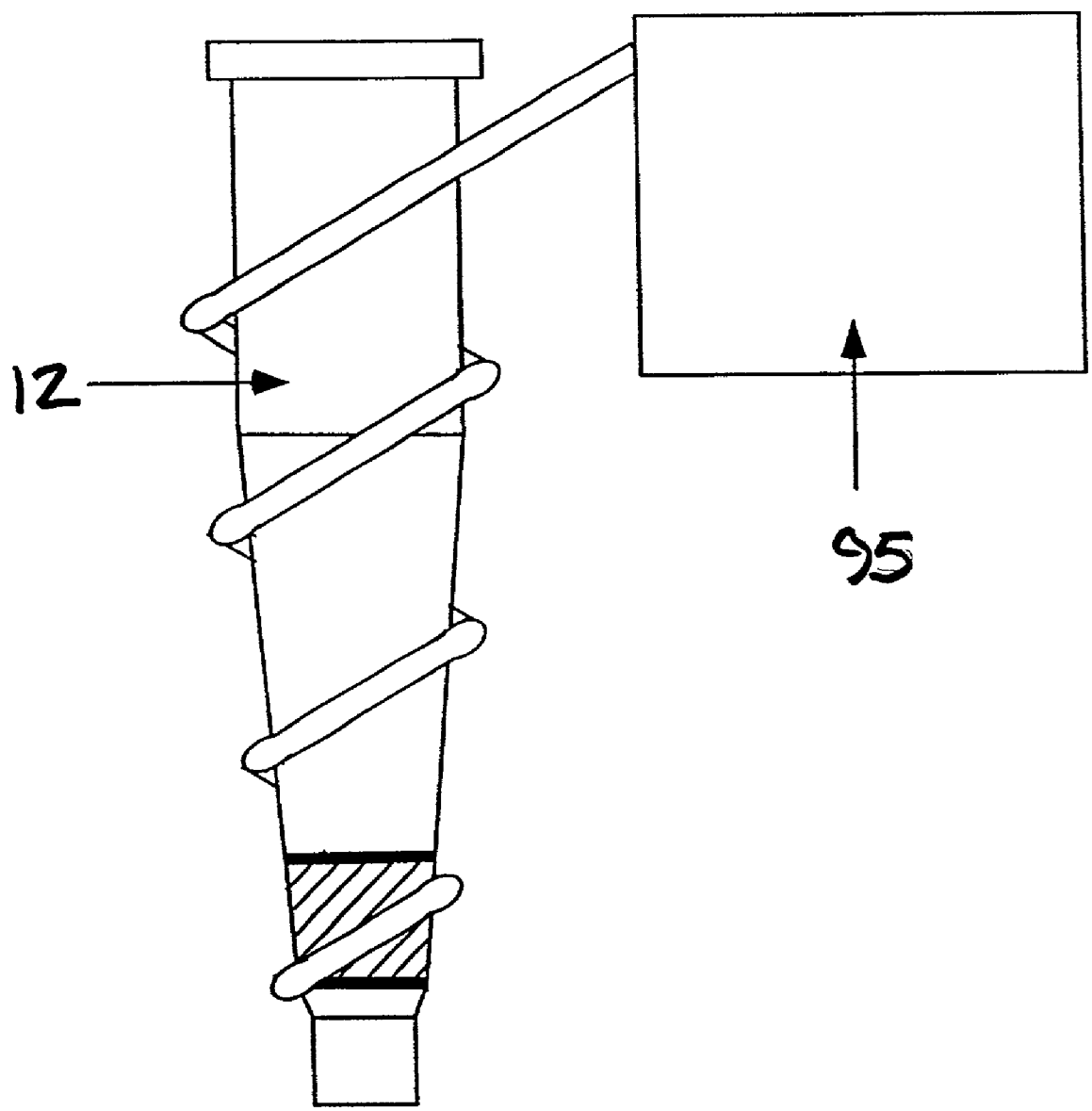
Figure 18A:
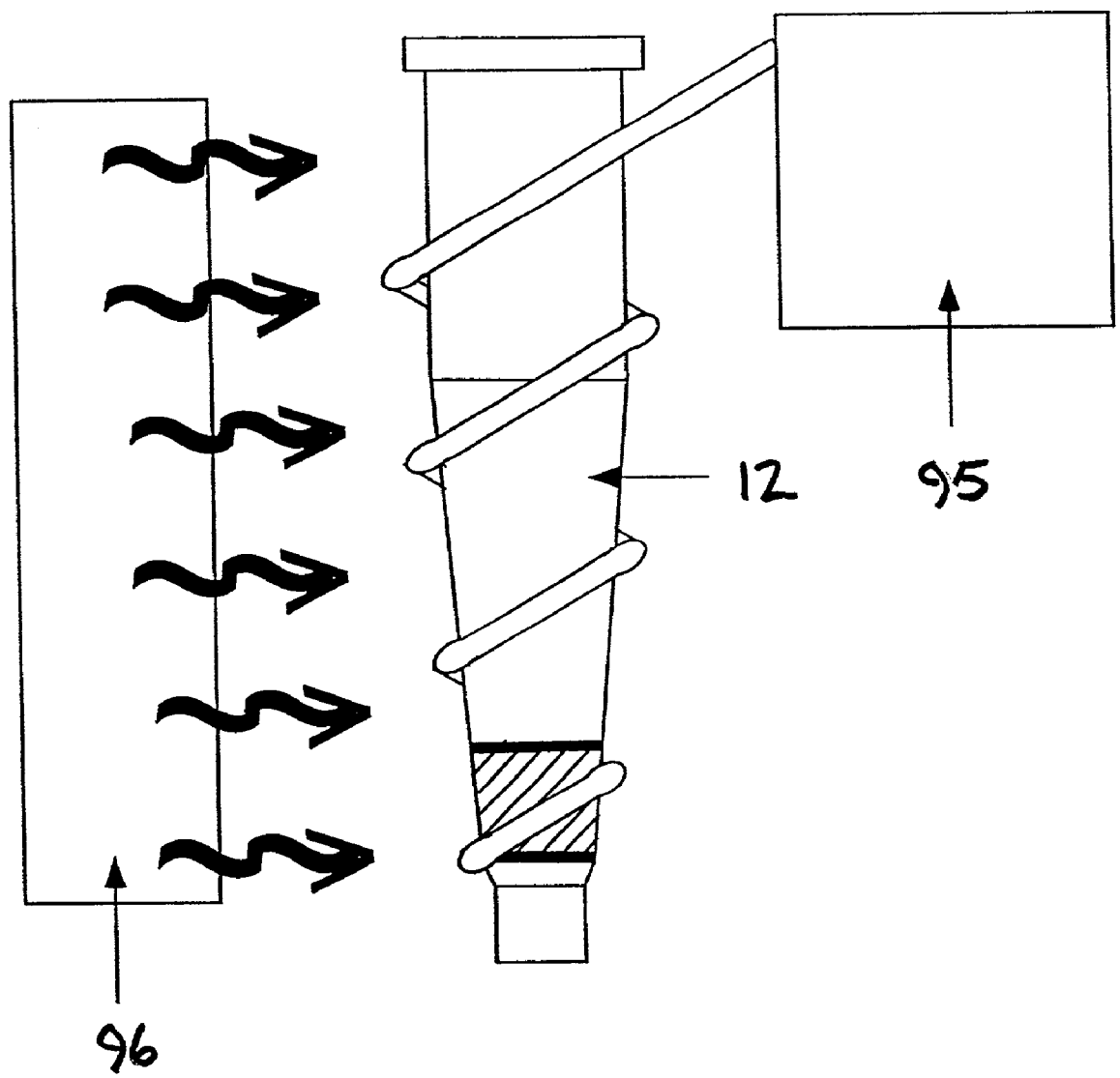
FIGS. 18A-B illustrate different combinations of energy input components 95 and mixing components 96.
Figure 18B:
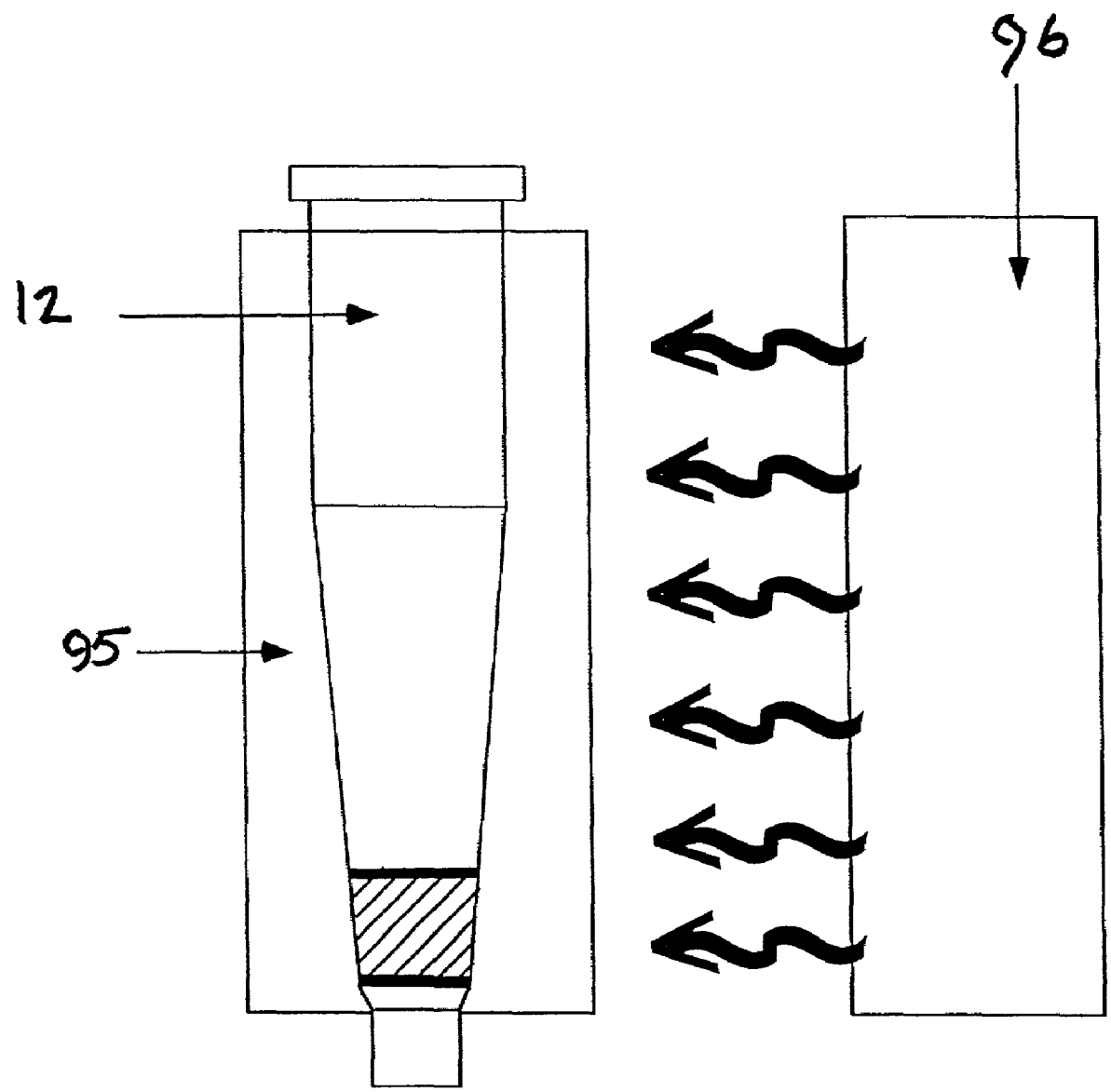

In some embodiments, the solvent waste disposal system comprises a waste transfer system. In some preferred embodiments, the system contains no electronic components. In some preferred embodiments, the system comprises no moving parts. For example, in some embodiments, waste is first collected in a liquid transfer drum (84) designed for the safe storage of flammable waste (See FIG. 15 for an exemplary waste disposal system). In some embodiments, waste is manually poured into the drum through a waste channel (85). In preferred embodiments, solvent waste is automatically transported (e.g., through tubing) directly from synthesizers to the drum (84). To drain the liquid transfer drum (84), argon is pumped from a pressurized gas line (86) into the drum through a first opening (87), forcing solvent waste out an output channel (88) at a second opening (89) (e.g., through tubing) into a centralized waste collection area. In preferred embodiments, the argon is pumped at low pressure (e.g., 3-10 pounds per square inch (psi), preferably 5 psi or less). In some embodiments, the drum (84) contains a sight glass (90) to visualize the solvent level. In some embodiments, the level is visualized manually and the disposal system is activated when the drum (84) has reached a selected threshold level (91). In other embodiments, the level is automatically detected and the disposal system is automatically activated when the drum (84) has reached the threshold level (91).

The solvent waste transfer system of the present invention provides several advantages over manual collection and complex systems. The solvent waste system of the present invention is intrinsically safe, as it can be designed with no moving or electrical parts. For example, the system described above is suitable for use in Division I/Class I space under EPA regulations.

Some process steps may put out caustic waste. For example, deprotection of synthesized oligonucleotides generally includes treatment with $NH_4OH$. In some embodiments, caustic waste is neutralized before disposal, e.g., to a sanitary sewer. In preferred embodiments, the neutralization of the waste is checked (e.g., by measurement of pH) to ensure that it is in an appropriate condition for disposal via the intended system (e.g., the sanitary sewer system).

In some embodiments, waste from each deprotection station is neutralized before collection to a centralized waste collection or disposal system. In other embodiments, caustic waste from a plurality of deprotection stations is collected before neutralization.

By way of example, and not intended as a limitation, the following provides a description for one embodiment of a centralized collection and neutralization system for caustic waste. The system may comprise collection of caustic waste from one or more stations in a tank, e.g., a carboy. In some embodiments, the amount of neutralizing reagent required to neutralize a defined amount of caustic waste is calculated, based on the volume and content of the waste. In some embodiments, the calculated amount of neutralizing reagent is added after collection of the waste. In preferred embodiments, the calculated amount of neutralizing reagent is provided in the carboy, such that when the carboy is full or when the combined volume of the neutralizer and waste reaches a predetermined volume, the waste has been neutralized.

In one embodiment, the carboy is provided with a pH probe for measurement of the pH of the collected waste. In some embodiments, the system provides a means of altering the pH of the collected waste. In preferred embodiments, the altering of the pH occurs in response to a measured pH value for the collected waste. For example, if the pH is determined to be outside a certain range, (e.g., if it does not fall between, for example, pH 7 and pH 9), the system provides a reagent selected to adjust the pH to the selected range (e.g., if the pH is found to be high, the system dispenses an acidic solution for neutralization; if the pH is low, the system dispenses a basic solution for neutralization). When the pH comes into the selected range, the system shuts off the dispenser. For the step of dispensing a neutralizing reagent, any system suitable for the controlled delivery of a reagent is contemplated. For example, discharge may be accomplished via a mechanical dispenser, or discharge can be accomplished via non-mechanical means, e.g., via control of air pressure.

In some embodiments, neutralization treatment is provided to the collected waste in bulk, e.g., when the carboy is full or when it reaches a predetermined threshold level. In other embodiments, neutralization is periodic. In some embodiments, periodic neutralization is set to occur at particular times, e.g., at particular times of day, or whenever a particular interval of time has passed since the last treatment. In other embodiments, periodic treatment is set to respond to a condition of the waste container, such as whenever a new addition of waste material occurs, or whenever the pH is not within the selected range. In yet other embodiments, periodic treatment occurs based on a combination of these or other factors.

In a preferred embodiment, the carboy is provided with a means for mixing, such as a stirrer or agitator. In some embodiments, the system comprises a device for keeping a precipitate suspended. In some embodiments, the system provides a filter for removing precipitates, particulates or other non-liquid matter in the collected waste. In other preferred embodiments, the system provides a means of venting gasses. In particularly preferred embodiments, the gasses are collected for disposal through a centralized ventilation system.

C. Centralized Control System

In some embodiments, all of the DNA synthesizers in the synthesis component are attached to a centralized control system. The centralized control system controls all areas of operation, including, but not limited to, power, pressure, reagent delivery, waste, and synthesis. In some preferred embodiments, the centralized control system includes a clean electrical grid with uninterrupted power supply. Such a system minimizes power level fluctuations. In additional preferred embodiments, the centralized control system includes alarms for air flow, status of reagents, and status of waste containers. The alarm system can be monitored from the central control panel. The centralized control system allows additions, deletions, or shutdowns of one synthesizer or one block of synthesizers without disrupting operations of other instruments. The centralized power control allows user to turn instruments off instrument-by-instrument, bank-by-bank, or the entire module.

D. Integrated Production Process

In some embodiments, the present invention provides an automated production process. In some embodiments, the automated production process includes an oligonucleotide synthesizer component and an oligonucleotide-processing component. In some embodiments, the oligonucleotide production component includes multiple components, including but not limited to, an oligonucleotide cleavage and deprotection component, an oligonucleotide purification component, an oligonucleotide dry down component; an oligonucleotide de-salting component, an oligonucleotide dilute and fill component, and a quality control component. In some embodiments, the automated DNA production process of the present invention further includes automated design software and supporting computer terminals and connections, a product tracking system (e.g., a bar code system), and a centralized packaging component. In some embodiments, the components are combined in an integrated, centrally controlled, automated production system. The present invention thus provides methods of synthesizing several related oligonucleotides (e.g., components of a kit) in a coordinated manner. In some embodiments, a sample holder (e.g., a reaction support) is shared between two or more of the components of the production process. The sample holder may be transferred by hand or robotically from one component to the next.

1. Oligonucleotide Design Component

In some embodiments of the present invention, the DNA production process included an automated oligonucleotide design system. The system includes software utilized to design the sequence of the oligonucleotide. The software and parameters chosen vary according to the application that the oligonucleotides are designed for use in.

For example, in some embodiments where an oligonucleotide is designed for use in the INVADER assay to detect a SNP, the sequence(s) of interest (synthesis request information) are entered into the INVADERCREATOR program (Third Wave Technologies, Madison, Wis.). The program designs probes for both the sense and antisense strand. Strand selection is based upon the ease of synthesis, minimization of secondary structure formation, and manufacturability. In some embodiments, the user chooses the strand for sequences to be designed for. In other embodiments, the software automatically selects the strand. By incorporating thermodynamic parameters for optimum probe cycling and signal generation (Allawi and SantaLucia, Biochemistry, 36:10581 [1997]), oligonucleotide probes are designed to operate at a preselected assay temperature. In particular embodiments, oligonucleotide probes are designed to operate at an assay temperature of 63° C. Based on these criteria, a final probe set (e.g., primary probes for 2 alleles and an INVADER oligonucleotide) is selected.

In some embodiments, the INVADERCREATOR system is a web-based program with secure site access that contains a link to the BLAST search web site at the National Library of Medicine at the NIH, and can be linked to RNAstructure (Mathews et al., RNA 5:1458 [1999]), a software program that incorporates mfold (Zuker, Science, 244:48 [1989]). RNAstructure tests the proposed oligonucleotide designs generated by INVADERCREATOR for potential uni- and bimolecular complex formation. INVADERCREATOR is open database connectivity (ODBC)-compliant and uses the Oracle database for export/integration. The INVADERCREATOR system was configured with Oracle to work well with UNIX systems, as most genome centers are UNIX-based.

In preferred embodiments, the INVADERCREATOR analysis is provided on a separate Sun server so it can handle analysis of large batch jobs. For example, a customer can submit up to 2,000 SNP sequences in one email. The server passes the batch of sequences on to the INVADERCREATOR software, and, when initiated, the program designs SNP sets. Probe set designs are returned to the user within 24 hours of receipt of the sequences.

Each INVADER reaction includes at least two target sequence-specific oligonucleotides for the primary reaction: an upstream INVADER oligonucleotide and a downstream Probe oligonucleotide. Generally, these oligonucleotides are unlabeled. The INVADER oligonucleotide is designed to bind stably at the reaction temperature, while the probe is designed to freely associate and disassociate with the target strand, with cleavage occurring only when an uncut probe hybridizes to a target adjacent to an overlapping INVADER oligonucleotide. In some embodiments, the probe includes a 5' flap that is not complementary to the target, and this flap is released from the probe when cleavage occurs. In some embodiments, the released flap participates as an INVADER oligonucleotide in a secondary reaction.

To select a probe sequence that will perform optimally at a pre-selected reaction temperature, the melting temperature (TM) of the SNP to be detected is calculated using the nearest-neighbor model and published parameters for DNA duplex formation (Allawi and SantaLucia, Biochemistry, 36:10581 [1997]. Because the assay's salt concentrations are often different than the solution conditions in which the nearest-neighbor parameters were obtained (1M NaCl and no divalent metals), and because the presence and concentration of the enzyme influences the optimal reaction temperature, an adjustment is generally made to the calculated TM to determine the optimal temperature at which to perform a reaction. One way of compensating for these factors is to vary the value provided for the salt concentration within the melting temperature calculations. This adjustment is termed a 'salt correction'. As used herein, the term "salt correction" refers to a variation made in the value provided for a salt concentration for the purpose of reflecting the effect on a TM calculation for a nucleic acid duplex of a non-salt parameter or condition affecting said duplex. Variation of the values provided for the strand concentrations will also affect the outcome of these calculations. By using a value of 0.5 M NaCl (SantaLucia, Proc Natl Acad Sci U S A, 95:1460 [1998]) and strand concentrations of about 1 mM of the probe and 1 fM target, the algorithm used for calculating probe-target melting temperature has been adapted for use in predicting optimal INVADER assay reaction temperature. For a set of 30 probes, the average deviation between optimal assay temperatures calculated by this method and those experimentally determined is about 1.5° C.

The length of the downstream probe to a given SNP is defined by the temperature selected for running the reaction (e.g., 63° C.). Starting from the position of the variant nucleotide on the target DNA (the target base that is paired to the probe nucleotide 5' of the intended cleavage site), an iterative procedure is used by which the length of the SNP region is increased by one base pair until a calculated optimal reaction temperature (TM plus salt correction to compensate for enzyme effect) matching the pre-selected, desired reaction temperature is reached. The non-complementary arm of the probe is preferably selected to allow the secondary reaction to cycle at the same reaction temperature, and is screened using programs such as mfold (Zuker, Science, 244:48 [1989]) or Oligo 5.0 (Rychlik and Rhoads, Nucleic Acids Res, 17:8543 [1989]) for the possible formation of dimer complexes or secondary structures that could interfere with the reaction. The same principles are also followed for INVADER oligonucleotide design. Briefly, starting from the position N on the target DNA, the 3' end of the INVADER oligonucleotide is designed to have a nucleotide not complementary to either allele suspected of being contained in the sample to be tested. The mismatch does not adversely affect cleavage (Lyamichev et al., Nature Biotechnology, 17:292 [1999]), and it can enhance probe cycling, presumably by minimizing coaxial stabilization effects between the two probes. Additional residues complementary to the target DNA starting from residue N−1 are then added in the upstream direction until the stability of the INVADER oligonucleotide-target hybrid exceeds that of the probe (and therefore the planned assay reaction temperature) by 15-20° C.

It is one aspect of the assay design that the all of the probe sequences may be selected to allow the primary and secondary reactions to occur at the same optimal temperature, so that the reaction steps can run simultaneously. In an alternative embodiment, the probes may be designed to operate at different optimal temperatures, so that the reactions steps are not simultaneously at their temperature optima.

The present invention is not limited to the use of the INVADERCREATOR software. Indeed, a variety of software programs are contemplated and are commercially available, including, but not limited to PRIMER EXPRESS (Applied Biosystems, Foster City, Calif.), GCG Wisconsin Package (Genetics computer Group, Madison, Wis.) and Vector NTI (Informax, Rockville, Md.).

2. Oligonucleotide Synthesis Component

Once a particular oligonucleotide sequence or set of sequences has been chosen, sequences are sent (e.g., electronically) to a high-throughput oligonucleotide synthesizer component. In some preferred embodiments, the high-throughput synthesizer component contains multiple DNA synthesizers. Such systems are described in detail above.

3. Oligonucleotide Processing Components

In some embodiments, the automated DNA production process further comprises one or more oligonucleotide production components, including, but not limited to, an oligonucleotide cleavage and deprotection component, an oligonucleotide purification component, a dry-down component, a desalting component, a dilution and fill component, and a quality control component.

A. Oligonucleotide Cleavage and Deprotection

After synthesis is complete, the oligonucleotide synthesis columns are moved to the cleavage and deprotection station. In some embodiments, the transfer of oligonucleotides to this station is automated and controlled by robotic automation. In some embodiments, the entire cleavage and deprotection process is performed by robotic automation. In some embodiments, a deprotecting reagent (e.g., $NH_4OH$ or other deprotecting reagent) is supplied through the automated reagent supply system. Accordingly, in some embodiments, oligonucleotide deprotection is performed in multi-sample containers (e.g., 96 well covered dishes) in an oven. This method is designed for the high-throughput system of the present invention and is capable of the simultaneous processing of large numbers of samples. This method provides several advantages over the standard method of deprotection in vials. For example, sample handling is reduced (e.g., labeling of vials dispensing of concentrated $NH_4OH$ to individual vials, as well as the associated capping and uncapping of the vials, is eliminated). This reduces the risks of contamination or mislabeling and decreases processing time. Where such methods are used to replace human pipetting of samples and capping of vials, the methods save many labor hours per day. The method also reduces consumable requirements by eliminating the need for vials and pipette tips, reduces equipment needs by eliminating the need for pipettes, and improves worker safety conditions by reducing worker exposure to ammonium hydroxide. The potential for repetitive motion disorders is also reduced. Deprotection in a multi-well plate further has the advantage that the plate can be directly placed on an automated desalting apparatus (e.g., TECAN Robot).

During the development of the present invention, the plate was optimized to be functional and compatible with the deprotection methods. In some embodiments, the plate is designed to be able to hold as much as two milliliters of oligonucleotide and ammonium hydroxide. If deep well plates are used, automated downstream processing steps may need to be altered to ensure that the full volume of sample is extracted from the wells. In some embodiments, the multi-well plates used in the methods of the present invention comprise a tight sealing lid/cover to protect from evaporation, provide for even heating, and are able to withstand temperatures and pressures necessary for deprotection. Attempts with initial plates were not successful, having problems with lids that were not suitably sealed and plates that did not withstand deprotection temperatures.

In some embodiments (e.g., processing of target and INVADER oligonucleotides), oligonucleotides are cleaved from the synthesis support in the multi-well plates. In other embodiments (e.g., processing of probe oligonucleotides), oligonucleotides are first cleaved from the synthesis column and then transferred to the plate for deprotection.

B. Oligonucleotide Purification

In some embodiments, following deprotection and cleavage from the solid support, oligonucleotides are further purified. Any suitable purification method may be employed, including, but not limited to, high pressure liquid chromatography (HPLC) (e.g., using reverse phase C18 and ion exchange), reverse phase cartridge purification, and gel electrophoresis. However, in preferred embodiments, purification is carried out using ion exchange HPLC chromatography.

In some embodiments, multiple HPLC instruments are utilized, and integrated into banks (e.g., banks of 8 HPLC instruments). Each bank is referred to as an HPLC module. Each HPLC module consists of an automated injector (e.g., including, but not limited to, Leap Technologies 8-port injector) connected to each bank of automated HPLC instruments (e.g., including, but not limited to, Beckman-Coulter HPLC instruments). The automatic Leap injector can handle four 96-well plates of cleaved and deprotected oligonucleotides at a time. The Leap injector automatically loads a sample onto each of the HPLCs in a given bank. The use of one injector with each bank of HPLC provides the advantage of reducing labor and allowing integrated processing of information.

In some embodiments, oligonucleotides are purified on an ion exchange column using a salt gradient. Any suitable ion exchange functionality or support may be utilized, including but not limited to, Source 15 Q ion exchange resin (Pharmacia). Any suitable salt may be utilized for elution of oligonucleotides from the ion exchange column, including but not limited to, sodium chloride, acetonitrile, and sodium perchlorate. However, in preferred embodiments, a gradient of sodium perchlorate in acetonitrile and sodium acetate is utilized.

In some embodiments, the gradient is run for a sufficient time course to capture a broad range of sizes of oligonucleotides. For example, in some embodiments, the gradient is a 54 minute gradient carried out using the method described in Tables 1 and 2. Table 1 describes an HPLC protocol for the gradient. The time column represents the time of the operation. The module column represents the equipment that controls the operation. The function column represents the function that the HPLC is performing. The value column represents the value of the HPLC function at the time specified in the time column. Table 2 describes the gradient used in HPLC purification. The column temperature is 65° C. Buffer A is 20 mM Sodium Perchlorate, 20 mM Sodium Acetate, 10% Acetonitrile, pH 7.35. Buffer B is 600 mM Sodium Perchlorate, 20 mM Sodium Acetate, 10% Acetonitrile, pH 7.35.

In some embodiments, the gradient is shortened. In preferred embodiments, the gradient is shortened so that a particular gradient range suitable for the elution of a particular oligonucleotide being purified is accomplished in a reduced amount of time. In other preferred embodiments, the gradient is shortened so that a particular gradient range suitable for the elution of any oligonucleotide having a size within a selected size range is accomplished in a reduced amount of time. This latter embodiment provides the advantages that the worker performing HPLC need not have foreknowledge of the size of an oligonucleotide within the selected size range, and the protocol need not be altered for purification of any oligonucleotide having a size within the range.

In a particularly preferred embodiment, the gradient is a 34 minute gradient described in the Tables 3 and 4. The parameters and buffer compositions are as described for Tables 1 and 2. Reducing the gradient to 34 minutes increases the capacity of synthesis per HPLC instrument and reduces buffer usage by 50% compared to the 54 minute protocol described above. The 34 minute HPLC method of the present invention has the further advantage of being optimized to be able to separate oligonucleotides of a length range of 23-39 nucleotides without any changes in the protocol for the different lengths within the range. Previous methods required changes for every 2-3 nucleotide change in length. In yet other embodiments, the gradient time is reduced even further (e.g., to less than 30 minutes, preferably to less than 20 minutes, and even more preferably, to less than 15 minutes). Any suitable method may be utilized that meets the requirements of the present invention (e.g., able to purify a wide range of oligonucleotide lengths using the same protocol).

In some embodiments, separate sets of HPLC conditions, each selected to purify oligonucleotides within a different size range, may be provided (e.g., may be run on separate HPLCs or banks of HPLCs). Thus, in some embodiments of the present invention, a first bank of HPLCs are configured to purify oligonucleotides using a first set of purification conditions (e.g., for 23-39 mers), while second and third banks are used for the shorter and longer oligonucleotides. Use of this system allows for automated purification without the need to change any parameters from purification to purification and decreases the time required for oligonucleotide production.

In some embodiments, the HPLC station is equipped with a central reagent supply system. In some embodiments, the central reagent system includes an automated buffer preparation system. The automated buffer preparation system includes large vat carboys that receive pre-measured reagents and water for centralized buffer preparation. The buffers (e.g., a high salt buffer and a low salt buffer) are piped through a circulation loop directly from the central preparation area to the HPLCs. In some embodiments, the conductivity of the solution in the circulation loop is monitored to verify correct content and adequate mixing. In addition, in some embodiments, circulation lines are fitted with venturis for static mixing of the solutions as they are circulated through the piping loop. In still further embodiments, the circulation lines are fitted with 0.05 µm filters for sterilization. In some preferred embodiments, the buffer tanks contain from about 100 liters to about 500 liters of buffer. The use of large buffer tanks allows for a more consistent buffer mixture. In some preferred embodiments, the individual buffer systems are supported by a high purity water purification system so as to avoid having to purchase individual containers.

In some preferred embodiments, the HPLC purification step is carried out in a clean room environment. The clean room includes a HEPA filtration system. All personnel in the clean room are outfitted with protective gloves, hair coverings, and foot coverings.

In preferred embodiments, the automated buffer prep system is located in a non-clean room environment and the prepared buffer is piped through the wall into the clean room.

Each purified oligonucleotide is collected into a tube (e.g., a 50-ml conical tube) in a carrying case in the fraction collector. Collection is based on a set method, which is triggered by an absorbance rate change, level, or threshold value within a predetermined time window. In some embodiments, the method uses a flow rate of 5 ml/min (the maximum rate of the pumps is 10 ml/min.) and each column is automatically washed before the injector loads the next sample.

TABLE 1

54 Minute HPLC Method

| Time (min) | Module | Function | Value | Duration (min) |
|---|---|---|---|---|
| 0 | Pump | % B | 22.00 | 4.0 |
| 0 | Det 166-3 | Autozero ON | | |
| 0 | Det 166-3 | Relay ON | 3.0 | 0.10 |
| 4 | Pump | % B | 37.00 | 43.00 |
| 47 | Pump | % B | 100.00 | 0.50 |
| 47.5 | Pump | Flow Rate | 7.5 | 0.00 |
| 50.0 | Pump | % B | 5.0 | 0.50 |
| 53.45 | Det 166-3 | Stop Data | | |

(Det = detector; % B = percent of buffer B; flow rate values in ml/min)

TABLE 2

54 Minute HPLC Method

| Time | Gradient | Flow Rate |
|---|---|---|
| 0 | 5% B/95% A | 5 ml/min |
| 0-4 min | 5-22% B | 5 ml/min |
| 4-47 min | 22-37% B | 5 ml/min |
| 47-47.5 min | 37-100% B | 7.5 ml/min |
| 47.5-50 min | 100% B | 7.5 ml/min |
| 50-50.5 min | 100-5% B | 7.5 ml/min |
| 50.5-53.5 min | 5% B | 7.5 ml/min |

TABLE 3

34 Minute HPLC Method

| Time (min) | Module | Function | Value | Duration |
|---|---|---|---|---|
| 0 | Pump | % B | 26.00 | 2.0 |
| 0 | Det 166-3 | Autozero ON | | |
| 0 | Det 166-3 | Relay ON | 3.0 | 0.10 |
| 2 | Pump | % B | 36.00 | 27.00 |
| 29 | Pump | % B | 100.00 | 0.50 |
| 29.5 | Pump | Flow Rate | 7.5 | 0.00 |
| 32 | Pump | % B | 5.0 | 0.50 |
| 33.45 | Det 166-3 | Stop Data | | |

TABLE 4

34 Minute HPLC Method

| Time | Gradient | Flow Rate |
|---|---|---|
| 0 | 5% B/95% A | 5 ml/min |
| 0-2 min | 5-26% B | 5 ml/min |
| 2-29 min | 26-36% B | 5 ml/min |
| 29-29.5 min | 36-100% B | 6.5 ml/min |
| 29.5-32 min | 100% B | 7.5 ml/min |
| 32-32.5 min | 100-5% B | 7.5 ml/min |
| 32.5-33.5 min | 5% B | 7.5 ml/min |

C. Dry-Down Component

When the fraction collector is full of eluted oligonucleotides, they are transferred (e.g., by automated robotics or by hand) to a drying station. For example, in some embodiments, the samples are transferred to customized racks for Genevac centrifugal evaporator to be dried down. In preferred embodiments, the Genevac evaporator is equipped with racks designed to be used in both the Genevac and the subsequent desalting step. The Genevac evaporator decreases drying time, relative to other commercially available evaporators, by 60%.

D. Desalting Component

In some embodiments, following HPLC, oligonucleotides are desalted. In other embodiments, oligonucleotides are not HPLC purified, but instead proceed directly from deprotection to desalting. In some embodiments, the desalting stations have TECAN robot systems for automated desalting. The system employs a rack that has been designed to fit the TECAN robot and the Genevac centrifugal evaporator without transfer to a different rack or holder. The racks are designed to hold the different sizes of desalting columns, such as the NAP-5 and NAP-10 columns. The TECAN robot loads each oligonucleotide onto an individual NAP-5 or NAP-10 column, supplies the buffer, and collects the eluate. If desired, desalted oligonucleotides may be frozen or dried down at this point.

In some embodiments, following desalting, INVADER and target oligonucleotides are analyzed by mass spectroscopy. For example, in some embodiments, a small sample from the desalted oligonucleotide sample is removed (e.g., by a TECAN robot) and spotted on an analysis plate, which is then placed into a mass spectrometer. The results are analyzed and processed by a software routine. Following the analysis, failed oligonucleotides are automatically reordered, while oligonucleotides that pass the analysis are transported to the next processing step. This preliminary quality control analysis removes failed oligonucleotides earlier in the processing, thus resulting in cost savings and improving cycle times.

E. Oligonucleotide Dilution and Fill Component

In some embodiments, the oligonucleotide production process further includes a dilute and fill module. In some embodiments, each module consists of three automated oligonucleotide dilution and normalization stations. Each station consists of a network-linked computer and an automated robotic system (e.g., including but not limited to Biomek 2000). In one embodiment, the pipetting station is physically integrated with a spectrophotometer to allow machine handling of every step in the process. All manipulations are carried out in a HEPA-filtered environment. Dissolved oligonucleotides are loaded onto the Biomek 2000 deck the sequence files are transferred into the Biomek 2000. The Biomek 2000 automatically transfers a sample of each oligonucleotide to an optical plate, which the spectrophotometer reads to measure the A260 absorbance. Once the A260 has been determined, an Excel program integrated with the Biomek software uses absorbance and the sequence information to prepare a dilution table for each oligonucleotide. The Biomek employs that dilution table to dilute each oligonucleotide appropriately. The instrument then dispenses oligonucleotides into an appropriate vessel (e.g., 1.5 ml microtubes).

In some preferred embodiments, the automated dilution and fill system is able to dilute different components of a kit (e.g., INVADER and probe oligonucleotides) to different concentrations. In other preferred embodiments, the automated dilution and fill module is able to dilute different components to different concentrations specified by the end user.

F. Quality Control Component

In some embodiments, oligonucleotides undergo a quality control assay before distribution to the user. The specific quality control assay chosen depends on the final use of the oligonucleotides. For example, if the oligonucleotides are to be used in an INVADER SNP detection assay, they are tested in the assay before distribution.

In some embodiments, each SNP set is tested in a quality control assay utilizing the Beckman Coulter SAGIAN CORE System. In some embodiments, the results are read on a real-time instrument (e.g., a ABI 7700 fluorescence reader). The QC assay uses two no target blanks as negative controls and five untyped genomic samples as targets. For consistency, every SNP set is tested with the same genomic samples. In preferred embodiment, the ADS system is responsible for tracking tubes through the QC module. Thus, in some embodiments, if a tube is missing, the ADS program discards, reorders, or searches for the missing tube.

In some preferred embodiments, the user chooses which QC method to run. The operator then chooses how many sets are needed. Then, in some embodiments, the application auto-selects the correct number of SNPs based on priority and prints output (picklist). If a picklist needs to be regenerated, the operator inputs which picklist they are replacing as well as which sets are not valid. The system auto-selects the valid SNPs plus replacement SNPs and print output. Additionally, in some embodiments, picklists are manually generated by SNP number.

The auto-selected SNPs are then removed from being listed as available for auto-selection. In some embodiments, the software prints the following items: SNP/Oligo list (picklist), SNP/Oligo layout (rack setup). The operator then takes the picklist into inventory and removes the completed oligonucleotide sets. In some embodiments, a completed set is unavailable. In this case, the operator regenerates a picklist. Then, in preferred embodiments, the missing SNP set or tube is flagged in the system. Once a picklist is full, the oligonucleotides are moved to the next step.

In some embodiments, the operator then takes the rack setup generated by the picklist and loads the rack. Alternatively, a robotic handling system loads the rack. In preferred embodiments, tubes are scanned as they are placed onto the rack. The scan checks to make sure it is the correct tube and displays the location in the rack where the tube is to be placed.

Completed racks are then placed in a holding area to await the robot prep and robot run. Then, in some embodiments, the operator views what racks are in the queue and determines what genomics and reagent stock will be loaded onto the robot. The robot is then programmed to perform a specific method. Additionally, in some embodiments, the robot or operator records genomics and reagents lot numbers.

In preferred embodiments, a carousel location map is printed that outlines where racks are to be placed. The operator then loads the robot carousel according to the method layout. The rack is scanned (e.g., by the operator or by the ADS program). If the rack is not valid for the current robot method, the operator will be informed. The carousel location for the rack is then displayed. The output plates are then scanned (e.g., by the operator or by the ADS program). If the plate is not valid for the current method the operator is informed. The carousel location for the plate is then displayed.

Then, in some embodiments, the robot is run. The robot then places the plates onto heatblocks for a period of time specified in the method. In some embodiments, the robot then scans the plates on the Cytofluor. Output from the cytofluor is read into the database and attached to the output plate record.

In other embodiments, the output is read on the ABI 7700 real time instrument. In some embodiments, the operator loads the plate on to the 7700. Alternatively, in other embodiments, the robot loads the plate onto the ABI 7700. A scan is then started using the 7700 software. When the scan is completed the output file is saved onto a computer hard drive. The operator then starts the application and scans in the plate bar code. The software instructs the user to browse to the saved output file. The software then reads the file into the database and deletes the file (or tells the operator to delete the file).

The plate reader results (e.g., from a Cytofluor or a ABI 7700) are then analyzed (e.g., by a software program or by the operator). Additionally, in some embodiments, the operator reviews the results of the software analysis of each SNP and takes one of several actions. In some embodiments, the operator approves all automated actions. In other embodiments, the operator reviews and approves individual actions. In some embodiments, the operator marks actions as needing additional review. Alternatively, in other embodiments, the operator passes on reviewing anything. Additionally, in some embodiments, the operator overrides all automated actions.

Depending on the results of the QC analysis, one of several actions is next taken. If the software marks ready for Full Fill, the operator forwards discards diluted Probe/INVADER oligonucleotide mixes and forwards the samples to the packaging module.

If an oligonucleotide set fails quality control, the data is interpreted to determine the cause of the failure. The course of action is determined by such data interpretation. If the software marks an oligonucleotide Reassess Failed Oligonucleotide, no action by user is required, the reassess is handled by automation. In the software marks an oligonucleotide Redilute Failed Oligonucleotide, the operator discards diluted tubes. No other action is required. If the software marks an oligonucleotide Order Target Oligonucleotide, no action by user is required. In this case, a synthetic target oligonucleotide is ordered for further testing. If the software marks an oligonucleotide Fail Oligo(s) Discard Oligo(s), the operator discards the diluted tubes and undiluted tubes. No other action is required. If the software marks an oligonucleotide Fail SNP, the operator discards the diluted and un-diluted tubes. No other action is required. If the software marks an oligonucleotide Full SNP Redesign, the operator discards the diluted and un-diluted tubes. No other action is required. If the software marks an oligonucleotide Partial SNP Redesign the operator discards diluted tubes and discards some undiluted tubes. No other action is required.

In some embodiments, the software marks an oligonucleotide Manual Intervention. This step occurs if the operator or software has determined the SNP requires manual attention. This step puts the SNP "on hold" in the tracking system while the operator investigates the source of the failure.

When a set of oligonucleotides (e.g., a INVADER assay set) is completed, the set is transferred to the packaging station.

4. Packaging Component

In some embodiments, one or more components generated using the system of the present invention are packaged using any suitable means. In some embodiments, the packaging system is automated. In some embodiments, the packaging component is controlled by the centralized control network of the present invention.

5. Centralized Control Network

In some embodiments, the automated DNA production process further comprises a centralized control system. In some embodiments, the centralized control system comprises a computer system.

In some embodiments, the computer system comprises computer memory or a computer memory device and a computer processor. In some embodiments, the computer memory (or computer memory device) and computer processor are part of the same computer. In other embodiments, the computer memory device or computer memory are located on one computer and the computer processor is located on a different computer. In some embodiments, the computer memory is connected to the computer processor through the Internet or World Wide Web. In some embodiments, the computer memory is on a computer readable medium (e.g., floppy disk, hard disk, compact disk, DVD, etc). In other embodiments, the computer memory (or computer memory device) and computer processor are connected via a local network or intranet. In certain embodiments, the computer system comprises a computer memory device, a computer processor, an interactive device (e.g., keyboard, mouse, voice recognition system), and a display system (e.g., monitor, speaker system, etc.).

In preferred embodiments, the systems and methods of the present invention comprise a centralized control system, wherein the centralized control system comprises a computer tracking system (tracking software). As discussed above, the items to be manufactured (e.g. oligonucleotide probes, targets, etc) are subjected to a number of processing steps (e.g. synthesis, purification, quality control, etc). Also as discussed above, various components of a single order (e.g. one type of SNP detection kit) are manufactured in separate tubes, and may be subjected to a different number of processing steps. Consequently, the present invention provides systems and methods for tracking the location and status of the items to be manufactured such that multiple components of a single order can be separately manufactured and brought back together at the appropriate time. The tracking system and methods of the present invention also allow for increased quality control and production efficiency.

In some embodiments, the computer tracking system comprises a central processing unit (CPU) and a central database. The central database is the central repository of information about manufacturing orders that are received (e.g. SNP sequence to be detected, final dilution requirements, etc), as well as manufacturing orders that have been processed (e.g. processed by software applications that determine optimal nucleic acid sequences, and applications that assign unique identifiers to orders). Manufacturing orders that have been processed may generate, for example, the number and types of oligonucleotides that need to be manufactured (e.g. probe, INVADER oligonucleotide, synthetic target), and the unique identifier associated with the entire order as well as unique identifiers for each component of an order (e.g. probe, INVADER oligonucleotide, etc). In certain embodiments, the components of an order proceed through the manufacturing process in containers that have been labeled with unique identifiers (e.g. bar coded test tubes, color coded test tubes, etc.).

In certain embodiments, the computer tracking system further comprises one or more scanning units capable of reading the unique identifier associated with each labeled container. In some embodiments, the scanning units are portable (e.g. hand held scanner employed by an operator to scan a labeled container). In other embodiments, the scanning units are stationary (e.g. built into each module). In some embodiments, at least one scanning unit is portable and at least one scanning unit is stationary (e.g. hand held human implemented device).

Stationary scanning units may, for example, collect information from the unique identifier on a labeled container (i.e. the labeled container is 'red') as it passes through part of one of the production modules. For example, a rack of 100 labeled containers may pass from the purification module to the dilute and fill module on a conveyor belt or other transport means, and the 100 labeled containers may be read by the stationary scanning unit. Likewise, a portable scanning unit may be employed to collect the information from the labeled containers as they pass from one production module to the next, or at different points within a production module. The scanning units may also be employed, for example, to determine the identity of a labeled container that has been tested (e.g. concentration of sample inside container is tested and the identity of the container is determined).

The scanning units are capable of transmitting the information they collect from the labeled containers to a central database. The scanning units may be linked to a central database via wires, or the information may be transmitted to the central database. The central database collects and processes this information such that the location and status of individual orders and components of orders can be tracked (e.g. information about when the order is likely to complete the manufacturing process may be obtained from the system). The central database also collects information from any type of sample analysis performed within each module (e.g. concentration measurements made during dilute and fill module). This sample analysis is correlated with the unique identifiers on each labeled container such that the status of each labeled container is determined. This allows labeled containers that are unsatisfactory to be removed from the production process (e.g. information from the central database is communicated to robotic or human container handlers to remove the unsatisfactory sample). Likewise, containers that are automatically removed from the production process as unsatisfactory may be identified, and this information communicated to a central database (e.g. to update the status of an order, allow a re-order to be generated, etc). Allowing unsatisfactory samples to be removed prevents unnecessary manufacturing steps, and allows the production of a replacement to begin as early as possible.

As mentioned above, the tracking system of the present invention allows the production of single orders that have multiple components that may proceed through different production modules, and/or that may be processed (at least in part) in separate containers. For example, an order may be for the production of an INVADER assay detection kit. An INVADER assay detection kit is composed of at least 2 components (the INVADER oligonucleotide, and the downstream probe), and generally includes a second downstream probe (e.g. for a different allele), and one or two synthetic targets so controls may be run (i.e. an INVADER assay kit may have 5 separate oligonucleotide sequences that need to be generated). The generation of separate sequences, in separate containers, generally necessitates that the tracking system track the location and status of each container, and direct the proper association of completed oligonucleotides into a single container or kit. Providing each container with a unique identifier corresponding to a single type of oligonucleotide (e.g. an INVADER oligonucleotide), and also corresponding to a single order (a SNP detection kit for diagnosing a certain SNP) allows separate, high through-put manufacture of the various components of a kit without confusion as to what components belong with each kit.

Tracking the location and status of the components of a kit (e.g. a kit composed of 5 different oligonucleotides) has many advantages. For example, near the end of the purification module HPLC is employed, and a simple sample analysis may be employed on each sample in each container to determine if a sample is collected in each tube. If no sample is collected after HPLC is performed, the unique identifier on the container, in connection with the central database, identifies the type of sample that should have been produced (e.g. INVADER oligonucleotide) and a re-order is generated. Identification of this particular oligonucleotide allows the manufacturing process for this oligonucleotide to start over from the beginning (e.g. this order gets priority status over other orders to begin the manufacturing process again). Importantly, the other components of the order may continue the manufacturing process without being discarded as part of a defective order (e.g. the manufacturing process may continue for these oligonucleotides up to the point where the defective oligonucleotide is required). Likewise, additional manufacturing resources are not wasted on the defective component (i.e. additional reagents and time are not spent on this portion of the order in further manufacturing steps).

The unique identifier on each of the containers allows the various components of a given order to be grouped together at a step when this is required (likewise, there is no need to group the components of an order in the manufacturing process until it is required). For example, prior to the dilute and fill module, the various components of a single order may be grouped together such that the contents of the proper containers are combined in the proper fashion in the dilute and fill module. This identification and grouping also allows re-orders to 'find' the other components of a particular order. This type of grouping, for example, allows the automated mixing, in the dilute and fill stage, of the first and second downstream probes with the INVADER oligonucleotide, all from the same order. This helps prevent human errors in reading containers and accidentally providing probes intended for one SNP being labeled as specific for a different SNP (i.e. this helps prevent components of different kits from being accidentally mixed together). The identification of individual containers not only allows for the proper grouping of the various components of a single order, but also allows for an order to be customized for a particular customer (e.g. a certain concentration or buffer employed in the second dilute and fill procedure). Finally, containers with finished products in them (e.g. containers with probes, and containers with synthetic targets) need to be associated with each other so they are properly assayed in the quality control module, and packaged together as a single kit (otherwise, quality control and/or a final end-user may find false negative and false positives when attempting to test/use the kit). The ability to track the individual containers allows the components of a kit to be associated together by directing a robot or human operator what tubes belong together. Consequently, final kits are produced with the proper components. Therefore, the tracking systems and methods of the present invention allow high through-put production of kits with many components, while assuring quality production.

6. Production in Practice

This Example describes the production of an INVADER assay kit for SNP detection using the automated DNA production system of the present invention.

A. Oligonucleotide Design

The sequence of the SNP to be detected is first submitted through the automated web-based user interface or through e-mail. The sequences are then transferred to the INVADER CREATOR software. The software designs the upstream INVADER oligonucleotide and downstream probe oligonucleotide. The sequences are returned to the user for inspection. At this point, the sequences are assigned a bar code and entered into the automated tracking system. The bar codes of the probe and INVADER oligonucleotide are linked so that their synthesis, analysis, and packaging can be coordinated.

B. Oligonucleotide Synthesis

Once the probe and INVADER oligonucleotide sequences have been designed, the sequences are transferred to the synthesis component. The bar codes are read and the sequences are logged into the synthesis module. Each module consists of 14 MOSS EXPEDITE 16-channel DNA synthesizers (PE Biosystems, Foster City, Calif.), that prepare the primary probes, and two synthesizers, e.g., ABI 3948 48-Channel DNA synthesizers or ABI 3900 instruments (Applied Biosystems, Foster City, Calif.), that prepare the INVADER oligonucleotides. Synthesizing a set of two primary and INVADER probes is complete 3-4 hours. The instruments run 24 h/day. Following synthesis, the automating tracking system reads the bar codes and logs the oligonucleotides as having completed the synthesis module.

The synthesis room is equipped with centralized reagent delivery. Acetonitrile is supplied to the synthesizers through stainless steel tubing. De-blocking solution (e.g., 3% TCA in methylene chloride or 2% DCA in toluene) is supplied through Teflon tubing. Tubing is designed to attach to the synthesizers without any modification of the synthesizers. The synthesis room is also equipped with an automated waste removal system. Waste containers are equipped with ventilation and contain sensors that trigger removal of waste through centralized tubing when the cache pots are fill. Waste is piped to a centralized storage facility equipped with a blow out wall. The pressure in the synthesis instruments is controlled with argon supplied through a centralized system. The argon delivery system includes local tanks supplied from a centralized storage tank.

During synthesis, the efficiency of each step of the reaction is monitored. If an oligonucleotide fails the synthesis process, it is re-synthesized. The bar coding system scans the container of the oligonucleotide and marks it as being sent back for re-synthesis.

Following synthesis, the oligonucleotides are transported to the cleavage and deprotection station. At this stage, completed oligonucleotides are subjected to a final deprotection step and are cleaved from the solid support used for synthesis. The cleavage and deprotection may be performed manually or through automated robotics. The oligonucleotides are cleaved from the solid support used for synthesis by incubation with concentrated NaOH and collected. In some embodiments, the deprotection step takes about 8-12 hours. In other embodiments, "fast deprotection" chemistry comprising use of amidites having the tert.-butylphenoxy-acetyl "tac" base protecting group is used (Proligo, LLC., Boulder, Colo.). This protecting group decreases cleavage and deprotection time of the final oligo from to 15 minutes at 55° C., or two hours at room temperature. Following cleavage, the bar code scanner scans the oligonucleotide tubes and logs them as having completed the cleavage and deprotection step.

C. Purification

Following synthesis and cleavage, probe oligonucleotides are further purified using HPLC. INVADER oligonucleotides are not purified, but instead proceed directly to desalting (see below).

HPLC is performed on instruments integrated into banks (modules) of 8. Each HPLC module consists of a Leap Technologies 8-port injector connected to 8 automated Beckman-Coulter HPLC instruments. The automatic Leap injector can handle four 96-well plates of cleaved and deprotected primary probes at a time. The Leap injector automatically loads a sample onto each of the 8 HPLCs.

Buffers for HPLC purification are produced by the automated buffer preparation system. The buffer prep system is in a general access area. Prepared buffer is then piped through the wall in to clean room (HEPA environment). The system includes large vat carboys that receive premeasured reagents and water for centralized buffer preparation. The buffers are piped from central prep to HPLCs. The conductivity of the solution in the circulation loop is monitored as a means of verifying both correct content and adequate mixing. The circulation lines are fitted with venturis for static mixing of the solutions; additional mixing occurs as solutions are circulated through the piping loop. The circulation lines are fitted with 0.05 mm filters for sterilization and removal of any residual particulates.

Each purified probe is collected into a 50-ml conical tube in a carrying case in the fraction collector. Collection is based on a set method, which is triggered by an absorbance rate change within a predetermined time window. The HPLC is run at a flow rate of 5-7.5 ml/min (the maximum rate of the pumps is 10 ml/min.) and each column is automatically washed before the injector loads the next sample. The gradient used is described in Tables 3 and 4 and takes 34 minutes to complete (including wash steps to prepare the column for the next sample). When the fraction collector is full of eluted probes, the tubes are transferred manually to customized racks for concentration in a Genevac centrifugal evaporator. The Genevac racks, containing dry oligonucleotide, are then transferred to the TECAN Nap 10 column handler for desalting.

D. Desalting

Following HPLC purification (probe oligonucleotides) or cleavage (INVADER oligonucleotides), oligonucleotides move to the desalting station. The dried oligonucleotides are resuspended in a small volume of water. Desalting steps are performed by a TECAN robot system. The racks used in Genevac centrifugation are also used in the desalting step, eliminating the need for transfer of tubes at this step. The racks are also designed to hold the different sizes of desalting columns, such as the NAP-5 and NAP-10 columns. The TECAN robot loads each oligonucleotide onto an individual NAP-5 or NAP-10 column, supplies the buffer, and collects the eluate.

E. Dilution

Following desalting, the oligonucleotides are transferred to the dilute and fill module for concentration normalization and dispenation. Each module consists of three automated probe dilution and normalization stations. Each station consists of a network-linked computer and a Biomek 2000 interfaced with a SPECTRAMAX spectrophotometer Model 190 or PLUS 384 (Molecular Devices Corp., Sunnyvale Calif.) in a HEPA-filtered environment.

The probe and INVADER oligonucleotides are transferred onto the Biomek 2000 deck and the sequence files are downloaded into the Biomek 2000. The Biomek 2000 automatically transfers a sample of each oligonucleotide to an optical plate, which the spectrophotometer reads to measure the A260 absorbance. Once the A260 has been determined, an Excel program integrated with the Biomek software uses the measured absorbance and the sequence information to calculate the concentration of each oligonucleotide. The software then prepares a dilution table for each oligonucleotide. The probe and INVADER oligonucleotide are each diluted by the Biomek to a concentration appropriate for their intended use. The instrument then combines and dispenses the probe and INVADER oligonucleotides into 1.5 ml microtubes for each SNP set. The completed set of oligonucleotides contains enough material for 5,000 SNP assays.

If an oligonucleotide fails the dilution step, it is first re-diluted. If it again fails dilution, the oligonucleotide is re-purified or returned for re-synthesis. The progress of the oligonucleotide through the dilution module is tracked by the bar coding system. Oligonucleotides that pass the dilution module are scanned as having completed dilution and are moved to the next module.

F. Quality Control

Before shipping, the SNP set is subjected to a quality control assay in a SAGIAN CORE System (Beckman Coulter), which is read on a ABI 7700 real time fluorescence reader (PE Biosystems). The QC assay uses two no target blanks as negative controls and five untyped genomic samples as targets.

The quality control assay is performed in segments. In each segment, the operator or automated system performs the following steps: log on; select location; step specific activity; and log off. The ADS system is responsible for tracking tubes. If a tube is missing, existing ADS program routines will be used to discard/reorder/search for the tube.

In the first step, a picklist is generated. The list includes the identity of the SNPs that are being tested and the QC method chosen. The tubes containing the oligonucleotide are selected by the automated software and a copy of the picklist is printed. The tubes are removed from inventory by the operator and scanned with the bar code reader and being removed from inventory.

The operator or the automated system then takes the rack setup generated by the picklist and loads the rack. Tubes are scanned as they are placed onto the rack. The scan checks to make sure it is the correct tube and displays the location in the rack where the tube is to be placed. Completed racks are placed in a holding area to await the robot prep and robot run.

The operator or the automated system then chooses the genomics and reagent stock to be loaded onto the robot. The robot is programmed with the specific method for the SNP set generated. Lot numbers of the genomics and reagents are recorded. Racks are placed in the proper carousel location. After all the carousel locations have been loaded the robot is run.

Places are then incubated on the robot. The plates are placed onto heatblocks for a period of time specified in the method. The operator then takes the plate and loads it into the ABI 7700. A scan is started using the 7700 software. When the scan is completed the operator transfers the output file onto a Macintosh computer hard drive. The operator then starts the analysis application and scans in the plate bar code.

The software instructs the operator to browse to the saved output file. The software then reads the file into the database and deletes the file.

The results of the QC assay are then analyzed. The operator scans plate in at workstation PC and reviews automated analysis. The automated actions are performed using a spreadsheet system. The automated spreadsheet program returns one of the following results:
1) Mark SNP Oligonucleotide ready for full fill (Operator discards diluted Probe/INVADER mixes. Requires no other action).
2) ReAssess Failed Oligonucleotide (Requires no action by operator, handled by automation).
3) Redilute Failed Oligonucleotide (Operator discards diluted tubes. Requires no other action).
4) Order Target Oligonucleotide (Requires no action by operator, handled by automation).
5) Fail Oligo(s) Discard Oligo(s) (Operator discards diluted tubes. Operator discards un-diluted tubes. Requires no other action).
6) Fail SNP (Operator discards diluted tubes. Operator discards un-diluted tubes. Requires no other action).
7) Full SNP Redesign (Operator discards diluted tubes. Operator discards un-diluted tubes. Requires no other action).
8) Partial SNP Redesign (Operator discards diluted tubes. Operator discards some un-diluted tubes. Requires no other action).
9) Manual Intervention (This step occurs if the operator or software has determined the SNP requires manual attention. This step puts the SNP "on hold" in the tracking system).

The operator then views each SNP analysis and either approves all automated actions, approves individual actions, marks actions as needing additional review, passes on reviewing anything, or over rides automated actions. Once the SNP set has passed the QC analysis, the oligonucleotides are transferred to the packaging station.

The present invention has been described in terms of specific embodiments incorporating details to facilitate the understanding of the principles of construction and operation of the invention. Such reference herein to specific embodiments and details thereof is not intended to limit the scope of the claims appended hereto. It will be apparent to those skilled in the art that modifications may be made in the embodiment chosen for illustration without departing from the spirit and scope of the invention. Improvement of DNA Synthesizer The present invention provides means of modifying existing oligonucleotide synthesis instruments to improve efficiency, reliability, and safety. In these Examples, commercially available instruments are modified to provide improved synthesizers of the present invention.

EXAMPLE 1

The Northwest Engineering 48-Column Oligonucleotide Synthesizer

The Northwest Engineering 48-Column Oligonucleotide Synthesizer (NEI-48, Northwest Engineering, Inc., Alameda, Calif.) is an "open system" synthesizer in that the dispensing tubes for the delivery of reagents are not affixed to each synthesis vial or column for the entire term of the synthesis process. Instead, movement of a round cartridge containing the columns allows each dispensing tube to serve multiple columns. In addition, when a synthesis column is positioned to receive reagent, the dispenser is not even temporarily affixed to the vial with a sealed coupling. The reagent dispensed to the vial has open contact with the surrounding environment of the chamber. The chamber containing the synthesis vials is isolated from the ambient environment by a top plate. The general design and operation of the NEI instrument is described in WO 99/656602.

The NEI-48 synthesizer includes external mounting points for various reagent bottles, such as the phosphoramidite monomers used to form the polymer chain, and the oxidizers, capping reagents and deblocking reagents used in the reaction steps. TEFLON tubing feeds liquid from each reagent bottle to its assigned valve on the top of the machine. The feeding is done under pressure from an argon gas source.

The operations of the machine are controlled using a computer. The computer is fitted with a motion control card connected via cabling to a motor controller in the synthesizer; in addition, the computer is connected to the synthesizer via an RS-232C cable. The provided software allows the user to monitor and control the machine's synthesis operations.

The machine also requires connection to a source of argon gas, to be delivered at a pressure between 15 and 60 psi, inclusive, and a source of compressed air or nitrogen, to be delivered at a pressure between 60 and 120 psi, inclusive.

Synthesis in the NEI-48 occurs within synthesizer columns that are arranged in the cartridge.

Operations of the NEI-48 in accordance with the manufacturer's instructions produced undesirable emissions and leakage resulting in potential synthesis and instrument failure. The following section details two of the sources of these emissions, and details one or more aspects of the present invention applied to solve each problem, to thereby improve the performance of this machine.

A. Column Overflow Due to Inadequate Argon Pressure

Undesirable emissions and exposure are increased when columns overflow, causing the hazardous reagents used during synthesis to collect in the chamber bowl. A number of types of malfunction in the machine can leads to incomplete drainage or purge of the columns, and each will eventually lead to column overflow as the instrument proceeds through its subsequent dispensing steps.

The flow of reagent and waste from the synthesis columns is controlled by a differential in the pressure of argon between the top and bottom openings of the column. When the pressure of argon on the top opening is not sufficiently high, the column will not drain or be purged completely, i.e., fluid that should be drained will remain in the column. This improper purging not only reduces the efficiency of the synthesis chemistry, it also leads to column overflow. Therefore, failure of either initial pressurization of the chamber, or leakage of argon from any coupling (in an amount great enough to reduce either the overall pressure of the system or the pressure differential across the synthesis column) may lead to undesirable emissions and exposure. One aspect of the present invention is to prevent column overflow by reducing leakage of argon at a variety of points in the system.

Figure 6:
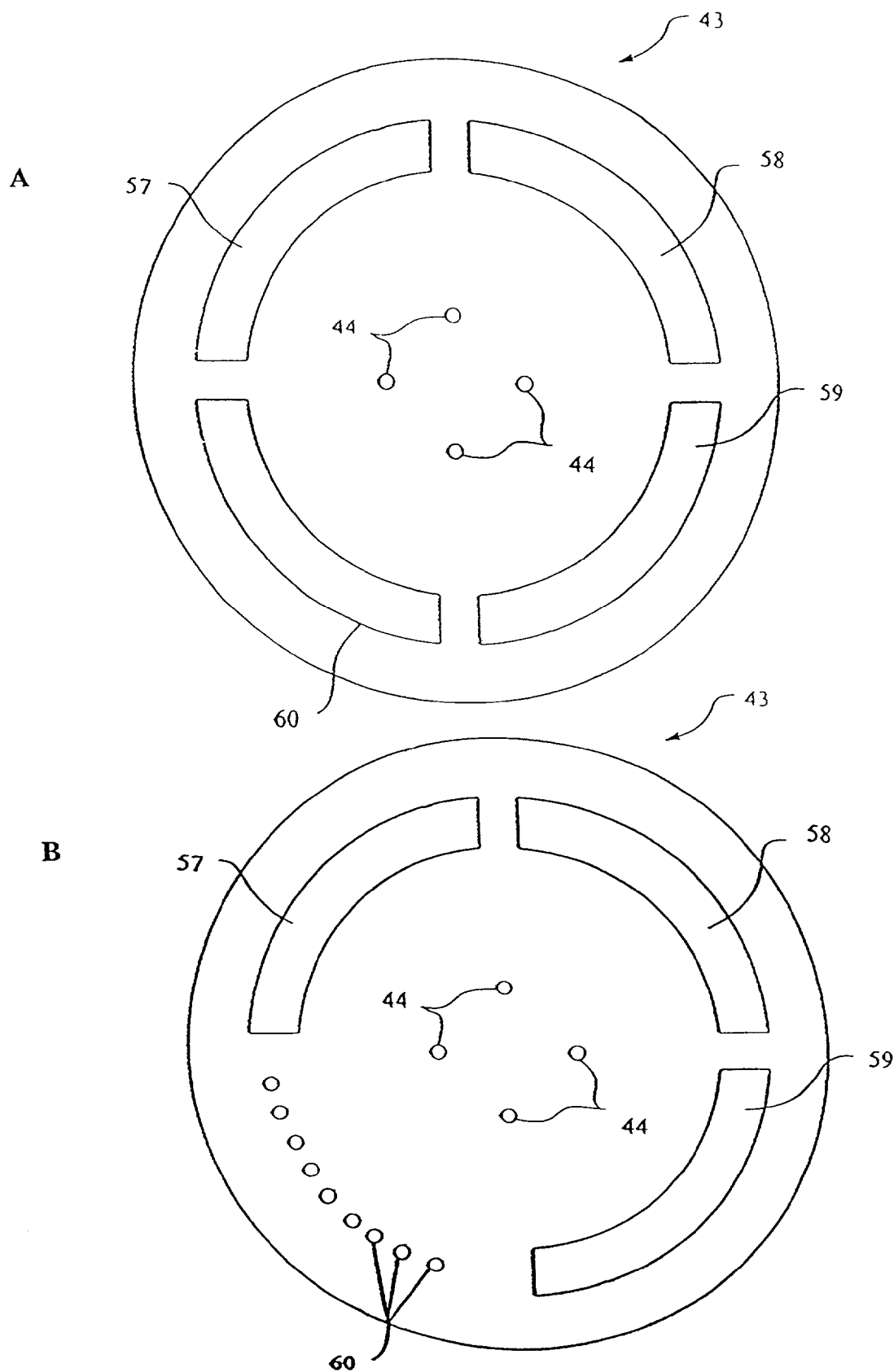
FIG. 6A illustrates a top view of one embodiment of a drain plate.
FIG. 6B illustrates a top view of another embodiment of a drain plate gasket.

The NEI-48 demonstrated a variety of failures as a result of argon leakage from or within the instrument. To address this problem, the drain plate gasket 43 of the present invention was created and was fitted between the cartridge and drain plate. Addition of the gasket to this assembly, as diagrammed in FIG. 6, provided a pressure-tight seal, thereby containing the argon and allowing proper drainage of the columns at the purging step. The gasket of the present invention applied in this way improved the safety of the machine, and improved the efficiency of the synthesis reaction.

In another embodiment, a modified drain plate gasket was provided. The drain plate has securing holes 33, for attachment of the motor connector 22. The first gasket was of a design that avoided the areas of the motor connector 22 and the securing holes 33. A modified drain plate gasket was designed with guide holes 44 to fit closely around each securing hole 33, such that the holes served to place the gasket in a specific position between the cartridge and the drain plate (FIG. 6). In an alternative embodiment, the drain plate 19 and the cartridge 3 may be provided with other alignment features, such as pin fittings and corresponding pin receiving holes (not shown) to facilitate alignment of these parts during assembly (e.g., after cleaning). A modified drain plate gasket for use with these parts may be provided with pin guide holes (not shown). Use of either the securing holes 33, or pins fittings to align the gasket makes the gasket easier to position during assembly, ensuring proper operation of the gasket and improving ease of any maintenance that requires disassembly of these parts.

B. Emissions From Reagent Bottles

During normal operations and without any malfunction, fumes can nonetheless be emitted by the reagent bottles attached to the machine. These emissions can be increased by poor fit or incorrect seals around bottle caps. For example, the reagent bottles for the NEI-48 are affixed to the machine by clamps that apply pressure to the outside of the bottle caps. The clamps can distort the caps, increasing leakage and gaseous emissions.

One aspect of the present invention is to provide a means of collecting emissions from reagent bottles. For improving the NEI-48, a reagent stand comprising a ventilation tube was constructed. The stand holds the reagent bottles, thereby eliminating the need for the cap-distorting clamps, and consequently reducing emissions from the bottles; the ventilation tube removes any remaining emitted gases. This reagent dispensing station improves the safety of the machine in normal operation. The reagent dispensing station of the present invention is not limited to a configuration comprising a stand. It is envisioned that a station comprising a ventilation system may also be used with one or more bottles held in clamps. In preferred embodiments, at least one aspect of the reagent container system, e.g., the clamp, the cap, or the bottle, is modified such that clamping the reagent bottle does not compromise the containment function of the cap, or of any other aspect of the reagent container system.

EXAMPLE 2

The Applied Biosystems 3900 Oligonucleotide Synthesizer

The Applied Biosystems 3900 Oligonucleotide Synthesizer (Applied Biosystems, Foster City, Calif.) is similar in design and function to the NEI-48, described above. The 3900 is an "open system" synthesizer utilizing a round cartridge containing the columns. The receiving holes of the cartridge are essentially cylindrical, and, as with the NEI-48, proper function of the instrument relies on an airtight seal between the columns and cartridge.

The 3900 synthesizer includes recessed areas for the external mounting of reagent bottles. When mounted on the instrument, the reagent bottles do not protrude beyond the outside edges of the instrument; they are completely recessed, (as, e.g., the reagent reservoirs 72 are recessed in base 2, diagrammed in FIG. 13A). As with the NEI-48, the reagent feeding is done under pressure from an argon gas source.

The performance of the 3900 synthesizer is improved using the modifications provided by the present invention. Two specific improvements are described below. These particular improvements are described by way of example; improvements to the ABI 3900 synthesizer, or any synthesizer, are not limited to the improvements described herein below.

A. Column Overflow Due to Inadequate Argon Pressure

As described above for the NEI-48, the proper purging of the synthesis columns at each cycle relies on the maintenance of a differential in argon pressure between the top and bottom openings of the columns. Improper or incomplete purging reduces the efficiency of the synthesis and increases the risk of column overflow. Proper purging in the 3900, like other open systems, depends in part upon the formation of an airtight seal between receiving holes in the cartridge and exterior surfaces of the synthesis columns. The presence of irregularities in the column shape or surface can prevent the formation of an airtight seal, allowing argon to leak around the column exterior, thereby disrupting the pressure differential required to properly purge the columns at each cycle. The need to discard columns having even minor imperfections adds expense to the use of the instrument. If undetected, a faulty seal can lead to poor synthesis and column overflow, as described above.

As discussed above, in some embodiments, the present invention provides improved synthesizers having reliable seals between the cartridge and the synthesis columns. The present invention provides a number of embodiments of synthesizers having such seals. For example, as described above, a synthesizer may be improved by the addition of a resilient seal, such as an O-ring, in the receiving hole of each cartridge.

To make this improvement, the 3900 is fitted with such O-rings for safer, more reliable and more efficient performance. Examples of several means of creating an improved seal between the outer surface of a column 61 and a receiving hole 11 are diagrammed in FIGS. 12A-12C. While any of the embodiments of seals disclosed herein may be applied to the 3900 instrument, in a preferred embodiment, the 3900 is improved by the use of an embodiment similar to that diagrammed in FIG. 12B, wherein a groove 70 creates a groove lip 71, to accommodate and hold an O-ring 67, thus providing a seal between cartridge 3 and the exterior surface 61 of the synthesis column 12. In a particularly preferred embodiment, the receiving hole 11 is enlarged in diameter to facilitate insertion and removal of an O-ring 67, e.g., for easy cleaning or replacement. A groove is machined into the interior of each receiving hole in a 3900 cartridge, and appropriate O-ring seals are placed in the grooves. As noted above, the O-ring could be of any suitable material. Thus modified, the cartridge of the 3900 has a greatly improved ability to accommodate imperfections in the exteriors of synthesis columns, and this improvement results in safer, and more efficient and reliable operation of the instrument, with fewer costs associated with chemical spill clean-up, instrument down-time, and the disposal of unusable synthesis columns.

B. Emissions From Reagent Bottles

During normal operations and without any malfunction, fumes are nonetheless emitted by the reagent bottles attached to the 3900 machine. These emissions can be significant, even though gaskets are provided for use in conjunction with the bottle caps.

As described above, the present invention provides a means of collecting emissions from reagent bottles. On the 3900, the reagent bottles are attached in recessed areas on the exterior in the base of the instrument (e.g., the reagent reservoirs 72 attached to the recessed areas in the base 2, as illustrated in FIG. 13A). The emissions from this instrument are reduced by modification to provide the enclosed reagent dispensing station of the present invention. In modification of the 3900, the recessed areas are provided with panels to enclose the space, reducing the release of hazardous vapors.

Reagent bottles or reservoirs need to accessible for changing or filling, due, e.g., to consumption of reagents during synthesis operations. In making the modification to the 3900, the panels added to the instrument are moveable, to provide access to the reagent bottles within the enclosed space. In a simple configuration, panels provided for the purpose of enclosing the space are attached by use of strips of VELCRO fastener (e.g., adhesive backed strips), for easy mounting and removal. For a sturdier attachment, the panels may be attached using hard, removable fasteners, such as screws or bolts. In a particularly preferred configuration, the panels are mounted in tracks, brackets or other suitable fittings that allow them to be moved or removed by sliding.

To monitor reagent bottles (e.g., to determine when changing or filling is needed), it is preferred that the reagent reservoirs be accessible for visual inspection. In making the addition of panels to the 3900, the panels are constructed such that the reagent bottles can be visually inspected without opening the enclosure. The panels provided are constructed of transparent material. While glass may be used, in preferred embodiments, for both safety and ease of handling a plastic is used with sufficient transparency to allow visual inspection of reagent bottles, and with sufficient resistance to the chemicals used in synthesis to avoid rapid or immediate decay or fogging, (as is often associated with exposure of plastics to vapors of solvents to which they are not resistant), when used in this application. Selection of plastics for appropriate chemical resistance is well known in the art, and tables of chemical compatibility are generally readily available from manufacturers.

The panels are provided with a ventilation port (e.g., ventilation port 74, as diagrammed in FIG. 13B), for the removal vapors and fumes emitted by the reagent bottles. Such a ventilation port serves as an attachment point for a ventilation tube to conduct fumes away from the instrument, e.g., into an exhaust system. Since the vapors from DNA synthesis reagents tend to be heavier than air, the ventilation port is placed near the bottom of the enclosure. Placement of the ventilation port toward the rear is convenient for attachment to a larger exhaust system, minimizes or prevents interference by the ventilation tubing with operator access to other parts of the instrument, and conducts the fumes away from instrument operators.

To maximize efficacy of the ventilation system, an air inlet into the enclosure is provided. In applying the panels to the 3900, a clearance between the attached panels and the body of the instrument (e.g., the clearance 75 between the panel 73 and the base 2 diagrammed in FIG. 13B) provides the air inlet. The panel is positioned such that the principal air inlet is a clearance between the front edge of the panel (i.e., the edge closest to the front of the instrument) and the instrument base. Positioning of the inlet toward the front of the instrument, or on the opposite side of an enclosure from a ventilation port, maximizes the flow of air through the enclosure, providing the most efficient removal of vapors. The inward flow of air minimizes the possible escape of hazardous vapors toward instrument operators. Thus modified, the 3900 instrument is improved with respect to its emissions of hazardous vapors.

C. Emissions From the Chamber Bowl

During normal operations and without any malfunction, fumes are nonetheless emitted when the chamber bowl of the ABI 3900 is opened for access by the instrument operator (e.g., when the lid is opened to retrieve columns after synthesis is completed). These emissions can be significant. The present invention provides a means of collecting emissions from the 3900 without the use of a separate fume hood. The present invention comprises a synthesizer having an integrated ventilation system to contain and remove vapor emissions. One aspect of the invention is to collect and remove vapors when the instrument is open. Embodiments of integrated ventilation systems as applied to the 3900 instrument are shown in FIGS. 19-22.

As shown in FIG. 19A, in one embodiment, the lid enclosure 102 is modified to comprise a ventilation opening 105. The lid enclosure of the 3900 comprises an outer window 101. In preferred embodiments, a ventilation opening is placed in the center of the outer window 101 of the lid enclosure 105, so as to avoid blocking the operator's view of internal components, such as the synthesis columns, during operation.

As shown in the diagram of FIG. 21, the lid enclosure of the 3900 instrument comprises an outer window 101 and an inner window 25. The space between the windows is open to the ambient environment through a ventilation slot 100 near the lid enclosure hinge 106. The outer window in an unmodified instrument allows visual inspection of operations and components within the lid enclosure and within the chamber bowl 18 of the base 2. Reagent supply tubing passes through the inner window, but the window is sealed around each tube so that the chamber will maintain appropriate pressure during operation. In the embodiment shown in FIGS. 19, 20 and 21, the ventilation opening provides an aperture in the outer window.

In another embodiment, one or more ventilation openings may be provided in the base (e.g., 2) of the synthesizer, as diagrammed in FIG. 22. In other embodiments, a synthesizer may comprise ventilation openings in both a lid enclosure and a base.

Each ventilation opening is attached to ventilation tubing (e.g., 103) for attachment to an exhaust system. In some embodiments, a synthesizer is attached to an individual exhaust system. In other embodiments, multiple synthesizers are attached to a centralized exhaust system. In a preferred configuration, the access to the exhaust system is toward the rear of the instrument, to minimize or prevent interference by the ventilation tubing with operator access to the chamber bowl, and to conduct the fumes away from instrument operators.

Another aspect of the present invention is to provide a ventilated workspace around the chamber bowl having a negative air pressure relative to the surrounding air pressure, such that the flow of air goes from the surrounding room into the ventilated workspace, and not in the reverse, during operation of the ventilation system. The ventilated workspace is designed to allow the instrument operator to reach into the space (e.g., to remove the synthesis columns) without turning off the ventilation system. Embodiments of a ventilated workspace are shown in FIGS. 20A-C. As shown in this embodiment, the ventilated workspace is created by providing side panels between the body of the synthesizer and the lid enclosure, and a front panel. The presence of the panels reduces the size of the opening through which ambient air can enter the ventilated workspace. When the ventilation system is turned on (i.e., when the connected ventilation tube is drawing air from the ventilation opening, the airflow in through the reduced opening prevents or reduces any outward flow of gaseous emissions.

All publications and patents mentioned in the above specification are herein incorporated by reference. Various modifications and variations of the described method and system of the invention will be apparent to those skilled in the art without departing from the scope and spirit of the invention. Although the invention has been described in connection with specific preferred embodiments, it should be understood that the invention as claimed should not be unduly limited to such specific embodiments. Indeed, various modifications of the described modes for carrying out the invention which are obvious to those skilled in the relevant fields are intended to be within the scope of the following claims.

We claim:

1. A method for decreasing the quantity of vapor emissions released into the surrounding atmosphere created during the use of an oligonucleotide synthesizer, said method comprising;
   a) providing an oligonucleotide synthesizer, wherein said oligonucleotide synthesizer comprises a reaction chamber and a lid enclosure, said lid enclosure containing a ventilation system, wherein in an open position, said lid enclosure provides a substantially ventilated workspace via said ventilation system in said lid enclosure, wherein in said open position said ventilated workspace is of sufficient size to permit an operator's hands to enter said reaction chamber;
   b) connecting said oligonucleotide synthesizer ventilation system to a source of negative pressure or vacuum; and
   c) operating said source of negative pressure or vacuum only when said lid enclosure comprising a ventilation system is in said open position; wherein said method is utilized while operating said oligonucleotide synthesizer to synthesize one or more oligonucleotides.

2. The method of claim 1, wherein said operating of said source of negative pressure or vacuum is triggered to occur automatically whenever said lid enclosure is placed in said open position.

* * * * *